United States Patent
Clifton

(10) Patent No.: US 11,710,968 B2
(45) Date of Patent: *Jul. 25, 2023

(54) PLUG AND PLAY WITH SMART ENERGY STORAGE UNITS

(71) Applicant: Orison, Inc., Cody, WY (US)

(72) Inventor: Eric Douglass Clifton, Cody, WY (US)

(73) Assignee: Orison, Inc., Cody, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,800

(22) Filed: Mar. 7, 2022

(65) Prior Publication Data
US 2022/0337083 A1 Oct. 20, 2022

Related U.S. Application Data

(63) Continuation of application No. 16/570,953, filed on Sep. 13, 2019, now Pat. No. 11,271,424, which is a continuation of application No. 15/672,150, filed on Aug. 8, 2017, now Pat. No. 10,714,974.

(60) Provisional application No. 62/459,498, filed on Feb. 15, 2017, provisional application No. 62/403,042, filed on Sep. 30, 2016, provisional application No. 62/372,268, filed on Aug. 8, 2016.

(51) Int. Cl.
*H02J 3/32* (2006.01)
*H02J 3/14* (2006.01)
*H02J 15/00* (2006.01)

(52) U.S. Cl.
CPC ............... *H02J 3/32* (2013.01); *H02J 3/14* (2013.01); *H02J 15/00* (2013.01); *H02J 2310/14* (2020.01)

(58) Field of Classification Search
USPC .................................................. 700/286, 291
See application file for complete search history.

(56) References Cited

U.S. PATENT DOCUMENTS

| | | | |
|---|---|---|---|
| 6,538,414 B1 | 3/2003 | Tsuruga et al. | |
| 7,206,670 B2 | 4/2007 | Pimputkar et al. | |
| (Continued) | | | |

FOREIGN PATENT DOCUMENTS

| | | | |
|---|---|---|---|
| CN | 202586366 U | 12/2012 | |
| CN | 102354167 B | 7/2013 | |
| (Continued) | | | |

OTHER PUBLICATIONS

Bhagyashree, Borse, et al., "Energy Management Technology Based on Cloud Network", IOSR Journal of Electrical and Electronics Engineering (IOSR-JEEE), e-ISSN: 2278-1676, p. ISSN: 2320-3331, (2014), pp. 23-26, www.iosrjournals.org.

(Continued)

*Primary Examiner* — Emilio J Saavedra
(74) *Attorney, Agent, or Firm* — James Scott Nolan

(57) ABSTRACT

A smart energy storage system is described. The system includes a smart energy storage unit coupled to a selected circuit of a local electric grid, and configured for being charged so as to withdraw and store energy from the local electric grid, and discharged for supplying energy to the local electric grid. The smart energy storage unit includes an energy storage cell configured for being charged so as to withdraw and store energy from the local electric grid, and discharged for supplying energy to the local grid, and a storage cell management unit for controlling the energy storage cell.

20 Claims, 37 Drawing Sheets

(56) References Cited

U.S. PATENT DOCUMENTS

| | | |
|---|---|---|
| 8,463,449 B2 | 6/2013 | Sanders |
| 8,700,224 B2 | 4/2014 | Mathiowetz |
| 9,063,525 B2 | 6/2015 | Sanders et al. |
| 9,208,267 B2 | 12/2015 | Miller |
| 9,705,333 B2 | 7/2017 | Clifton |
| 10,714,974 B2 | 7/2020 | Clifton |
| 2006/0029178 A1 | 2/2006 | Tahan |
| 2006/0276938 A1 | 12/2006 | Miller |
| 2007/0043478 A1 | 2/2007 | Ehlers et al. |
| 2010/0017045 A1 | 1/2010 | Nesler et al. |
| 2010/0207448 A1 | 8/2010 | Cooper et al. |
| 2011/0004357 A1 | 1/2011 | Mathiowetz |
| 2011/0013427 A1 | 1/2011 | Weir et al. |
| 2011/0076542 A1 | 3/2011 | Farmer |
| 2011/0148195 A1 | 6/2011 | Lee |
| 2011/0204720 A1 | 8/2011 | Ruiz et al. |
| 2011/0231028 A1 | 9/2011 | Ozog |
| 2012/0043821 A1 | 2/2012 | Lee et al. |
| 2012/0083934 A1 | 4/2012 | Jesudason et al. |
| 2012/0197449 A1 | 8/2012 | Sanders |
| 2012/0215829 A1* | 8/2012 | Naphade ............... G06N 20/00 709/203 |
| 2012/0310425 A1 | 12/2012 | Kang |
| 2012/0311077 A1 | 12/2012 | Charvet |
| 2013/0066477 A1 | 3/2013 | Jiang |
| 2013/0076140 A1 | 3/2013 | Darden et al. |
| 2013/0079943 A1 | 3/2013 | Darden et al. |
| 2013/0176141 A1* | 7/2013 | LaFrance ............... G08C 17/02 340/870.02 |
| 2013/0241485 A1 | 9/2013 | Snyder |
| 2013/0245849 A1* | 9/2013 | Paul ..................... G05B 15/02 700/295 |
| 2013/0285446 A1 | 10/2013 | Chow et al. |
| 2014/0148969 A1 | 5/2014 | Graziano et al. |
| 2014/0159487 A1 | 6/2014 | Han |
| 2014/0217983 A1 | 8/2014 | McCalmont et al. |
| 2015/0026343 A1 | 1/2015 | Borges et al. |
| 2015/0066231 A1* | 3/2015 | Clifton ............... H04L 12/2803 307/46 |
| 2015/0249350 A1 | 9/2015 | Tomita et al. |
| 2015/0309521 A1 | 10/2015 | Pan |
| 2015/0318700 A1 | 11/2015 | Inakagata et al. |
| 2015/0378383 A1 | 12/2015 | Hsu |
| 2016/0033986 A1 | 2/2016 | Kamel et al. |
| 2016/0126783 A1 | 5/2016 | Cheng et al. |
| 2017/0047742 A1 | 2/2017 | Narla |
| 2017/0217403 A1* | 8/2017 | Kim ..................... B60R 25/24 |
| 2018/0166879 A1 | 6/2018 | Mader |
| 2020/0112200 A1 | 4/2020 | Clifton et al. |

FOREIGN PATENT DOCUMENTS

| | | |
|---|---|---|
| CN | 102244677 B | 1/2014 |
| CN | 103679304 A | 3/2014 |
| CN | 104243247 A | 12/2014 |
| CN | 102608973 B | 2/2015 |
| CN | 104483838 A | 4/2015 |
| CN | 104715340 A | 6/2015 |
| EP | 2840545 A4 | 12/2015 |
| WO | 2011106915 A1 | 9/2011 |
| WO | 2014077774 A1 | 5/2014 |

OTHER PUBLICATIONS

Billion 5, Billion BEsmart Intelligent Energy Saving Cloud, Jan. 29, 2015, 2 pages.

Business Wire, Cloud-Based Building Energy Management Solutions, 5 pages Web Date Accessed Sep. 11, 2017, http://www.businesswiere.com/news/home/20160222205530/en/siemens-IBM-team-generation-cloud-based-building-energy.

International Search Report and Written Opinion dated Oct. 23, 2017, for PCT application No. PCT/US2017/045987.

Sindhuja, Putta and M.S. Balamurugan, "Smart Power Monitoring and Control System through Internet of things using Cloud Data Storage", Indian Journal of Science and Technology, vol. 8(19), DOI: 10.17485/ijst/2015/v8i9/76698, (Aug. 2015): pp. 1-7.

* cited by examiner

PLUG AND PLAY WITH SMART ENERGY STORAGE UNITS

CROSS-REFERENCES TO RELATED APPLICATIONS

This application is a continuation of U.S. patent application Ser. No. 16/570,953, entitled "PLUG AND PLAY WITH SMART ENERGY STORAGE UNITS," filed Sep. 13, 2019, which is a continuation of U.S. patent application Ser. No. 15/672,150, entitled, "PLUG AND PLAY WITH SMART ENERGY STORAGE UNITS," filed on Aug. 8, 2017, which in turn claims the benefit of U.S. Provisional Application Ser. No. 62/459,498, entitled "PLUG AND PLAY WITH SMART ENERGY STORAGE UNITS," filed on Feb. 15, 2017, U.S. Provisional Application Ser. No. 62/403,042, entitled "PLUG AND PLAY WITH SMART ENERGY STORAGE UNITS." filed on Sep. 30, 2016, and U.S. Provisional Application Ser. No. 62/372,268, entitled "SYSTEMS AND METHODS FOR CHARGING AND DISCHARGING ENERGY STORAGE UNITS," filed on Aug. 8, 2016. The disclosures of the above-identified patent application are hereby incorporated by reference in their entirety.

FIELD

This disclosure relates to the wide-scale distribution of intelligent energy storage units that may be positioned within the electric grid so as to make the electric grid smart.

BACKGROUND

Centralized, large-scale battery storage has been introduced on the utility side of the grid to provide an alternative to inefficient fast-response gas peaker plants and as a resource for ensuring that excess energy produced, for example during off-peak periods, is not wasted. For instance, commonly, where the over production of energy occurs, energy is typically sent to ground and therefore wasted. Centralized, grid-size battery storage has been advanced as a possible solution to this problem. Particularly, grid side, centralized battery storage is an attempt to mimic supply traditionally provided by the aforementioned gas fired peaker plants, so as to store a reserve of energy in instances where generation plants over produce. This stored supply can then be offloaded as part of the strategy for creating a stable grid. Centralized storage has also been integrated into the system to compensate for the intermittent nature of renewable energy production. Accordingly, grid side, centralized battery storage is an attempt to mimic a traditional hub and spoke grid system.

However, due partly to the fact that the battery storage resides on the utility side of the meter, this model is very inefficient for batteries. For instance, centralized battery storage only allows the utility system operators (e.g., generation, transmission, and/or distribution operators) to propagate several of the main issues with the grid, such as: congestion, inefficiency due to the separation between production and consumption, high costs, and long timelines due to large scale infrastructure and skilled resources and single use-case products. It also continues to ignore consumers and their assets as being part of the solution.

Further, such battery systems are industrial sized, occupying huge warehouses of space. Specifically, because of their large size the batteries themselves are difficult to control, and very hard to maintain. It is easy for individual energy storage cells to become unbalanced, thus causing the battery as a whole to malfunction and/or suffer a diminution in capacity. Further still, given the inefficiencies inherent to peaker plants, large-scale, industrial batteries cannot be offloaded as quickly as needed for them to act as a reserve. Consequently, such batteries become fully charged and are not able to be fully discharged before they are needed to be charged again, and thus they have been found to be ineffectual at solving the problems they were designed to ameliorate.

Additionally, centralized battery storage only allows the DSO to react to demand events, that build up slowly, but change rapidly, requiring fine control that simply is not possible given the lack of control mechanisms to fluidly regulate the functioning of such large batteries. Furthermore, such batteries store electricity at an overall loss due to conversion from AC (transmission) to DC (storage) and back again. This loss is increased when transmission is also part of the equation. And, to make matters worse, these industrialized batteries at best only marginally solve a small portion of the overall problem of efficient energy management, as they do nothing to address the bidirectional flow from customer side Distributed Energy Resources (such as rooftop solar and/or wind turbine generation).

Moreover, such centralized battery storage systems are relatively large and expensive, not easily scalable, and must be managed by an army of highly trained technical staff. It would be desirable to have a less expensive, scalable, more flexible, and easy to control energy storage and distribution system, where congestion is relieved, inefficiency due to the separation between generation and consumption removed, costs and a lack of rapid scalability due to infrastructure and skilled resource diminished and multiple use-cases enabled. It would further be desirable to have a distributed, consumer side, smart energy storage system such as for providing cost efficient energy storage to a household property or building that can be easily installed by a user.

Particularly, to the extent that consumer side distributed battery storage systems have been recognized as a possible solution to the above, such solutions have been proffered specifically as an adjunct to consumer side power generation, for instance, where over-production during the day is stored and used to feedback on to the macro-grid at night. Such solutions require an electrician to wire the power generator and/or the adjunct battery storage unit directly into the meter and/or grid. In such instances, the battery storage unit is not truly a consumer side resource, and cannot be called upon to directly meet the energy needs of the consumer's residence or business. It would be desirable, therefore, to have a true, consumer side energy storage system that was simply "plug-and-play", such as where an energy storage unit could be provided, easily coupled to the local electrical circuit, e.g., merely by plugging it in to an outlet, and thereby fully capable of providing distributed energy storage that can readily be called on to supply the energy needs of the home or business. It would also desirable to be able to add energy storage units to the system and scale up energy supply that can be provided in a more curvilinear fashion as needed. The smart energy storage assets, systems, and their methods of use herein provided solve these and other such problems.

SUMMARY

Presented herein are smart energy assets, systems including the same, as well as methods of their use for withdrawing and supplying energy to a local electric grid, such as a property, building, or complex in a safe manner. The systems include distributed, "plug-and-play", smart energy storage units that allow for simple integration with existing utility grid and distributed energy resources, which are effortless to control, easy to scale, flexible, and safe to charge and discharge. Particularly, the smart energy storage units provided herein are distributed in the sense that they are capable of easily being fit throughout the consumer side of the grid, such as by merely plugging the units into outlets in a consumers homes and businesses. Additionally, the smart energy storage units herein provided are plug-and-play in that they are completely operational, and fully capable of being integrated into the local household electric grid, not by wiring thereto, but by simply plugging the smart electrical cord of the smart unit into an electrical socket. Although, in various instances, they may be wired into the local electric grid, if desired. Further, the smart energy storage units, as provided in the present disclosure, are safe because they are capable of smart charging and/or discharging, when plugged into an electrical socket and therefore coupled to the local electric grid, but are prevented from discharging, or otherwise being "live", when not plugged into the socket and/or coupled to the local grid.

In one aspect, a plug-and-play system of smart energy assets for withdrawing and/or supplying energy to a local electrical grid is disclosed. In various instances, the smart energy assets are designed to be plug-and-play in that they are easily coupled to a local grid, such as by merely plugging them in to an available electrical outlet, and are fully functional once plugged in to the grid. Such a local electric grid may include one or more circuits for transferring energy throughout a specific, defined location, and as such may be a household grid, or a grid for a building, or a complex of buildings, being served by a common network of circuits. In various iterations, the systems of the disclosure include a smart energy storage unit that is configured for being swiftly and/or effortlessly coupled to a selected circuit of the local electric grid, and can be configured for being charged so as to withdraw and store energy from the local grid, and discharged for supplying energy to the grid, in an efficient and safe manner. In addition to the smart energy storage units, these systems may further include one or more sensors, such as for determining a condition of one or more of the circuits of the local electric grid, which sensors may include a communications module for communicating the determined condition data to a receiving device, such as the smart energy storage unit provided herein. Further, the systems may include a consumer side source of power generation, and may allow for connectivity with and data transfer between a remote command center, a utility provider, and/or third party, such as via a suitably configured energy cloud.

Accordingly, in various aspects, a smart energy storage unit is provided, where the smart energy storage unit may include an energy storage cell that is configured for being charged so as to withdraw and store energy from the local electric grid, and discharged for supplying energy to the local grid. To do this, the smart energy storage unit may include control intelligence, e.g., an integrated control system, one or more inverters/converters, e.g., a grid-flexible converter, a battery management system, e.g., an intelligent BMS, and a smart cord. For instance, a suitably configured input and an output capable of being coupled to the selected circuit of the electric grid may be included, and may further be electrically coupled to the energy storage cell. In such an instance, the input may be configured to receive a first form of energy (such as a first form of AC current) from the circuit of the electric grid so as to charge the energy storage cell, and the output may be configured to discharge a second form of energy (such as a second form of AC current) for supply to the circuit of the local electric grid, thereby discharging the energy storage cell.

In particular instances, the input and output cable is a smart plug, which smart plug is configured for providing a first layer of intelligence to the smart energy storage cell, e.g., so as to at least partially make the unit both safe and "plug-and-play." For example, in certain embodiments, the smart plug may include intelligence, such as a microprocessor and/or one or more sensors, which together are configured for allowing the smart energy storage unit to discharge energy when the plug is coupled to a suitably configured outlet, but prevent the unit from discharging when not plugged into a suitably configured outlet. Additionally, the smart plug may be configured so as to allow the transmission of one or more, e.g., all, AC energy, DC energy, and data, and may further be configured for recognizing within what geographical region the unit is positioned, the energy characteristics required for that region, and allowing or not allowing the coupling of the energy storage unit to the local electric grid, if the appropriate energy settings for charging and discharging within that geographical region have or have not been met.

For instance, in one aspect a smart cord is provided. As indicated, a fundamental aspect allowing for the "plug-and-play" nature of the smart energy storage unit is the smart plug. The smart plug, for instance, has two main sets of functionality. The first set of functionality is directed to safety. The smart plug is configured with multiple safety layers that may be implemented all through the smart plug and its connections, both on the wall side and on the smart energy storage unit side. The second set of functionality is directed to universal or internationalized connectivity. Particularly, the smart plug has been adapted for internationalization. Internationalization allows for common connectivity that may be implemented on one or both of the device side and/or the plug/outlet interface, and additionally, the smart plug may be configured to sense or otherwise determine and/or communicate to the unit which national region the unit is in.

The safety features are important for ensuring that at no point in time will the smart plug be "hot" or "live," when the plug is not suitably coupled to both the outlet and the smart energy storage unit. Specifically, as described in greater detail herein below, the smart plug is configured in such a manner that unless both connectors are connected to their respective interfaces, live electricity cannot be transferred through the power cord. This configuration is required so as to ensure the safety of the user and/or any other person, animal, or conductive object that could other wise come into contact with the cord, completing the circuit, and being electrocuted and/or starting a fire.

Internationalization, in these regards, is useful because it makes manufacturing uniform, as the smart units may be used within any national region, with only small variations to the smart cord differentiating them. This is additionally beneficial in that it allows greater lead times for purchasers to determine their inventory needs, as units can easily be cancelled from one order and added to another by only changing the power cord, designating the selected region, with which they ship. Specifically, as described in greater detail herein below, the smart cable is configured in such a manner that it identifies the region to which the smart unit is to be shipped, determines the regional electricity requirements, and communicates the same to the GFC of the power control unit, thereby allowing the GFC to configure itself so as to adapt to the region it is in. Hence, the GFC will adjust the power conditioning and outage based on the plug that is coupled to it, and/or the energy sampled thereby. Accordingly, both of these features, safety and internationalization, are individually important to making the smart energy storage units herein provided truly "plug-and-play."

More particularly, with respect to its safety features, the smart plug has been configured to implement several layers of safety mechanisms to ensure there are a multiplicity of fail safes, one or more of which, e.g., all of which, should be met prior to the smart plug allowing energy to be transferred to or from the energy storage unit. For example, as indicated, it is important that the tines or prongs of the male end of the smart cord plug are not live, unless the plug is both plugged into the wall and the device connector suitably coupled to the smart unit device.

Accordingly, in various embodiments, the plug and/or connector side of the smart cord may include one or more sensors, such as a plurality of sensors. Any number of sensors may be employed, which sensors are useful for being able to determine whether or not one or more of the connecting portions of the smart cord, e.g., either grid side or device side, are sufficiently coupled with their corresponding connecting features, so as enable the transference of energy therebetween, e.g., through the cord. Specifically, a multiplicity of sensors may be used, such as a light sensor, a magnetic sensor, a motion sensor, e.g., an accelerometer, gyroscope, speedometer, a pressure gauge, an impact sensor, and the like.

For example, in particular embodiments, one or more of a light sensor, a magnetic sensor, and/or a motion sensor may be included, such as where each of the sensors are configured for detecting when one member of a coupling or mating pair is in fact mated with its corresponding member. For instance, the male end portion of the plug element of the smart cord may include a light sensor that is adapted for detecting when it is coupled to a corresponding optical or opaque member associated with the outlet or cover thereof. Particularly, the light sensor may be positioned near an end region of the plug element, and emit light at a given wavelength, which when it is in optical contact with a corresponding element, e.g., an opaque member, attached to a portion of the outlet, the light is either reflected back and detected, or, in another instance, is absorbed and not detected, which in either case detecting the reflected light, e.g., in or out of phase, or not detecting the light, dependent on how the light sensor is configured, indicates that the plug is in fact coupled to the outlet. The opposite configuration may also be employed, such as where the light element is positioned on the outlet side, and the opaque element is positioned on the plug side.

Additionally, a magnetic sensor may be included, such as where the magnet is configured for coupling to another element, such as another magnet or metal element attached in a corresponding location on the outlet portion, or vice versa. In such an instance, as the plug element is coupled to the outlet, the magnetic features come into proximity of one another and the magnetic forces can thereby be detected and thus signal that the plug has been appropriately coupled to the outlet. Of course, if two magnet elements are employed, the sensor can be configured to detect either attractive or repulsive forces. Further, the plug element of the smart cord may include a motion sensor, such as an accelerometer or gyroscope or other motion detecting sensor that indicates continued movement or a lack thereof, where continued movement would be a sign of a lack of connection, as it would be expected that when the plug element is coupled to the socket of the outlet, the device should be stationary and movement ceased. A suitably configured pressure sensor or strain gauge can also be employed in similar fashion so as to indicate coupling.

Along with the aforementioned sensors, the plug element of the smart cord may include intelligence, such as a microprocessor that may be positioned within the housing of the plug element and configured for running one or more logic functions, such as with respect to a program stored in a memory coupled to the microprocessor. For example, the microprocessor may be coupled to one or more of the above referenced sensors and may be configured for receiving the sensed information, aggregating it, and making a determination as to whether appropriate coupling has occurred. If so, the microprocessor may signal to the ICS and/or GFC of the smart unit that appropriate coupling has occurred and that energy transfer may commence; alternatively, the microprocessor may communicate that a fault condition exists thereby signaling that it is not safe to transfer energy across the smart cord, and thus prevent or cease energy transfer.

In various embodiments, only one sensed element needs to indicate appropriate coupling has occurred in order to commence energy transfer, e.g., the optical sensor, magnetic sensor, and/or motion sensor indicate coupling has been achieved. However, in various other embodiments, to increase the margin of safety, two or all three, or more sensed conditions may need to be present so as to indicate it is safe to charge or discharge the energy storage unit. Additionally, more sensors can be included and/or be required to verify the existence of a suitably effectuated coupling state, such as activation of an appropriate pressure sensor. Nevertheless, once the appropriate sensed condition(s) has been determined by the processor to be present, the microprocessor may then signal to the ICS and/or GFC that the energy storage unit is ready for charging and/or discharging. Hence, in certain embodiments, only when the appropriate signal has been received by the ICS from the microprocessor will the ICS instruct the GFC to charge or discharge, which in the absence of such instruction, the GFC may be configured so as not to output.

In particular instances, a further check may also be implemented so as to ensure that a coupling has in fact taken place, which check may be in addition to or substitution for the sensors above. For example, in various instances, before allowing charging to occur, the smart cord and/or GFC may cause or otherwise allow the ingress of a sampling of energy into the energy storage unit, which ingress may be indicative that a suitable coupling has occurred; alternatively, the absence of energy ingress into the energy storage unit would indicate that a suitable coupling has not occurred. Specifically, as a practical matter, unless a suitable coupling has occurred, energy would not be able to be taken into the storage unit from the grid, and if energy cannot be taken in off the grid, the smart plug should not be permitted to be live, as it would have no place where to discharge energy transferred to or through it.

Hence, as another check against erroneous or mistaken coupling, the system may be configured for taking in and sampling a small amount of energy to verify that coupling has occurred before allowing the smart cord to go live and thereby discharge or otherwise transfer energy from the storage unit to the circuit of the outlet. Particularly, only where there is a suitable coupling will there be a complete loop that is grounded, thereby allowing energy to flow in and/out of the unit. This check assumes that if energy can flow in safely, energy can also flow out safely. Consequently, in a manner such as this, the smart unit can make various verifications to ensure that it is safe for the energy storage unit to begin charging or discharging, such as based on the positive sensing from the various sensors as well as energy ingress sampling. This is useful because if the sensors show no-fault (e.g. actual connection of the smart cord), but ingress is not possible, then there is likely to be an error in the coupling state, and therefore the unit should not go into a discharge mode, which could otherwise create a dangerous condition.

A further safety protocol that may be implemented may include the connector on the smart unit side indicating that it too is appropriately coupled to the smart cord, so as to begin or otherwise allow charging and/or discharging by the energy storage unit. For instance, the smart unit may include a receptacle that includes one or more sensors, like above, that are configured for indicating an appropriate coupling has taken place between the connector side of the smart plug and the receptacle of the smart unit. In such an instance, the smart unit may be configured such that only when both the plug side and receptacle side connectors of the smart cord, e.g., the sensors thereof, indicate sufficient coupling may energy be flowed across the smart cable. Particularly, the unit connector of the smart cord, or the unit itself, may have one or more of the above referenced sensors, or another proximity sensor configuration, that requires sensed evidence of a coupling before allowing the smart cord to "go live" and permit charging and/or discharging. For example, in one embodiment one or both of the connector element and the device receptacle may include a pressure element, e.g., a contact relay, that needs to be activated in order to indicate that a suitable coupling has been established before allowing the device to charge and/or discharge, e.g., the contact relay may be in the form of a button that is configured such that only when pushed in is energy allowed to flow across the smart cord device.

Additionally, in various instances, a further safety mechanism may include a ground fault circuit interrupter (GFCI) and/or residual current device (RCD) that is configured to prevent any electric power from flowing to or away from the circuit if the GFCI detects the presence of an unsafe condition. For example, the GFCI may be a sensor that is configured to detect if a current flowing through a circuit is traveling along an unintended path, such as through water, a person, or other circuit completing artifact. Specifically, one or more GFCI sensors may be included where the one or more GFCIs are configured for determining the difference between one or more characteristics of electricity flowing through a plug element. Particularly, the GFCI may be configured for determining a difference between energy flow characteristics between the "hot" plug tine, and the "neutral" plug tine, such as in microA and/or microV; if there is a difference between the "hot" and "neutral" plug tines, then the GFCI can trip and/or otherwise instruct the ICS and/or GFC to go offline and prevent energy transfer into and out of the smart unit.

Accordingly, in various implementations, there may be four or more layers of safety features within the smart cord so as to fully enable the plug-and-play nature of the smart energy storage units. For example, the mechanisms herein disclosed, e.g., the plug side sensors, the energy sampling, the unit connector sensors, the GFCI, and other such sensors, may be employed so as to ensure that the smart energy storage units are suitably coupled to their respective paired mates so as to allow the smart units to discharge in a safe manner, and with the appropriate energy characteristics.

A further feature of the smart cord is that in various embodiments, a DC power line is included. For instance, a DC in and a DC out power line may be provided so as to power the various sensors, the microprocessor, and/or other included elements that require power such as a clock, light, e.g., LED light, display, etc. One or more data lines, e.g., two or four or more, for the transfer of data in and out of the power cord, e.g., from the processor and/or memory may also be included. In certain instances, the DC power line(s) may have their own casing such as to provide protection thereto and/or to prevent interference with data transfer. In some embodiments, a communications module including a suitably configured transmitter and/or receiver, as described above, may be included so as to transmit data between the smart cord and the smart unit.

An additional feature of the smart cord presented herein is regionalization. For instance, as described in greater detail herein below, the smart cord may include one or more, such as two, or three, or four, or more regionalization pins that are configured for determining what region the smart energy storage unit is adapted for functioning within. Specifically, as described herein, the smart cord may include a number of pins such as three or more pins that may have different configurations such that each different pin configuration may code for a different geographical region. More specifically, each geographical region and/or country may have predetermined energy condition requirements, such that energy to be transmitted across the circuits of their respective grids is required to have specified characteristics, such as with respect to its voltage, amperage, frequency, and the like.

Particularly, various numbers and/or positions of pins can be present or not within the smart cord in such a manner that they present a 3 or 4 digit analog-based code system, which code system may then be used to specify the region of the country to where the smart energy storage unit is to be deployed. The pins may form a portion of an electrical circuit that, when closed, signals a code that the ICS/GFC then interprets and thereby determines in which geographic region the smart unit is deployed, as well as what condition the energy to be transferred should be in so as to correspond with the energy being transmitted through the circuits of that region and/or country. Specifically, with respect to deployment within the US, the smart cord will have an internal pin configuration that indicates to the ICS/GFC that energy should be transmitted at 120V/60 Hz, whereas for Europe or Australia, the pin configurations may indicate that energy should be transmitted at 220-240V/50 Hz. Likewise for Asia, e.g., Japan, the pin configuration may indicate that energy should be transmitted at 100-110V/60 Hz. In such embodiments, each region may have its own designated pin configuration dependent on the characteristics of the energy to be transmitted in that region.

Of course, where different regions transmit energy with the same or similar characteristics the pin configuration may be the same or different as desired. Hence, regionalization allows the world to be broken down into different energy zones that may be served by a single core smart energy storage unit that largely differs in only the pin configuration of the smart cord and the conditioning of the energy to be transmitted thereby as indicated by respective pin configurations. It is to be noted that with respect to the plug element of the smart cord, the tine or prong configuration also varies from region to region, and as such, the configuration as to shape, and positioning of the individual prongs, e.g., hot, neutral, and/or ground, of the plug element may also differ. In some instances, the plug elements may be configured as an interchangeable attachment member, thereby allowing the main cord body to be the same from region to region, save for the detachable prong elements. In other embodiments, the prong configuration may be capable of being repositioned and/or shaped so as to accommodate multiple regions simply by reconfiguring the shape and/or arrangement of the prongs.

Additionally, in various embodiments, there may be several different configurations of the smart cords with respect to one or both of the plug and/or device connector elements. For instance, as described above, where AC current is being transmitted, the smart energy cord may have a configuration as described above, such as where the plug element includes a male prong coupling mechanism, and the device side connector may have a female or male type of connector configuration. Such a smart power cord is useful when energy is being transferred in both directions, such as both inwards to and outwards from the smart unit.

However, in various instances, the smart energy storage unit may be configured for only transmitting energy in one direction, such as when an appliance is directly coupled to the smart storage device itself. In such an instance, the device, e.g., the smart power cord, need only be configured for transmitting energy in one direction. Hence, in instances as this, the smart power cord may not need to include a male plug connective element. Rather, it may have a female receptacle element, such as configured to receive the plug element of the appliance, and then may have the device connector element, as herein described.

Thus, in this output-only configuration, energy will be transferred directly from the smart energy storage unit to the device without having to be transmitted through the electric grid network. Since energy is being directly transmitted to the appliance, the smart cord may be configured for only transmitting AC energy, which may readily be used by an appliance that uses AC power. However, if the appliance uses DC power, then the cord will be configured for transmitting DC power. In these instances, the sensors in the various cords may be the same or different, and the regionalized pin configurations may be present or not.

Additionally, a smart power cord in this or a similar configuration may be useful when building blocks or stacks of energy storage units, such as where a plurality of energy storage units are daisy chained together via separate smart power cords. For instance, when daisy chaining the storage units together, both ends of the smart cord connectors may be configured so as to be the same element, and in such an instance may be reversible. Energy therefore could be transferred in both directions, from one unit to the other along the chain as needed. Such energy will likely be DC energy, and the cord adapted to transfer DC energy; however, in some instances, AC energy may be transferred and the cord adapted likewise. Of course, in such daisy chaining instances, the blocked or added storage units and their respective cords may or may not have intelligence, as desired. Any suitable number of energy storage units may be chained together in this fashion, such as two or four or eight or sixteen or more. Likewise, in these instances, the sensors in the various cords may be the same or different, the regionalized pin configurations may be present or not, but likely wont be necessary, and data lines may or may not be present.

Accordingly, in various embodiments, since there may be a multiplicity of smart power cords that may be in use at any one instance, the configuration of the device connector element of the smart power cord may have a different configuration so as to distinguish the different types of transmission that the power cord is configured for transmitting. This is useful so as to prevent the wrong cord being positioned in the wrong receptacle for transmitting the wrong form of energy, which could otherwise lead to a dangerous condition. For example, the AC in/out connector element may be configured to only be received within the AC in/out receptacle, the AC out connector element may be configured to only be received within the AC out receptacle, and likewise, the DC out connector element may be configured to only be received within the DC out receptacle, etc. A color-matching coding system may also be employed, so as to indicate which connector element connects with which receptacle element, such as by sharing the same colors.

In another aspect, a smart outlet faceplate for an electrical socket may be provided. The faceplate may include a processor, a memory, a communications module, as described herein, and/or rechargeable power source, such as a power source capable of being charged via induction. In various instances, the smart faceplate may also include one or more sensors such as a sensor that is capable of recognizing a smart cord and/or plug of the disclosure, and may further have the regionalization technology described herein.

Accordingly, embodiments of energy storage units disclosed herein may include an intelligent AC input/output, AC output-only, DC input/output, or DC output-only smart power cord. In various embodiments, the smart power cord includes one or more sensors for detecting characteristics of energy received via the outlet, and may further include one or more microprocessors such as for processing and transmitting data regarding the energy characteristics back to a microprocessor of a smart energy unit to which it is coupled for further analysis. In particular instances, the microprocessor may be configured for transmitting data directly to an ICS or GFC of the smart energy storage unit. In some instances, the smart power cord, e.g., a plug element thereof may include a communications module, as described herein throughout, that is capable of communicating with various other smart assets of the system, such as through the energy cloud.

For example, in a particular implementation, the smart power cord or cable may have a pronged AC plug element that includes first AC power pin, such as a "hot" element, configured for transferring energy, and may have a second "neutral" pin, as well as ground pin. Accordingly, collectively the power pins and ground pin may be configured to interact with a reciprocal female connector portion of an AC outlet, which in some instances may include a smart face plate or may otherwise be a smart outlet. In such instances, the first and second AC power pins are configured so as to connect the smart cord to the AC outlet.

As indicated, the interior of the AC plug element may include multiple sensors, such as sensors that are configured for detecting one or more characteristics of energy to be transferred, such as frequency, current, and/or voltage characteristics of energy that passes through the power pins. The sensors may be any suitable sensors, as indicated, including a proximity sensor, a light sensor, a magnetic sensor, a motion sensor, and/or a pressure sensor, and may be connected with a microprocessor so as to enable the microprocessor to receive and process the information from the sensors, which information and/or data may be sent, e.g., to the ICS and/or GFC through one or more data cables and/or wirelessly. For instance, in one embodiment, a grid stability sensor may be provided, where the sensor is capable of sampling and determining the stability of a grid condition, such as a transmission frequency, in a manner so as to determine the stability of transmission across the grid. In such an instance, when such an instability is determined, the sensor may be configured to communicate this condition, e.g., via a wireless communications module, to one or more of the ICS and/or GFC, and the ICS and/or GFC may be adapted for reconfiguring the system control parameters to smooth out such frequency fluctuations, such as by supplying energy to, or withdrawing energy from the grid, so as to stabilize power transmission. Such a grid stability sensing sensor may be positioned anywhere along the gird network, such as on the electric side, consumer side, and/or adjacent to the control panel or as part of the smart energy storage unit itself, or communicably associated therewith. Further, as set forth above, in various embodiments, the plug side element may additional include a GFCI for added safety precautions.

On the opposite side of the smart cable is a device connector element that is configured for connecting the power cord to the smart energy storage unit. This cable end connector is configured for removably connecting the smart energy storage unit with the AC power outlet so that AC power may be communicated therethrough. Additionally, in some instances, not only is AC power transmitted through the cable, but data and/or DC power may also be transmitted, such as from the smart unit to the processors, sensors, LED lights, clocks, and other associated elements, so as to power the same and/or to allow data to be transferred therebetween.

The device connector element will include a first AC power cable contact, which corresponds to the AC "hot" pin contact, and a second AC power cable contact, which corresponds to the neutral pin, as well as a ground cable contact. A similar configuration may be implemented with respect to DC power transmission. Additionally, the device connector element will include various sensor data cable contacts for transmitting sensor data from the microprocessor to the ICS and/or GFC. Likewise, the device connector element will include corresponding DC power-in cable contacts and DC power-out cable contacts so as to supply DC power to the microprocessor and/or sensors.

As indicated above, the included sensors, microprocessor, and GFCI may be included as safety measures so as to allow for safe, plug-and-play use of the smart energy storage units disclosed herein. Further, as described, a pressure sensor, such as a contact relay, may be present on the device connector element or the housing of the receptacle of the smart unit itself, so as to ensure appropriate connectivity has occurred on the connector element side of the smart power cord as well. As a further safety precaution, the smart energy storage unit and smart cord may engage in energy ingress sampling prior to discharge so as to sample and determine the patency of the smart cord coupling prior to full energy transmission, e.g., discharge.

Further, the smart power cord may also include one or more regionalization elements, such as various region pins and contacts. Any suitable number of region contacts may be included such as two, three, four, or more. Hence, where present, the smart plug element may have a plurality of regionalization pins, and the device connector element will have a corresponding number and configuration of regionalization pin contacts. In various instances, the regionalization pins and contacts may be coupled in a hardwired configuration so as to be present or not present, open and/or closed in a given configuration so as to code for the particular country or region in which the smart energy storage unit is to be deployed.

Accordingly, where the plug element includes a given configuration of pins, the device side connector element will include a corresponding, reciprocal configuration of contacts, such that differently wired smart cables may indicate to the energy storage unit which region the device and plug should be used within. Both the plug connector element and/or the device connector element may include one or more magnetic materials, such as for interacting with reciprocal magnetic materials on the outlet and/or device side connectors, so as to thereby removably secure the cable end connectors with socket and/or smart energy storage unit.

The smart energy storage unit may further include a battery management system (BMS) that is coupled to the energy storage cell. The BMS may be configured to monitor the storing of energy in and the releasing of energy from the energy storage cell in accordance with received instructions, and is configured for determining or otherwise monitoring the amount of energy being withdrawn from or supplied to the local electric grid. The BMS may additionally include some intelligence and/or control functionality that will allow it to manage the operations of the individual fuel cells so as to ensure that they operate within a set of determined and/or predefined operational parameters. An inverter and/or converter, e.g., a bi-directional converter, may also be included. In some instances, a combination of inverters and/or converters can be provided along with a controller having control intelligence for controlling their collective operations, which may be referenced herein as a grid flexible converter (GFC).

In any of these instances, the intelligent GFC may be electrically coupled to the input and the output of the smart energy storage unit so as to receive one or both of the energy to be withdrawn from the electric grid and stored, and/or supplied to the electric grid, so as to meet demand. In various instances, the GFC and/or other inverter/converter, e.g., a bidirectional converter, may be configured for conditioning received energy, such as prior to or post storage. Specifically, the GFC, or other inverter/converter, receives the first form of energy (such as AC current) from the input and converts it to a form capable of charging the energy storage cell so as to produce stored energy. Additionally, the GFC, or other inverter/converter may, at a later time, receive the stored energy from the energy storage cell and may convert it to the second form of energy (such as DC or AC current) for provision to the output thereby discharging the energy storage cell.

In various embodiments, the GFC or other inverter/converter may act as a switch, and/or the smart energy storage unit may include a switch that is coupled to the GFC and/or the input and output. The switch may be configured for moving from an open state, where energy is allowed to flow to or from the circuit of the electric grid and the energy storage unit; and a closed state, where energy is not allowed to flow to or from the circuit of the electric grid and the energy storage unit. A communications module may also be provided such as where the communications module is communicably coupled to one or more of the aforementioned sensor and/or a controller of the smart energy storage unit in order to receive data and other determined information, such as may be transmitted to the storage unit, such as condition data sent from the sensor or other $3^{rd}$ party monitor, e.g., a utility provider or user. Accordingly, the smart energy storage unit may also include a control unit, such as an integrated control system (ICS), that may be coupled to the BMS, GFC, and/or the communications module. The control unit may be configured to receive data, including the sensed and/or determined condition data, from the communications module, and may further be configured so as to provide instructions to at least one of the GFC and the BMS. The provided instructions can regard any number of conditions and responsive configurations and may direct at least one of the GFC and BMS to withdraw or supply energy to the circuit of the local grid in a determined condition based on the received and/or calculated data, e.g., condition data.

Hence, in view of the above, in yet another aspect, the instant disclosure provides a system of plug-and-play smart energy assets for withdrawing and supplying energy to a local electric grid. The smart energy asset system includes a local grid with one or more circuits for the transference of energy within the local grid. Also included in the smart energy asset system is at least a smart energy storage unit coupled to a selected circuit of the local grid, and may include one or more smart assets, such as a smart sensor, e.g., a smart meter or intelligent CT clamps, as well as grid side power generation sources. The smart energy storage unit can be configured to act autonomously or may be configured into a group of smart storage units such that it can either operate on its own or under the instructions delivered by a group control unit, so as to be charged, and thereby withdraw and store energy from the local electric grid, and discharged for supplying energy to the local grid, either on its own or as part of a group. For instance, the group of smart storage units may self-select a group leader, and thereby take directions from the Master Group Unit (MGU), and/or may be configured so as to take instructions from a third party, such as a utility provider, user, other monitor, and/or the like.

Accordingly, in various of these instances, the smart, plug-in-play devices and systems provided herein may be configured and/or deployed so as to perform one or more methods, such as in a manner that is both easy to implement and safe, but is also energy efficient. For instance, in particular aspects, methods are provided for intelligently discharging energy from a smart energy storage unit on a circuit of an electrical grid, such as a household or business grid, where the circuit has a circuit breaker. Particularly, the method may include providing a smart energy storage unit, as herein describe, which has been configured for receiving energy from and supplying energy to the circuit of the electric grid. In such an instance, the smart energy storage unit may include one or more of a plurality of energy storage cells, an input/output, a battery management system, a power control unit, and an intelligent and/or integrated control system. In certain instances, the smart unit may further include a sensor and/or a communications module, and may in some instances be configured to be coupled to, either physically or electronically, e.g., stacked, with other like units. Accordingly, in these instances, the smart energy storage unit(s), may be configured for sensing a need to withdraw or supply energy to the local electric grid, and may effectuate such withdrawal or supply in response to the sensed and/or otherwise determined need.

More particularly, in various embodiments, a typical configuration of a smart energy storage unit of the disclosure may include a plurality of energy storage cells that are configured for being charged so as to store energy, and discharged for the supply of energy. Each individual unit may include an input and/or an output that may be electrically coupled to the energy storage cells, and may further be coupled to the circuit of the electric grid, such as where the input receives a first form of energy so as to charge the energy storage cells, and the output receives a second form of energy from the energy storage cells for supply to the circuit of the electric grid so as to discharge the energy storage cells. Additionally, a battery management system (BMS) may be provided where the BMS is configured so as to be coupled to the energy storage cells, such as where the BMS monitors the storing of energy in and the releasing of energy from the energy storage cells.

Further, in various instances, a power control unit, or one or more of its component parts may be included. For instance, the power control unit may include a converter and/or inverter combination as well as intelligence that is configured for directing the actions of the converter/inverter component. Specifically, in certain instances, a grid flexible converter (GFC) is provided such as where the GFC includes a bidirectional converter that is coupled to or otherwise controlled by a first control unit, which is capable of performing the logical operations attendant to the functioning of the GFC. In particular configurations, the bidirectional converter (or other converter(s)/inverter(s)/rectifier(s)) may be electrically coupled to one or both of the input and the output as well as to the BMS. In such an instance, the GFC may be configured to receive a first form of energy from the input and to further convert it to a form capable of charging the plurality of energy storage cells so as to produce stored energy, and may also receive the stored energy from the plurality of energy storage cells so as to convert it to the second form of energy for supply to the output thereby discharging the energy storage cell.

Additionally, an integrated control system (ICS), e.g., the brains behind the operation, may also be provided, such as where the ICS may include one or more processors and/or associated memories, which may be coupled to the power control unit. Accordingly, in various instances, the ICS may include one or more processors that may themselves be associated with one or more memories, either on board or off, such as where the memory is configured to store data, operational parameters, run profiles, and instructions for performing the various methods herein described. Additionally, a clock may be provided, such as where the clock is adapted for determining the timing of the various system operations. In particular instances, the ICS is configured for sending instructions to the power control unit and/or the GFC so as to monitor and/or regulate or otherwise control the functioning of the GFC with respect to controlling the receiving and supplying of energy to the local circuit of the electric grid.

For example, the ICS may be configured to run one or more programs so as to effectuate the safe discharging of its energy storage cells, such as in an intermittent manner where the ICS determines a first amount of energy to be supplied to the circuit of the local electric grid, for a first period of time of discharge, and at a first rate of discharge. This determination may be made in accordance with one or more predetermined run files, such as stored in the memory, and/or determined by reviewing received data, e.g., such as data received from one or more system components, sensors, and/or third party data providers. Such data may be collated and compiled, and instructions as the results thereof may be generated and sent to one or more components of the device and/or system. Hence, in certain instances, the ICS is configured for analyzing either received and/or generated data, generating instructions, and sending those instructions such as to the GFC.

Specifically, in various embodiments, the ICS effectuates the sending of a first set of instructions to the GFC, instructing the GFC to discharge a first amount of energy from the energy storage cells in accordance with a first rate of discharge for a first period of time. The GFC then receives the first set of instructions from the ICS, pulls a first amount of energy from the energy storage cells, and delivers the first amount of energy to the outlet for supply to the circuit, at the determined first rate, and when the determined first period of time has lapsed, the GFC will then cease to pull energy from the energy storage cells, and will instruct the ICS that no more energy is being supplied to the circuit of the local electric grid.

In such an instance, the ICS may then determine and wait for a second period of time, such as where the smart energy unit is on-line, but idle. However, when the second period of time has lapsed, the ICS may then determine a second amount of energy to be supplied to the circuit of the electric grid, a third period of time during which discharge may occur, and a second rate of discharge. The ICS will then send or otherwise effectuate the sending of this second set of instructions to the GFC to discharge the second level of energy from the energy storage cells in accordance with the second rate of discharge for the third period of time. Accordingly, the GFC then receives the second set of instructions from the ICS, pulls the second amount of energy from the energy storage cells, and delivers the second amount of energy to the outlet for supply to the circuit, at the second determined rate, and when the determined third period of time has lapsed, the GFC ceases to pull energy from the energy storage cells, and instructs the ICS that no more energy is being supplied to the circuit of the electric grid. The ICS may then decide to once more go into idle mode, and/or may decide to repeat the above mentioned steps so as to engage in a safe, intermittent discharge cycle, as described in greater detail herein below, where the smart energy storage unit may safely discharge on to a local circuit to which it is coupled, a quantum of energy with little risk of thereby overloading the circuit and tripping the breaker. This method is useful in those situations where it has not been determined where and what smart assets, appliances, and/or loads are serving any particular circuit of a local grid, such as where an asset mapping protocol has not been performed.

It is to be noted that, if desired, the amount of energy being discharged on to such a local grid may be stepped up or down over the various on-line periods, such as consecutively increasing or decreasing one period from another. Additionally, the length of time between the various on-line/off-line periods may vary, such as determined to be beneficial and/or optimal by the ICS. Similar methods to the above may be employed in a similar fashion with respect to smart charging. For instance, the ICS may be configured to run one or more programs so as to effectuate the safe charging of its energy storage cells, such as in an intermittent manner where the ICS determines a first amount of energy to be withdrawn from the circuit of the local electric grid, for a first period of time of charging, and at a first rate of charge, and may then go idle for a period of time before implementing another charging period.

Additionally, in various embodiments, the smart energy storage units may be configured to condition the energy being supplied to the grid, such as from the unit itself, or externally therefrom. For instance, as indicated above, in certain embodiments, the smart energy storage unit may include an ICS, a GFC, and a sensor, such as where the ICS is configured for computing the line frequency, e.g. at 50 Hz, 60 Hz, and/or the like, such as from a grid stabilization/destabilization detecting sensor, e.g., a Vac sense type of sensor, every 2 or 3 seconds, or less, such as every second or less, such as every $3/4$, $1/2$, $1/4$, $1/8$, $1/16$ of a second, or less. Particularly, in specific embodiments, the line frequency may be computed by the ICS and/or GFC about 60 times a second, 120 times a second, 180 times a second, 240 or 300 or 360 times a second or more. In such an instance, the system, e.g. the ICS and/or GFC and/or BMS may be configured to change the system operating parameters in a manner sufficient to support real-power command within one cycle or less. Hence, if the frequency or voltage of the grid goes up, the system, or a component thereof, e.g., a control unit, may reconfigure operational parameters so as to reduce power command and/or charge. Likewise, if the frequency or voltage goes to low or down, the control unit may reconfigure the system so as to deliver more energy or power to the associated grid. Further, each transaction may be recorded, logged, and/or analyzed, e.g. quantitatively or qualitatively, within a distributed ledger so as to document, track, analyze, and/or predict the history and/or future of events. For instance, the system may then use predictive analytics and machine learning, e.g., an included artificial intelligence module so as to predict discrepancies and generate corrective algorithm parameters to smooth and optimize grid fluctuations, such as those caused by renewables, demand, and localized Distributed Energy Resources (DER), e.g., rooftop solar.

Accordingly, in various embodiments, methods for intelligently charging and discharging one or more energy storage cells, such as of a household smart energy storage unit, using energy received from a circuit of a local electric grid serving a household or business or complex is provided. In such instances, a smart energy storage unit may be provided within the household, business, or complex. As described above, the smart energy storage unit may have an integrated control system, a power control unit (as per above), and a plurality of energy storage cells, such as where the smart energy storage unit is configured for withdrawing energy from the circuit of the electric grid and converting the withdrawn energy into chemical potential energy for storage by the plurality of energy storage cells.

Hence, an easy to implement method for intelligently charging a plug-in-play smart energy storage unit is provided, wherein the method incudes simply coupling, e.g., plugging in, the smart energy storage unit to an outlet of the circuit of the local electric grid. In such an instance, as with smart discharging above, the integrated control system of the smart energy storage unit will determine, by the various methods described herein below, where the unit is physically positioned within the local vicinity, and may engage in one or more mapping protocols so as to determine where it is locally located with respect the various circuits serving the local grid. The ICS may additionally attempt to identify and/or locate any other smart units or other assets, e.g., appliances, in the house, business, or complex, and/or on the circuit to which it is coupled, so as to thereby generate a topographical and/or circuit map of the local, e.g., household grid.

Hence, regardless of whether such a mapping protocol has been performed, the ICS may be configured for charging safely and may do so, such as by determining a first level of energy to be withdrawn from the circuit, a first period of time during which the energy is to be withdrawn and stored, and a first rate of withdrawal. These parameters may be any suitable parameters, but may be bounded so as to be above a set minimum and below a set maximum. Such boundaries may be useful so as to avoid overloading the local circuit. For instance, local circuits may be limited with respect to the amount of energy they can transmit across their lines in a safe condition. Thus, it is useful for the smart energy storage unit to be cautious when charging so as to not pull in energy, so as to charge its depleted energy storage cells, where that energy is above the determined safe limits of the circuit, which in some instances is above 15 A, 1.8 kW. This is made challenging when a mapping protocol has not been implemented, and it is not known which if any appliances are on a given circuit and/or what is their load. In such an instance, the ICS may sample the load on the circuit so as to determine what, if any, appliances are positioned on its circuit and pulling a load therefrom. Such a load will show up as demand. The ICS can then calculate an effective charge potential by subtracting the determined current load on the circuit with the allowable max load for that circuit, and thereby determine the potential amount of energy by which the unit may be charged safely.

The ICS may then generate instructions to be charged at the determined level or amount, or at a lower level in view of this determined data, so as to be safe. Alternatively, the ICS can forgo these calculations and generate instructions to charge at a predetermined low level over a period of time, where it is expected for various reasons that the load on a particular circuit is low or otherwise below the maximal safety level for that circuit. Once the instructions have been generated, the ICS can then instruct the power control unit to withdraw a determined first level of energy from the circuit, at a first rate of withdrawal, for a first period of time. The power control unit, e.g., GFC, will then receive the instructions and effectuate the withdrawal and storage of the first level of energy, at the first rate of withdrawal, for the first period of time as instructed, so as to safely charge the energy storage unit.

Particularly, in a manner such as this, once the first period has been reached, the ICS may then decide to once more go into idle mode, and/or may decide to repeat the above mentioned steps so as to engage in a safe, constant or intermittent charge cycle, as described in greater detail herein below, where the smart energy storage unit may safely charge from a local circuit to which it is coupled, a quantum of energy with little risk of thereby overloading the circuit and tripping the breaker. However, as noted above with respect to smart discharging, in various instances, the periods of charging and/or between charging, if any, can be short or long, or of different lengths of time, and further, the amount of energy being taken in may be greater or lesser in like manner, such that in various instances, the charging pattern may have a stepped up or a stepped down configuration or may be curvilinear, such as to effectuate an optimal charge efficiency.

The summary of the invention described above is non-limiting and other features and advantages of the invention will be apparent from the following detailed description of the invention, and from the claims.

DETAILED DESCRIPTION OF THE DISCLOSURE

Figure 1A:
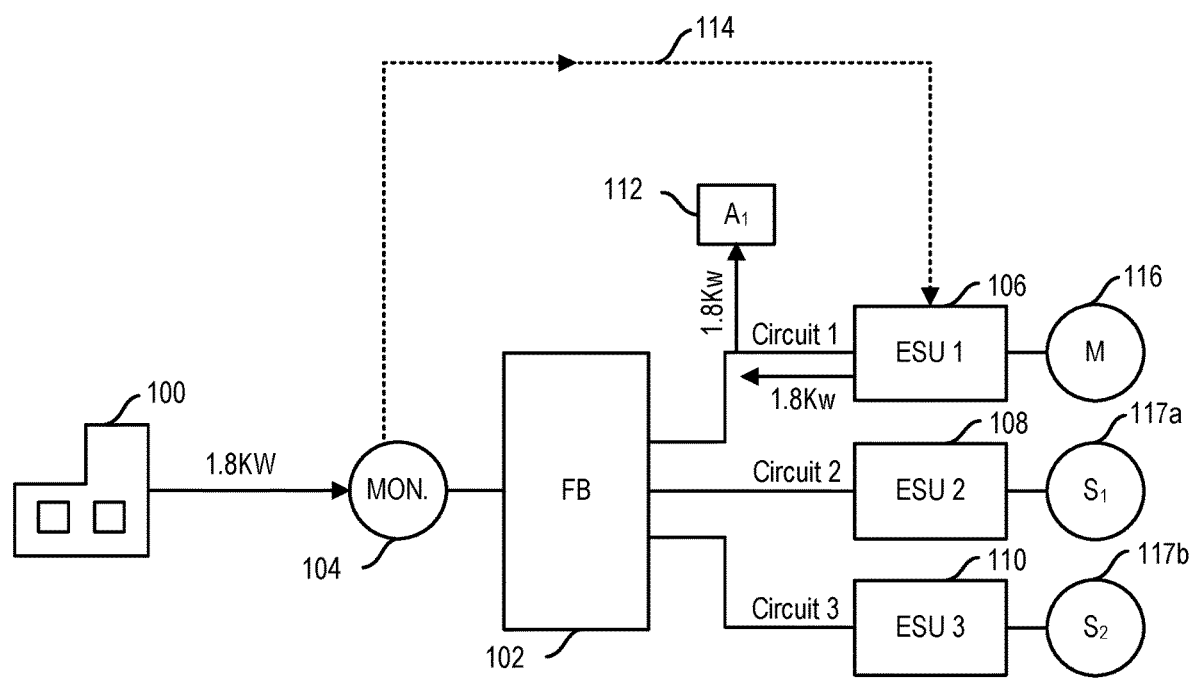
FIG. 1A shows a schematic diagram of an exemplary embodiment of multiple energy storage units connected to circuits of a building.

The present disclosure is directed to plug-and-play devices, systems, and methods for intelligent or smart charging and discharging of energy storage units electrically attached to outlets of a household, building, or complex; as well as to methods for multiple energy storage units to automatically and semi-automatically determine whether they, and other electric appliances and/or assets, are on the same or different electrical circuits so to be able to discharge and/or charge in a smart, safe manner.

Energy storage units and smart storage units described herein may include components that can store and discharge energy. Exemplary energy storage units are disclosed in U.S. Ser. No. 14/341,499, incorporated herein in its entirety by reference. In various embodiments, the energy storage unit may include a housing, such as a housing that includes at least one extended member or wall, such as a mounting wall that is configured for retaining one or both of the energy storage cell and/or a control unit. In certain embodiments, the housing may be of any shape and/or any size so as to accommodate the number of energy storage cells sufficient to achieve the storage capacity desired. In particular instances, the housing may have a plurality of extended members that are configured as one or more sets of opposed side walls, which side walls can be positioned so as to form an opening between the walls. In such an instance, the housing may house one or more energy storage cells, such as a storage cell that may be coupled to at least one of the walls of the housing. The energy storage units may further include a battery management system (BMS) for monitoring and/or regulating the energy storage cells, and an inverter and/or converter, such as a Grid-Flexible Converter (GFC), such as a converter that is configured for converting AC power to DC power (such as for storage), and further capable of converting DC power to AC power (such as for supply). The energy storage units may additionally include a controller that controls the charging of energy storage cells, discharging of energy, analysis of data, and other functions. In particular embodiments, some or all of these components may be fit within the housing in such a manner as to only occupy a space of 2 meters or less, such as 1 meter or less.

Accordingly, in one aspect, the present disclosure is directed to devices, systems including the same, and methods of their use for safely withdrawing electricity from and providing electricity to an electric grid, such as to or from an electric grid system, such as a local electric grid system. In certain embodiments, the herein disclosed devices, systems, and methods may employ one or more smart assets, such as one or more smart sensors and/or one or more smart energy storage units and/or one or more smart energy power generators. For instance, in certain embodiments, a method for smart grid monitoring and/or sensing is provided, which monitoring and/or sensing, and the smart assets involved in such functions, may be employed in various grid control operations, such as for deciding when and how to safely charge and discharge the smart energy storage units provided herein, and/or when and how to take one or more of the smart assets coupled to an electric grid "off-grid" in a safe manner, and in a safe manner re-establish the connection between the asset and the grid, e.g., for going back "on-grid."

Particularly, in various embodiments, when one or more of the smart assets is coupled to the electric grid, the system and its components may be configured so as to determine and/or implement a safe method for engaging in the smart supply to and/or withdrawal of energy from the electric grid, such as by the strategic deployment of the smart chargeable and/or dischargeable grid associated smart energy assets, disclosed herein, so as to safely provide energy to and safely withdraw energy from an electric grid, such as a local electric grid. More particularly, in one embodiment, smart discharging and charging of one or more smart energy storage units is provided, such as where the smart discharging and/or smart charging may include monitoring and/or determining the maximum load being consumed, e.g., the sum of all load(s) on the local electric grid, such as for the supply of energy to a house, etc., and further determining the amount of energy that needs to be supplied by a smart energy asset of the system, e.g., a smart energy storage unit or smart asset power generator, so as to meet the local load demands in a manner sufficient to offset the energy being supplied by the regional macro electric grid in a safe manner and to achieve a net zero effect with respect to the regional macro grid. However, in order to be able to do this efficiently, the smart energy units and/or systems thereof may include one or more sensors.

For example, in particular implementations, the devices and systems disclosed herein may include one or more sensors, such as for assisting in regulating and/or controlling one or more of the smart energy assets and systems in accordance with one or more sensed conditions and/or other communicated data. Particularly, as indicated above, in certain embodiments, a smart energy storage unit is provided, such as where the smart energy storage unit includes one or more of at least one energy storage cell, capable of receiving electric current, such as direct current (DC), and converting it to stored chemical potential energy that may be later returned to electrical current, such as to DC. Accordingly, the one or more energy storage cells are configured for storing energy, much like a battery, and as such may be referred to herein as a battery component.

A battery management system (BMS) may also be included, such as where the BMS is configured for sensing and/or monitoring and/or regulating the functioning of the one or more storage cells, such as with respect to their ability to be charged and discharged efficiently, and within predefined ranges. Specifically, the BMS may include control functionality and/or may otherwise be configured to act as a caretaker for the individual energy storage cells or batteries, and/or to ensure that the individual storage cells work as a combined unit, such as by making sure the charging and discharging of the cells is done in parity. In various instances, the BMS may be configured for sensing, or may include a sensor, for determining the individual and collective status of the energy storage cells, and if necessary, may shut the unit and/or system down, such as if unbalances occur. This is useful because if one or more of the individual energy storage cells is charged and/or discharged in favor of the others, over time this will result in those cells being overused, and more prone to failure, and once out of line and unbalanced, results in other cells not charging and discharging appropriately, leading to limited performance, such as where performance is limited to the weakest energy cell. Hence, the BMS may be configured for monitoring performance, charge, and discharge over time, and can shut the device down, if such inefficiencies lead to an unstable and/or dangerous condition.

Additionally, the smart energy storage unit may include one or more inverters and/or converters and/or rectifiers or other device for receiving AC energy, such as from an electric grid, and converting it into DC energy, such as to charge the energy storage cells within the battery component of the smart unit for storage thereby, and/or receiving DC energy from the energy storage cell and converting it into AC energy, such as for supply to an electric grid, thereby discharging the energy cell(s) of the battery component of the smart energy storage unit. Typically, an inverter performs a one-way inversion or conversion, such as converting DC energy into AC energy, or the reverse, such as converting AC energy to DC energy. However, in various embodiments, the device may be configured for converting one form of DC energy into another form of DC energy. Likewise, a converter is typically configured to perform two way conversions, such as performing a first conversion of AC energy into DC energy, and for performing a second conversion of DC energy into AC energy.

In particular instances, the inverter and/or converter may have intelligence, and therefore may be smart. For instance, the smart inverter and/or converter may include control circuitry, such as a microprocessor, for performing one or more analytical processes, the receiving and sending of information, data, and/or instructions, and for directing the functioning of the smart inverter and/or converter, such as in response to received instructions. For example, during use the smart energy storage unit may include one or more smart inverters and/or converters, such as a grid flexible converter (GFC), that is adapted for receiving the electricity that comes into an electrical network of circuits, such as a local household network, such as where, in an exemplary embodiment, the electricity enters the house at 120V of AC, and is converted into DC energy for storage, so as to charge the energy storage cells of the battery unit, and then is converted back into DC energy, which may then be stepped up or down, and likewise be converted back into AC energy such as for discharge of the storage cells of the battery component and for supply as AC at 120V to the local electric grid. It is to be noted that in certain instances, the GFC and/or other inverter and/or converter is configured for converting a first amount of DC energy into a second amount, which conversion may be done on either or both sides of the battery component so as to achieve the appropriate voltage desired prior to or after storage.

Hence, when coming in and when going out of the battery component, voltage may be stepped up or down so as to achieve maximum efficiency in and out of storage, and can also be stepped up or down for transmission and supply for AC to an electric grid. As indicated the control unit of the GFC of the smart energy storage unit may be configured for performing all of these tasks, and may further be configured to shut the unit down, or go off grid, or idle, if it is sensed or determined that the larger grid network, e.g., the regional macro grid, becomes unstable and/or goes down. Alternatively, rather than shutting down in such a situation, the GFC may be configured to open up the flow of energy out of the smart storage unit so as to allow it to be exported, such as, where in such an instance, the system as a whole removes itself from its connection with the regional macro grid, e.g., in a process called islanding.

In such instances, the GFC may be configured as, or otherwise include, a switch that is capable of transition between metering mode to free flow mode. In particular instances, the GFC may include a computing function that is implemented in hardware, e.g., is analog driven, and in other instances, may be a processor that is configured to run software, such as digitally by implementing computer driven code. For instance, in one instance, the GFC is not configured for implementing software based code, but rather includes hardware electronics that are configured to implement instructions and to perform calculations non-digitally, that is it performs one or more logic loops in analog. More particularly, regardless of its implementation, the GFC may be configured so as to intermittently or constantly be testing the quality of the local electric grid to which it is coupled, such as to determine one or more grid qualities and/or characteristics, such as to determine the quality of voltage, frequency, amperage, and/or other grid characteristics pertaining to grid stability in a manner sufficient to ensure that the grid is working appropriately, and within a range to avoid brown and blackout conditions and/or promote grid promote grid stability, e.g., such as by configuring the system to sample grid transmission and configure the system by increasing and/or decreasing energy storage via the smart energy storage units set forth herein. And, as indicated, one or more of these functions may be performed in an analog configuration, and/or may also include the performance of one or more of these tasks and/or involve performing one or more analytics of the results thereof by implementation as a processor executing programs based on instructions stored in computer readable media, e.g., such as by taking the raw analog data and converting it to a digital signal so as to perform analysis thereon.

Further, a smart energy storage unit of the disclosure may include a control unit, so as to from a master controller, such as an integrated control system (ICS), which ICS may be configured for controlling one or more of the other components of the smart energy storage unit and/or other components of the system. For instance, as indicated, the ICS may be electronically coupled to a communications module, such as for receiving and/or sending information, data, and/or instructions. Particularly, the ICS may include a processor configured for receiving and processing data, accessing information, and performing processes such as analytics on the same, such as for the generation of instructions based on the received and/or generated data, which instructions may be sent to one or more components of the unit or units of the system, e.g., to one or more GFC's, so as to configure them and/or otherwise instruct or control their functions.

Accordingly, in one aspect, a smart energy storage unit is provided wherein the smart energy storage unit is configured so as to be "plug-and-play," that is so as to be fully functional and capable of performing a smart charging and discharging, such as upon being coupled to an electric circuit. For instance, in accordance with the teachings herein, a smart energy storage unit of the disclosure may include a smart plug that is configured for ensuring that the smart unit is not "live" or "hot," when it is not coupled to a suitably configured outlet. Specifically, in such an instance, the smart energy unit is not capable of discharging energy unless certain predetermined conditions are met, the first of which is being coupled to an outlet, and having the appropriate power settings. Further, in some embodiments, once coupled to the outlet, the smart unit will only charge or discharge energy at predetermined safe levels, until a suitably mapping protocol has been implemented, and at least a rudimentary asset and/or circuit map, e.g., a topological map, has been generated. Alternatively, in other embodiments, safe discharging may take place where one or more other smart assets are included within the system so as to form a smart network of assets that can be leveraged so as to allow for a safer deployment of the assets. In certain embodiments, these smart assets may include one or more smart sensors, power generators, and/or other smart energy storage units that are capable of talking with one another, e.g., peer to peer or via an energy cloud or other network, so as to inform one another of their functioning and/or their local grid condition, whereby with this collective of data, any particular smart asset can function within a certain range of safe parameters, such as for providing energy to or withdrawing energy from an electric grid.

For example, as indicated, in various embodiments, the system including the smart energy storage unit may include one or more sensors, such as a smart meter and/or a grid frequency stability sensor, having a controller and/or a communications module, such as for monitoring the electricity coming into a local electric grid from a macro grid, such as through a fuse box. In certain embodiments, a smart meter may not be present, rather a different sensor may be provided, or provided in addition to the smart meter, such as an inductive amp (IC) clamp, current transformer (CT) clamp, and the like. In any instance, the sensor may be configured for measuring a quality of energy transmission through a grid, and may further be configured for communicating the same such as to the ICS of a smart energy storage unit. Accordingly, in certain embodiments, a sensor may be provided, either within the smart energy storage unit or external thereto, such as for sensing a load (e.g., amperage, frequency, and/or volts) on a circuit, or the stability of transmission of electricity across the grid, and communicating the same, such as to the ICS.

In such an instance, the ICS may be configured for receiving the sensed information, analyzing the same, and deriving data therefrom, such as for determining a demand on a circuit, determining over all demand, generating one or more demand curves based thereon, generating a supply curve in response thereto so as to match the demand curve, determining a grid stability and/or instability factor and forming a set of instructions for configuring the components of the system, e.g., one or more GFCs or one or more smart units, so as to implement a corresponding charge of and/or discharge from one or more smart energy storage cells of one or more of the smart energy storage units to thereby withdraw energy from or provide a supply of energy to the local electric grid in such a manner that the supply curve corresponds to the demand curve and/or in a manner the grid stability is achieved, or at least ameliorated. In certain instances, this supply may be configured so as to approximately or precisely meet the demand, and to thus net zero out the local electric grid with respect to the regional macro grid with which it is tied.

Such a response may typically require two different actions. First, the ICS receives data from one or more of the sensors, e.g., a smart meter, IC/CT clamp, or internal sensor, the ICS employs that data to make one or more calculations and/or determinations, generates instructions in response thereto, and then sends or otherwise transmits those instructions or commands to its own or other GFCs for implementation of supply to the grid. Second, the GFC may then receive the instructions from the ICS, which instructions may simply direct the GFC to discharge one or more of the energy storage cells of the battery component so as to supply the requisite energy to the local electric grid, such as in correspondence with the generated demand curve. In particular instances, the instructions may be informed by the collection of frequency, wavelength, and/or amplitude data relating to grid stability, and may further direct the characteristics, e.g., voltage, frequency, waveform, amperage, of what the energy stored within the storage cells should be released at. Consequently, in certain embodiments, the GFC, in response to the received instructions, will pull the requested energy from the battery component and direct its discharge to the electric grid while transforming it in such a manner as to have the instructed and/or predetermined characteristics.

Specifically, as an example, when supplying energy to a local electric network, the energy may be required to be in one or more forms having one or more pre-determined characteristics, such as a set voltage, such as at 120V, and may be required to have a specific parameter range, such as within 50-60 MHz, and/or be within a certain limit, such as under or up to 15 A, which characteristics may differ region by region. In such an instance, the GFC may condition the energy being released onto the electric grid so as to have the prerequisite characteristics, or at least to fall within certain prescribed ranges with respect thereto. Accordingly, once instructed, the GFC then pulls energy from the energy storage cells directly. Likewise the BMS may monitor the flow of energy out of the battery cells, and if necessary, may shut the system down if things get out of balance with the storage cells. In various instances, the BMS may also perform some minimal computing around battery cell management as well as reporting as to how much current is being pulled, from where, and in what condition.

Hence, in an exemplary form, the ICS tells the GFC to pull up to about 15 Amps, e.g., 1.8 kW, and the GFC in turn pulls the requested about 15 Amps from the energy cells, while the BMS monitors this activity and reports to the ICS that about 15 A were in fact pulled, at what rate, with what quality, while at the same time monitoring the conditions of the energy cells and whether any individual cell is out of balance and/or heating up too much. For instance, in one embodiment, as set forth in greater detail herein below, the sensor may be configured for communicating the amount of energy being pulled off of the macro grid so as to meet the needs of the household, building, or complex, and in response the ICS may then determine how much supply would be required to offset that demand and may therefore instruct the GFC of one or more of the associated smart energy storage units to discharge that amount of energy onto the local grid so as to supply the load demand on the local circuit thereby net zeroing out the demand of the household on the macro grid.

Additionally, another sensor may be provided, such as a sensor configured for determining a condition of a grid and/or a quality of energy being transmitted across the grid, such as what its characteristics are with regard to voltage, frequency, and amperage. For example, a sensor internal to or external from the energy storage unit may be included such as where the sensor is configured for sampling energy being transmitted through a circuit and making a determination as to the quality of transmission and/or a determination as to the overall quality of the grid, such as to determine whether the grid quality is diminishing and/or likely to go down, such as when a brown or black out occurs or is about to occur. Particularly, energy flowing across a grid may be sampled, and if it is determined that the frequency is becoming erratic, e.g., outside of its predetermined range, such as outside of its 50-60 Hz range, and/or the voltage and/or amperage is driving to zero, then the sensor may communicate a warning to the ICS as to the risk of the macro grid going down thereby allowing the ICS to determine whether to shut the system down and/or make an adjustment to its current running protocols, such as determining whether to go off grid immediately, wait and see if the grid quality will be restored, go into idle mode, simply note but stay on-grid, or send a notification to the user with a prompt awaiting user commands. Accordingly, in various instances, a system is provided wherein the system includes a smart energy storage unit including a plurality of energy storage cells, a BMS, a GFC, and an ICS, and in some instances, the system may additionally include one or more sensors, such as a smart meter, CT clamp, or the like that are capable of interacting with the smart energy unit, such as by implementing a suitably configured communications protocol.

Further, in such instances, such systems may be configured for withdrawing energy from an electric grid, such as at non-peak times, and may further be configured for supplying energy to the electric grid, such as during peak energy use times, and in some instances to net zero out local grid side demand. Likewise, such systems may also be configured for going off line and/or of grid, such as when a sensor of the system recognizes instability in the utility grid, such as based on grid characteristics, such as quality of energy transmission across the grid. For instance, as indicated, in various embodiments, one or more of these sensors may be external to the smart energy storage unit, however, in various instances, one or more of these sensors may be internal to the smart units. Particularly, in some implementations, the GFC may be configured to sense or may otherwise include a sensor that samples and/or senses energy being drawn into the smart energy storage unit, such as for storage, so as to determine flow quality and/or grid stability, and if need be can instruct the unit, e.g., the ICS, to go idle, offline, and/or go off-grid, so as to protect the unit from wide grid fluctuations.

For instance, in various embodiments, it may be useful for the smart energy storage units and/or their components to have the capability for taking the storage units and/or the system completely offline and/or off grid. Particularly, the smart energy storage unit and/or system may be configured for islanding itself and/or otherwise being islanded. Specifically, if the macro grid becomes unstable and/or goes down, the smart energy storage unit may become islanded and/or otherwise take itself offline and/or off-grid, and when determined safe, e.g., the grid becomes more stable, the smart energy storage unit may go or otherwise take itself back online.

More specifically, as indicated, in various embodiments, the smart storage unit may include or may otherwise be associated with one or more smart sensors, such as an external sensor, for detecting grid quality, which may be used in this manner. However, in other embodiments, such an external sensor is not particularly necessary, as the device itself may be configured for performing such a sensing function and/or for taking the unit and/or system on and off grid. For example, the GFC may be configured such that as it functions it continuously taps into the electricity of the local electric grid and samples it. Hence, as energy enters off the electric grid and into the smart energy storage unit via the GFC, the GFC may perform two or more functions on the energy. First it may sample it, and second it may convert it such as for storage.

Particularly, as indicated, in a first instance, the GFC may convert the received AC energy to DC energy such as for charging the battery component and storage thereby, and may, e.g., at a later time, convert the DC energy into AC energy such as for discharging the battery component and for supplying to the local electric grid, or an appliance connected to the energy storage unit. More particularly, the GFC may be configured so as to continuously reduce and/or sample the energy, such as where the electricity to be sampled is reduced into milliamps and millivolts and/or characterized in an analog form, which may then be analyzed directly or sent to the ICS so as to be analyzed. Once received by the ICS, if necessary, an analog to digital conversion of the sample takes place, and an analysis and/or determination may be made.

For instance, since electricity may be characterized as a waveform, it may be considered as analog data, which data may be obtained by the GFC, sampled, and further data generated with respect thereto. However, once transferred to the ICS, that data may be digitized and analyzed, such as for determining what the voltage, the frequency, and amperage are, and what their overall condition is, e.g., with respect to a known or derived standard. This characterization can be done remarkably quickly and efficiently, such as on the order of one cycle a second, or millisecond, or microsecond, or less, such as 60 cycles at 50 or 60 Hz a second or less. This is useful because it allows the unit and/or the system to make decisions on the fly, such as within seconds, milliseconds, microseconds, and more.

Hence, when a brown or black out condition is determined to be imminent, such as when the voltage and/or the frequency of the electricity flowing over the grid drops and/or becomes erratic, the GFC/ICS will perform its sampling, determine the danger, and send a signal to the GFC instructing it to enter modes such as grid-support discharge, master offline, unit shutdown and/or entire system shutdown within seconds or fractions thereof. In such an instance, the ICS may send a signal to the GFC instructing the GFC to go from grid master mode, where the GFC in its conditioning of the energy being transferred follows the grid, to master mode, where the GFC conditions the energy to be transferred in accordance with its own, predefined, e.g., pure, standards. Thus, once the units are islanded and in master mode, the collective of smart energy storage units may be off-macrogrid, but still on-line locally, and can now begin supplying the energy needs of the local grid, e.g., the household to which the smart unit(s) are coupled. Additionally, if suitably configured, the ICS can also signal to bring local smart power generation online, or instruct that these be done manually.

Specifically, in various embodiments, once a grid instability is determined, the ICS may go into master mode, where instead of following the gird's lead with respect to the conditioning of energy to be released on to the electric grid, it rather conditions the electricity based on its internal standards. This is useful because in slave mode when discharging, the smart energy storage unit stays within the predetermined grid parameters with respect to voltage, frequency, and amperage as required by the macro utility grid. However, when the macro grid shows signs of potentially going down, the system or individual unit(s), may go into master mode, where the breaker may be tripped so as to island and protect the local grid from the deficiencies of the macro grid, and rather than following a diminished energy transfer waveform, a more pure standard, e.g., internally generated, may be followed.

If the smart system or units thereof were not to go off grid, such as in a black out condition, an energy vacuum would be created on the utility side of the grid, which would rapidly pull the energy from the energy storage cells, resulting in their quick depletion thereby rendering them useless for supplying the needs of the local electric grid in a blackout condition. Consequently, the system and/or individual smart energy storage units may be configured for taking themselves offline should such an event occur or otherwise be threatened. For instance, in master mode, and in order to provide energy to the local grid in the event of a threatened brown or black out or other grid instability in the macro grid, the ICS of the smart energy storage unit may decide to protect itself by taking the unit and/or the system by going off grid. In such an instance, the ICS may instruct the GFC to deliver a high amplitude pulse through a connected circuit, such as where the amplitude is high enough to trip the breaker of the fuse box so as to take the system, including the entire local grid, e.g., household, off-grid, but not high enough to permanently damage the circuit. Particularly, by sending a high enough pulse, e.g. 30 or 40 or 50 or 60 or 75 A or more, from the GFC to and along the circuit, the breaker box may be tripped, and once tripped, then the storage unit(s) can begin to safely meter out its stored energy so as to meet the demand load of the local, islanded grid, which energy may or may not conditioned on local standards, such as supplying energy within a range of 15 A, 50 Hz, and 120V. In such an instance, the breaker and/or fuse box may be used as a switch point for going off and on grid.

Further, in various embodiments, the smart energy storage unit and/or the system as a whole, may be configured for communicating with other units that are or may not be part of the system and/or for communicating with offsite command and/or control centers, systems, or even third parties. These communications can take place in a number of different manners employing a variety of different protocols, such as for peer to peer communications, such as via being directly or indirectly wired together, or wirelessly, such as through BlueTooth, Low Energy BlueTooth, WiFi, cellular, PLC, or other form of radio transition, such as via a suitably configured transmitter and receiver, such as through Zigbee, and the like. For example, each unit and/or the system may be coupled one to the other such as through an internet connection, such as through the cloud, e.g., an energy cloud, and in certain embodiments one or more third-parties and/or users of the unit and/or system may also be connectable together, such as through the energy cloud and/or an application, e.g., an "app" that allows the unit and/or system to be accessed through a user interface on a computing device, such as a mobile smart device.

In such an instance, e.g., where the macro grid has gone or is going down, and/or the system or a unit thereof is going off-grid, a message may be sent via the energy cloud to one or more parties such as for sharing that the grid is or is about to go down, such as to the regional utility provider, user, or other third party, thereby allowing the messagee to then respond to the message, and/or instruct the response and/or configuration of the system, such as to immediately go off-grid, enter a wait and see mode, so as to wait to see if things become more stable for a given time period before going off-grid or deciding to stay on-grid, and/or the messagee can instruct the unit and/or system to ignore the brown or black out condition, and/or simply go offline, e.g., idle mode, until instructed otherwise. This last is useful in situations where the macro grid has a history of being unstable and going down for short periods of time periodically.

However, in certain instances, the unit and/or system may be instructed, and may attempt, to go off-grid, but may not be able to trip the breaker in the first attempt. It may, therefore, make a second attempt to trip the breaker such as by sending another high energy pulse, such as at 75 A over one or more, e.g., 3-5, or more seconds, so as to once again attempt to trip the breaker and take the system off-grid, If again this doesn't happen, one or more other attempts may be made or the system and/or unit may be configured to make X attempts and if not successful, to then go offline or otherwise shut down, and send a message that it was not able to go off-grid and that it may be taking itself offline. It is to be noted that the fuses in the local network system, e.g., the house, may be too old or may malfunction, and may not be able to implement this functionality, and such an instance, this functionality may be disabled in the setting and the unit and/or system will not be able to go off grid in this manner. Likewise, if the breaker is tripped and the user or a third party tries to re-set the breaker, e.g., even though the grid is down, then the system can be configured to attempt once more to re-trip the breaker, or may go into offline and/or idle mode where discharging is ceased, until brought back on to grid coupled, e.g., grid servant mode, despite the attempted restart by the user.

Accordingly, when the grid comes back and/or stability is otherwise restored, the system and/or its individual units may be able to be brought back online and/or on-grid. For instance, when stability is restored, the utility provider or other third party may message one another, e.g., via the cloud and/or app, which message may indicated that the grid is now functioning within normal parameters. In such an instance, a re-grid entry protocol may be initiated whereby the unit(s) stops discharging, the breaker is re-set, e.g., either manually, mechanically, or electronically through received data or analog signal, and the GFC resynchronizes with the regional macro grid, and may go back to discharging at any preset or user selected preferences, such as that of scheduling the meeting of energy during peek demand. Likewise, the app may confirm that the user is ready to go back on-grid, and once confirmed, the ICS may receive a "good to go" message from the app, may then instruct the GFC to go back to on-grid slave mode, and the system may then go back to net-zeroing household load demand.

Hence, in various instances, a smart energy storage unit and/or the system as a whole may be configured for not only meeting a load on a circuit to which one more of the units are connected, but may further be configured for net-zeroing the demand of the local electric circuit, e.g., household, so as to effectively remove its demand on the regional macro grid. In such an instance, a single smart energy storage asset may be used to meet the local electric grid load demand, or a multiplicity of smart energy storage units and/or assets may be employed collectively as a system to meet that demand, e.g., based on the number and configuration of units and/or assets deployed. Net zeroing in this manner may be simple or complex.

For instance, the unit and/or the system may be configured so as to determine load on one or more, e.g., the entire, circuit(s) on a local electric grid or network of grids. In such an instance, it may simply be a zero-sum calculation, performed by the ICS, such as in combination with a smart sensor or meter, whereby the meter monitors and/or otherwise determines how much energy is coming in off the regional macro grid so as to supply the load demand of one or more circuits, e.g., the entire load demand of the local network, such as the house, and then transmits that data, e.g., directly or via the energy cloud, to the ICS, where the ICS performs the appropriate calculation to determine the amount of energy that would be required to be released by the energy storage cells of the unit to equal or otherwise meet that demand, and then instructs the GFC to discharge that amount of energy, assuming for this example, that a single smart energy storage unit has the capacity to meet that demand, e.g., for at least supplying the circuit to which it is coupled. In various instances, the local electric grid may include a power generation source that may be a smart power generator in communication with the smart energy storage unit, e.g., via peer to peer, the cloud, etc., and in such an instance, the calculation may also account for the amount of power being generated, which in certain embodiments, may be released onto the local grid so as to help meet the local need, and thus, help zero out demand on the regional macro grid.

Hence, the calculation may be similar to determining: how much capacity the single unit has for supply to the local grid+how much production is capable of being supplied−how much is being consumed (load/demand)=how much and what type of energy needs to be discharged by the battery component, so as to zero out the grid side draw and provide short fall. In such an instance, only the delta amount between what is being consumed and what is being produced, need be discharged so as to net zero what is being taken in off of the grid. In this example, it is assumed that a single smart energy storage unit has the capacity to meet the needs, e.g., load, of the local grid. However, such may not be the case, and in such an instance, as explained in greater detail herein below, the collective of smart energy storage units may be deployed collectively to meet the overall local grid demand.

For instance, in various embodiments, as described above, a system may be provided, such as where the system includes one or more smart sensors, e.g., a smart meter, and one or more, e.g., a plurality, of smart energy storage units in communication with the one or more smart sensors and/or meters. However, when a plurality of smart energy storage units within a local energy grid are brought online so as to form a system, various complications arise, which must be accounted for so as to regulate and control the charging and discharging of the individual and collective storage units in a safe and efficient manner. Particularly, when only one unit is present it is relatively easy to control the charging and discharging of the smart energy storage unit in a smart manner.

For example, where only one unit is online and on-grid, then there is no need for synchronization between units, as there is only one unit. Rather, the single unit receives the measurement of the incoming energy need, e.g., demand, from the smart meter or sensor. Specifically, as the energy leaves the regional macro grid and enters into the local grid through the fuse box it is sensed by the smart sensor and/or meter and then the data representing the quantity of energy coming in is sent to the ICS of the smart energy storage unit. Particularly, the smart sensor, which may be a smart meter, and the smart energy storage unit may include or otherwise be associated with a communications module such as for conducting communications between the various components of the system, such as via a communications protocol, such a Wifi, BlueTooth, Zigbee, etc. For example, in one configuration of a system of the disclosure, a first sensor may be provided, where the first sensor may be inherent to or electronically and/or communicably coupled with the smart energy storage unit, such as for sensing and/or determining how much demand is being generated in the house.

This determination may be made with reference to the sensor or sensors sampling the gird associated with one or more loads in such a manner that as the load comes online and/or on-grid, the sensor senses the load, and communicates the same to the ICS. This sensing function may be implemented, for instance, by attaching the sensor, such as a CT clamp, proximate the connection where an energy requiring appliance, e.g., load, connects to the electric grid. Any suitably configured sensor can be used for these purposes such as a CT clamp or other sensor having a current transformer, such as where the clamp may be applied on or around the electrical wires, and includes an electro inductor that measures the voltage, frequency, and/or amps going into the house or being pulled into an appliance, and sends that data to the ICS.

The various sensors therefore can talk to each other and/or the smart units, such as directly via peer to peer communications protocol and/or over WiFi, ZigBee, the internet, energy cloud, and the like. In certain instances, the smart sensor or meter can talk directly to the ICS, GFC, e.g., smart converter or inverter, another smart sensor, smart cords, 3rd party communications module, etc. Accordingly, in certain instances, the appliance itself, or one of its component parts, may have a communications module that sends a signal to the ICS of the smart unit so as to inform the ICS of the load being required by the appliance, in this instance, an independent sensor may not be necessary, although may be used to confirm the signal. In any of these instances, the system is configured for determining the load on the circuits due to the appliances coming or being online, and then sends that information to the ICS so that the ICS can instruct the storage unit to meet the sensed or otherwise determined load.

Additionally or alternatively, an other sensor may be provided, as indicated above, such as where the sensor, e.g., a smart meter, is positioned proximate the fuse box, such as where the macro grid connects to the local house grid. Such a meter or sensor may also be positioned approximate any other source, e.g., local source, of power generation so as to determine how much energy is available for or being supplied to the grid such as on the local side, and for communicating the same to the ICS so as to allow the ICS to appropriate manage and/or configure the supply of energy to the local electric grid.

Once the amount of energy going in and/or the load is determined, this data may then be sent to the ICS so as to enable it to perform its calculations and determine how much energy needs to be discharged from the smart energy storage units. Once this is determined, the ICS may send the appropriate command to the GFC to output the calculated energy in the determined condition (e.g., in the required frequency range and/or amperage) over the calculated time, and/or with the appropriate frequency, voltage, and amperage, etc. This may be done, for instance, where the load from house equals the demand or pull from the grid as measured by the smart meter, which is then communicated to the communications module and ICS od the smart energy storage unit. The smart energy storage system and/or unit then allocates energy to be supplied to the household to from one or a plurality of smart batteries in the system to net zero out the load on the electric grid. In such an instance, once the load data has been received the ICS then calculates how much energy is required to meet the local demand, and/or determines how much capacity the energy storage unit has for meeting the demand, accounts for the local grid conditioning requirements, and then instructs the GFC to discharge the battery cells in accordance with the local grid conditioning requirements.

For example, where the local electric grid requires that energy be transmitted within particular preconditioned parameters, the GFC may precondition the release of the stored energy so as to be in an amount and a condition to be transmitted within the required parameters, such as where the local electric grid requires the energy to be transmitted in the form of about 120V, 50-60 Hz, and/or 15 A so as to be safe, the GFC will release energy in that condition and up to an amount that is safe. However, various other factors may need to be considered when releasing such energy in a safe manner. Specifically, in order for the discharge from the smart energy storage unit to be safe it must be determined how much energy may safely be discharged on to which circuit(s) and in what condition, e.g., amperage, without risk of overloading and/or super heating the circuit.

For instance, as indicated, if all the appliances on a circuit, such as within a house, and/or on a local network have a smart sensor and/or communications module associated with it, it will be possible for the appliances to talk together and/or with the smart energy storage units so that each appliance can tell each unit, e.g., of a system or a sub-portion thereof, where it is positionally so that it can be determined, as explained in greater detail herein below, where all of the appliances are locationally relative to the various circuits of the local grid, e.g., a circuit map may be formed of the local electricity grid. In such an instance as this, e.g., where a relative circuit map has been generated, smart discharging becomes a simple matter of determining the over all load coming into the house, determining the load on any or all circuits, and discharging the smart energy storage unit to meet the load as determined and/or communicated by the sensors and/or various appliance communications modules in a manner that doesn't overload the circuit. However, in a system where the units cannot or do not communicate with one another, such discharging can still be performed but in an iterative manner of starts and stops.

For instance, once the amount of energy being pulled off the macro grid has been determined, and how much needs to be discharged from one or more of the smart energy storage units so as to be net zero, it then must be determined if a given smart energy storage unit is capable of discharging on to a circuit safely. Specifically, the circuits of a household, such as in the United States, are configured to transmit energy at a maximum of 20 A, which in accordance with regulations is practically limited to 15 A, so as to ensure the patency of the electric grid and avoid any risk of overheating and/or fire. What this means is that as energy is pulled into the local grid, e.g., the house, from the regional macro grid, it enters through the fuse box and is then split among the various circuits of the house according to their need, e.g., the load on each particular circuit. If any one circuit pulls greater than the allowed safe amperage, in this instance 15 A or 1.8 kW, then the circuit breaker in the fuse box, which regulates that particular circuit, will trip and take that circuit off-line. A dangerous occurrence such as this may occur, for instance, where any one circuit is coupled to one or more appliances that when turned on individually or collectively pull in excess of 15 A on that circuit. In such an event, if all of the appliances are on at the same time, it will cause the circuit breaker to trip as the energy being pulled off of the macro-grid flows through the fuse box.

Obviously, in such an instance, it would not be safe for a smart energy storage unit coupled to the circuit to discharge in this instance. This can ostensibly be avoided by including a smart meter and/or sensor, as discussed, adjacent to the fuse box and/or circuit that signals the amount and/or characteristics of the energy entering into house and/or that circuit, which signal communicates to the ICS not to discharge but to have the unit remain idle so that the circuit breaker can recognize that the load being drawn is beyond the prescribed limits. However, in the absence of such monitoring, communications, and/or the mapping discussed briefly above, a dangerous situation may occur if the smart energy storage unit fails to sense that the amount of energy being pulled from the macro grid down its associated circuit is above 15 A.

For example, as discussed in greater detail herein below, if four appliances that each pull 5 A are positioned so as to be on a single circuit, and they all go online together, normally this would trip the breaker as the 20 A is pulled entirely through the breaker box. However, if a smart energy storage unit were connected to the circuit, it would, absent sufficient safety mechanisms and protocols, supply at least 15 A of the necessary energy to offset the load on the circuit. It would not, however, supply more than 15 A as that would be in excess of the predetermined allowable amount of energy to be transmitted across the local electric grid. However, even though the smart energy storage unit would only supply 15 A of energy, the load would still be 20 A, and the remaining 5 A, therefore, would be supplied by the macro grid.

The fuse box, if not configured for communicating with the smart energy storage unit would therefore only register that 5 A is on the circuit, when in actuality 20 A is being supplied to the circuit, e.g., 15 A being supplied on the consumer side by the smart unit, and 5 A being supplied on the utility side of the grid, and hence a dangerous condition would possibly be present. Accordingly, to avoid such danger in discharging, e.g., in circumstances where all of the relevant grid assets do not communicate with one another, the smart energy storage unit may be configured so as to perform its discharging, such as to net zero the circuit, in a pseudo-smart manner, that is in an intermittent manner.

Specifically, the smart energy storage unit may be configured for performing a smart discharge so as to supply energy to a circuit where it may not be known how many and what appliances are drawing energy from that circuit and/or how much energy those appliance are individually and/or collectively drawing. Such discharging, as indicated, may be intermittent so as to give the system, including the concerned circuit and/or grid, the ability to work as designed within a reasonable period of time, which is to let the fuse and/or circuit breaker do what it is designed to do: recognize that the unmitigated circuit has 20 A flowing across it and therefore trip.

To effectuate such a strategy, the ICS may be configured to instruct the GFC to discharge a predetermined and/or calculated amount of energy over a given period of time and only for the given period of time. Once that period is over, the ICS will instruct the GFC to cease discharging for a period of time, which period of time will be long enough to allow energy for supplying the load(s) on the circuit to flow from the macro grid across the circuit breaker and to the local grid circuit such that if at any given period of time the load on the circuit is above the prescribed limit, e.g., above 15 A and/or 1.8 kW, the circuit breaker will recognize this, heat up sufficiently, and trip. If the circuit breaker does not trip after a sufficient period of time, then the ICS will instruct the GFC to once again discharge the predetermined and/or calculated amount of energy over the given period of time and then to cease discharging for a given period of time. This pseudo-smart discharging will be repeated as often as necessary so as to supply the needs of the loads on the circuit in a manner sufficient to at least partially offset the demand from the macro grid.

It is useful to determine the appropriate ratio of on-discharge time/off-idol time so as to more efficiently supply the needs of the circuit in a safe manner. Specifically, the on period should be long enough to allow the discharging of the battery component to have a significant effect on load reduction without significantly risking overheating, and the off period should be long enough to allow the circuit breaker to experience the full load and trip if overloaded. Accordingly, the ICS may include a microprocessor that performs the requisite logic and calculations, forms the necessary commands pursuant thereof, and sends those commands to the GFC for outputting the determined amount of energy for the determined amount of time, and then ceases the discharge again for a determined period of time before resuming the discharging once me, such as in cyclical fashion.

In various embodiments, the energy being released may be conditioned so as to have a determined waveform, that is at a determined voltage, with a determined frequency, while delivering a determined amperage. The GFC then creates this waveform and pulls the requisite energy from the energy storage cells at the instructed amperage. Hence, in various instances, the GFC acts as a regulator for the flow of energy opening and shutting off the "tap" as instructed by the ICS. It is to be noted that in some instances, the GFC may be a hardwired, analog system that receives the instructions, e.g., digital instructions from the ICS that may be converted into an analog form when transmitted to the GFC, which GFC then implements those instructions by performing the necessary logical operations in an analog, hardwired form. A suitably configured sensor, e.g., a heat sensor, may also be included proximate the coupling of the smart energy storage unit to the local grid to confirm that the discharge is within safe parameters.

Accordingly, in manners such as these set forth above, the amount of energy coming in off the grid may be detected and communicated to the smart energy storage unit, so as to determine the amount of energy that needs to be offset, and the smart energy storage unit may then be deployed to discharge it's energy cells so as to offset that amount of energy in a safe manner. Hence, the individual storage unit may be configured for determining the amount of energy needing to be discharged so as to offset the load at least on its associated circuit, if not the entire grid, and thus, can be configured to offset up to that amount of energy, assuming it is not above the prescribed limits, e.g., not above 15 A/1.8 kW in some instances. Where the entire amount of energy being drawn into the local electric grid, e.g., household, is less than 15 A/1.8 kW, spread across the entire house, then a single smart energy unit will be capable of completely meeting the need of the household, as the energy it supplies will be transmitted up through the fuse box and down the other various circuits upon which there is demand.

In specific instances, the goal is to supply only enough energy to meet demand and therefore achieve a net zero with respect to the regional macro grid, rather than over discharge and/or export energy on the regional macro grid. In such an instance, the ICS may be configured so as to instruct the GFC to only discharge an amount of energy equal to the load on the local electric grid, and no more, so as to not be a net exporter of energy on to the regional macro grid. Further, as indicated, such discharging may be performed in a safe mode where the discharging is periodic and at a prescribed amount of energy, such as at 3 A, as an initial discharge.

However, in certain instances, the amount of energy to be discharged can slowly be ramped up, over time, e.g., over one or more time periods, so as to slowly and/or periodically, increase the amount of energy being supplied to the local electric grid during each time or period, such as to 5 A, 7.5 A, 10 A, and the like. However, even though the amount of energy to be discharged may be increased, it generally may only be increased to the maximum prescribed level for that circuit. Additionally, the periods of discharge should be interspersed with periods of quiescence, e.g., an off period. This off period may be any suitable time period so long as each off period provides a long enough time so as to allow the circuit to heat up, if in an over-loaded condition, and the fuse at the circuit breaker to recognize that an overloaded condition is occurring and flip. In such an instance, the circuit breaker will trip, and the load on the circuit will depend solely on being met by the smart energy storage unit as energy will not be able to flow on to the grid from the utility side. However, when the ICS realizes the extent of the full load and determines that the load is above the prescribed limit one or more of three options will occur. First, it will send off a warning signal. Second, it will only discharge to the prescribed limit. It will go off-line and/or into idle mode.

Likewise, with respect to charging the storage unit, in addition to discharging, it is important to ensure that too much energy is not pulled across the circuit at any given time. For instance, if the smart energy storage unit were to be charged at its maximal allowed rate, e.g., given the characteristics of the local electric grid, such as by drawing in 15 A so as to charge the energy storage cells, this would be safe if there were no appliances coupled to the local circuit drawing in energy. However, if one or more appliances were to also draw energy from the same circuit of the electric grid in addition to the smart energy storage unit, which is charging at its maximal rate, then the circuit would be pulling and transmitting in excess of the 15 A limit, and the circuit breaker will trip, as it is designed to do. The more this happens, the more annoying it will be for the user and/or the more damaging it may be for the circuit breaker. Accordingly, as described in greater detail herein below, mapping the individual and/or collective circuits will be useful for the charging as well as discharging the smart energy storage units.

Particularly, in a situation where one or more, e.g., none, of the circuits of the local electric grid are mapped, then an intermittent charging paradigm may be implemented, similar to that disclosed above with respect to the discharging of the energy storage units. For example, the smart energy storage unit may be configured to charge at a constant rate for a short period of time, which period of time can be increased into longer and longer periods of time, such as until a constant charge rate is achieved. Likewise, the amount of energy being drawn into to the smart energy storage unit, such as through the GFC, may be increased over one or more periods, such as in a manner so as to be stepped up periodically over time to increase the amount and/or rate of charging (which may likewise be done in reverse such as for discharging as well). In a manner such as this, the energy storage unit may be charged for a period of time, at one level, and then stopped, and/or then charged at a subsequent, e.g., higher or lower level, for an additional period of time. This iterative and/or periodic charging may then be repeated as necessary so as to charge the smart energy storage unit fully. It is to be noted that the stepping up allows a higher charge efficiency to be established as more charge is taken in over a given period of time, where the iterative stepping up, such as in periodic bursts, also protects the circuit from over heating, such as where one or more appliances comes online during the charging process. Further, a maximal charge rate can be determined so that the expected load on a circuit during a charging process can be accounted for and/or the charging can be selected to be at a level and/or at a time and/or on a circuit where a maximal charge rate may be achieved and/or maintained.

Additionally, it is noted that this process of charging, as like with discharging, can be enhanced by performing a suitable electric grid/load mapping operation as described herein below. For example, it is useful to know what other loads, e.g., appliances, are on a given circuit when charging or discharging the smart energy storage unit so too much energy is not withdrawn from or supplied to a given circuit of a local electric grid, especially, where and when one or more appliances may come online and whose load must be accounted for during a discharging and/or charging operation. Particularly, if too much energy is pulled from or pushed on to the circuit the circuit breaker may either trip or the circuit may overheat thereby causing a dangerous condition. Hence, the iterative charging and discharging as herein presented is useful for mitigating if not avoiding such dangerous conditions.

There are, however, certain drawbacks to this process of periodic and/or episodic chargings and dischargings. For instance, although episodic discharging prevents a circuit from experiencing an overloaded condition for a period of time long enough to cause damage to the system, such as by overheating, it nevertheless, also can prevents the smart energy storage unit from being able to fully expend its charge within a demarcated period of time of maximal usage.

For example, in one exemplary scenario, if for a given macro grid region a peak demand time-period lasts 6 hours, and it takes 2 hours to expend the capacity of a storage unit running at a full discharge rate, e.g., 15 A/1.8 kW, then in order to get the full offset use of the storage unit, the user would have to be home and/or the system online for a period of time long enough to allow the smart energy storage unit to episodically discharge its entire capacity, such as for the prolonged period of time it takes the unit to discharge that capacity in the intermittent discharge mode. If the system is online and on grid long enough for this to happen, then the user would get the maximal benefit of the system. However, if the user were to only be home for an hour during the peak time usage period, but for that hour the energy load on the local grid spiked, then while the storage unit is in the intermittent discharge mode, the user in this scenario, would not get the full, maximal benefit of the storage device and/or system, as only a portion of the capacity would be able to be discharged during the "on" or discharge periods, and there would still be a capacity of energy left within the energy storage cells. This, therefore, is inefficient.

In such instances, the ICS may be configured to observe these use conditions and suggest an alternative charge and/or discharge configuration, e.g., different discharge amounts, periods, times, or rates, and/or different placement of the unit and/or system components, e.g., on to different circuits, so as to allow the unit and/or system to achieve a more optimal discharge rate. Such learnings may be iterative and communicated to the user so as to allow the user to manually, or the system to automatically, arrange and/or map the system components, as described in greater detail herein, so as to take maximal advantage of unit location(s) given available mapping and known safe charge and discharge rates. Alternatively, one or more of the high consumption appliances may be plugged directly in to the smart energy storage unit so as to offset its load directly, or if the appliance(s) is consuming too much power, a less power consuming appliance can be recommended to the user by the system.

Accordingly, in view of the above, the smart energy storage unit and systems including the same can be configured so as to allow the smart energy storage unit(s) to be able to expend their full storage capacity within a designated time frame and in a safe manner. More particularly, as described below, in various instances, a multiplicity of storage units may be provided and positioned at strategic locations so as to serve a local electric grid in a manner that allows the units individually and collectively to be charged and/or discharged in a significantly timely manner so as to meet entire peak time demand in the shortest and safest time possible, regardless of whether the units are able to charge and/or discharge at a constant rate or an intermittent rate.

However, as indicated, the local electric grid may have a plurality of circuits each having their own loads upon them. Yet, each circuit can only transmit a prescribed amount of energy, e.g., 15 A/1.8 kW, through its pathway. Hence, if the collective load on all of the circuits of the local electric grid, e.g., serving the house, is greater than 15 A, then any one smart energy storage unit will only be capable of meeting a partial amount of that load. It can nevertheless do so safely, such as using the smart energy assets having the communication capabilities in the configurations described herein, or by employing the smart intermittent discharge methodology presented herein.

The above notwithstanding, it would be useful to include a plurality of smart energy storage units so as to effectively mitigate a more substantial portion of the demand if not all of it, such as by forming a system of smart energy storage units. For instance, it would be useful to have a system of smart energy storage units that collectively are capable of fully offsetting, in a safe manner, the entire amount of energy being pulled off of the grid across all of the circuits of the household, taking into account that each individual unit can only discharge a prescribed amount of energy on any one circuit. Accordingly, in view of the above, in particular aspects, a system is provided, wherein the system includes a local electrical grid to which is coupled one or more appliances and one or more, e.g., plurality, of smart energy storage units, as herein described. Particularly, in various instances, a system may be provided wherein the system is configured for performing a grid and/or circuit mapping operation that may be performed automatically and/or manually so as to determine, align, configure, and/or otherwise arrange the system components, one with respect to one or more others, so as to better achieve a safe manner in which energy may be supplied to and/or withdrawn from the local electric grid.

For instance, in particular embodiments, a circuit, appliance, and/or smart energy asset mapping operation, as described in detail herein below, is provided. Such circuit mapping may be performed in a variety of different manners, and is useful for determining a number of different variables. For example, circuit mapping is useful for determining the spatial and/or physical location of the various components of the system, their relative location with respect to each other and the electric grid, as well as for determining upon which circuits each appliance and/or smart asset is coupled, and/or what their identity is, the character of their load, and when and how much energy they are pulling and/or supplying to the grid, dependent upon what type of asset it is. Accordingly, circuit mapping is useful so as to know which appliances and/or smart assets, e.g., smart energy storage units and/or generators, are on what circuits, what loads they are drawing from and/or what energy they are supplying to the circuit, and how much energy can be pushed on to which circuits and when so as to meet that overall demands on the collective circuits. This information is useful so as to efficiently be able to net zero out energy being supplied form the utility side of meter, and mapping, in general, is useful for determining how and when various smart energy storage units may be charged, for how long, and at what rate.

Specifically, mapping at its essence is the iterative process of building up a map, over time, of what loads and/or resources are on what circuits, which, as explained in greater detail below, may be useful so as to perform disaggregation. Particularly, in various embodiments, such as where a multiplicity of smart energy storage units are provided, such as in service of a single local electric grid network, e.g., within a household, mapping and/or disaggregation may be useful because these processes allow for the determination of how many and which energy providing resources are on which circuits of the local electric grid, and further allow for a determination to be made as to which smart assets can be discharging to various different circuits, withdrawing from various different circuits, at what rates, and when.

For instance, mapping and disaggregation allow the system to determine the number and general lay out of the local circuits, to identify which load bearing assets are on each of the circuits, what those assets are, and how much and when they draw their loads from the local electric grid. Mapping and disaggregation is also useful for determining which supply-side assets are on which circuits as well as what their capacity is for supply side generation and/or provision to the local electric grid so as to thereby coordinate both supply and withdrawal of energy from any given circuit by any given asset, at any given time, such as in a systematic and coordinated manner. This coordination is important because if any two smart energy supply units are positioned so as to be on the same circuit, a dangerous condition could result if both assets begin supply energy or withdrawing energy from the circuit at the same time.

Coordination can avoid this problem so that units on the same circuit are noted and their charging and/or discharging is coordinated so that both units do not charge or discharge at the same time, and if they do, they do it at a low, e.g., sustainably safe, rate. Additionally, if the system recognizes such a non-optimal configuration of the smart energy assets has occurred, the system can review the generated circuit map, and/or suggest a more optimal arrangement of the units with respect to the other assets associated with the local electric grid, e.g., so both assets are not on the same circuit and/or can charge or discharge regardless of one another. Hence, mapping is useful so as to be able to determine what appliances and assets are on which circuits, what expected loads may be present and when, and therefore, when the optimal times and rates for charging and discharging will be.

As indicated above, such a mapping operation may be performed in any suitable manner, such as these disclosed herein and their equivalents. Specifically, mapping at its essence involves extracting, either manually or automatically, the knowledge as to what circuits are where throughout the household, or other complex serviced by the local energy grid, and what appliances and/or assets, including smart energy storage units and power generators, are coupled to each circuit. For instance, mapping in its purest form may involve a system wherein all the components and/or subcomponents of the system are capable of communicating with one another, such as using the same or similar communications protocols. In such an instance, each smart asset/appliance can talk to one another, identify themselves, identify their resonant frequencies, what their load is, and where positionally they are located.

In accordance with the methods disclosed herein, from this mapping information, each unit can positionally locate, e.g., triangulate, themselves, with respect to each other, and may then be able to identify themselves relative to the circuits to which they are coupled. This may be done in a plurality of ways, such as by sending individual characteristic wave forms, or other data packets along their coupled circuits, which data may then be received by all other assets on that circuit thereby identifying which units are on which circuits. Thus, in such an iterative process, the smart asset components of the system can be mapped both positionally and in relation to each other and the circuits to which they are coupled.

As indicated, such communications may be conducted in a digital, analog, or cellular manner, using peer to peer, wired, or wireless communications methodologies, such as by suitably configured transmitters and receivers, and/or via BlueTooth, WiFi, Zigbee, cellular, GPS, and the like. In various instances, one or more of the smart energy assets/appliances may be communicably coupled to one another through a cloud based interface, such as via an energy cloud. Further, in various implementations, there may be one or two or more mapping operations that take place. For instance, a first mapping operation may be performed so as to determine how many smart energy storage and/or generation assets are coupled to a local electric grid and/or to which specific circuits they may be coupled; and secondly, a further mapping operation may be performed so as to determine what appliance, smart or not, are where, and on which circuits.

Of course, more or less mapping operations may be performed so as to determine where all appliances, smart or dumb assets are, and/or on which circuit, such as for determining the presence, identity, and/or location of any consumer side power generation. Accordingly, each mapping operation has its attendant benefits. For example, it is useful to identify where each source of smart energy supply is coming from so as to ensure multiple supply options, e.g., multiple smart energy storage units are not positioned so as to be on the same circuit, and if they are then to account for each other's presence so as to act in a coordinated manner. Further, it is important to determine which appliances are on which circuit, and/or which smart energy storage units, if any, supply energy to that circuit. In such an instance, knowing what appliances are on what circuit allows the smart energy storage unit and/or system as a whole to determine the maximum potential load on the circuit at any one time, which data my then be used to determine how much energy an associated smart energy storage unit can discharge safely to meet the loads of those associated appliance.

Specifically, if the sum of the load of all of the appliances on the circuit is below the maximum amount of energy that may be transmitted across that circuit, e.g., below 15 A/1.8 kW, then the smart energy storage unit can discharge all its capacity up to the maximum allowable transmission amount. Hence, the ICS is configured for determining the max load on the circuit, given the map, determining the maximum capacity for the circuit, given the local standards, and then instructs the battery component to discharge the difference up to that amount safely. Likewise, the smart energy storage unit could charge in this manner as well, so long as the maximum potential load for the particular circuit had been mapped and accounted for.

Additionally, it may also be determined how much of the maximum potential load is actually presently online, and if the actual load is less than the maximum potential load, then an increased amount of energy may be supplied or withdrawn from the circuit. In like manner, it may also be determined that the actual load is above the determined maximum load, and in this instance, the smart energy storage unit would only charge or discharge the new difference, if at all, between the actual load and the maximum capacity. In such an instance, a new map would be generated and transmitted through out the system. In all of these instances, charging and discharging may be performed safely without risk of overloading and/or super heating the circuits, and thus avoiding what would otherwise be dangerous conditions.

The actual process of mapping, however, may be quite challenging. For instance, it may be relatively easy and/or straightforward to determine each unit and/or appliances' spatial arrangement, e.g., within a house, and/or position with respect to one or more other units and/or appliances of the system. Such mapping may be performed by a number of protocols such as by triangulation, GPS, as well as allowing the units to communicate with one another. However, determining where each appliance or unit is located with respect to which circuit of the grid it is coupled to is a much more difficult task. This difficulty arises in part because any individual electric circuit does not particularly follow a straight path through the local electric grid network. Hence, two appliances may be plugged into a socket that is spatially next to one another, and yet each socket may be on a different circuit. Likewise, two appliances may be positioned in different rooms in the house and separated from each other by a distance, and yet may still be on the same circuit. Hence, unfortunately, in many instances, the electric circuits within a household network do not follow the topology of the corresponding house.

Accordingly, it is not only important to determine where the appliances and units are spatially and locationally, but it also important to determine to which grids they are coupled.

Hence, in various embodiments, a first level of mapping may be performed to determine to which circuit a smart energy storage unit is coupled, and if multiple units are present within the same local electric grid network, then identifying whether they are on the same circuit, and if they are on the same circuit, suggesting an alternative arrangement for the positioning of the smart units. Thus, in a first level, such mapping may be employed so as to determine the local circuit to which any given unit is coupled, and/or to determine if two or more smart energy storage units are on the same circuit. This mapping, as indicated, may involve an iterative process that results in the formation of a topographical and/or circuit map of the system and its component parts.

Accordingly, in one exemplary method, a mapping operation may be performed so as to determine what circuit a given smart energy storage unit is on. This mapping operation may involve one or more of: plugging the smart unit into a selected outlet, thereby accessing a particular circuit, turning off all appliances expected to be on that circuit, and then allowing the ICS to instruct the GFC to release a pulse the magnitude of which is chosen so as to cause the breaker to trip. Thus, identifying to which circuit this particular smart energy storage unit is coupled. Likewise, in a subsequent step, once the breaker has been tripped and the circuit identified, with reference to its fuse in the fuse box, the ICS may now instruct the GFC to discharge a constant amount of energy. In such an instance, any appliance that comes on, even though the breaker has been tripped, would necessarily have to be on the same circuit as the smart energy storage unit. Any such appliance can then be identified and its position and/or circuit location can be mapped. In a further step, any appliance that was turned off may not be turned on, and if they then begin receiving power, which the smart energy storage unit observes as a load on the circuit, those appliances, their identities and their loads may also be identified and mapped.

Further still, in a manner such as this, any other smart energy storage units that may be on the circuit may also be identified. For instance, the two units can communicate to one another that a test of the circuit is being performed. Hence, if the second unit is on the same circuit as the first unit being tested, it will register the high amplitude, 75 A impulse. Thus its presence relative to the first unit may be identified and mapped, and an alternate configuration of the units with respect to one another and the circuits of the network may be suggested, or at least a warning may be given as to the need for a possible re-arrangement of the units of the system. This may be done so as to maximize the collective usefulness of charging and discharging of the units of the system given the limitations described above.

Particularly, as noted above it needs to be determined if a plurality of smart energy storage units are on the same circuit. This is useful to determine because if they are on the same circuit, they either need to be rearranged so as to be on separate circuits, or they need to be configured so as to act in some form of a collective manner. This is important so as to avoid both units discharging or charging at the same time, and risk blowing the fuse and/or over heating of the circuit. Hence, their individual charging and/or discharging would have to be coordinated, as explained in greater detail herein below, such that the extent of each units' range of charging and discharging, and the timing of such, is determined and executed in coordinated fashion. However, if the two units are re-arranged so as to be on different circuits form each other, and any other units, then each unit will be enabled to function in a much larger range, e.g., double the range possible when being placed on the same circuit. Hence, these procedures may be repeated again and again for each smart energy storage unit of the system and/or for each appliance on the now identified circuits, and thus a system wide, topographical and/or circuit may of the system may be developed, such as by the functioning of the ICS of one or more the smart energy storage units.

However, as indicated, it is often useful to know not only what is on any given circuit, but also the identity and extent of that load. For example, it may be useful to know not only that a given nameless appliance is on a particular circuit, but also how much load it is drawing, what its identity is, and also where it is positionally. As indicated above, this may be done in several ways. One such way is when all of the associated assets/appliances are smart assets capable of talking directly to one another or via the cloud, or where each asset is coupled to a control unit and/or sensor capable of determining and transmitting that information as a proxy for the non smart appliance. However, where such communication is not available or complete, these determinations may be made, such as in a manner described herein.

For instance, the location of various appliances can be determined such as via GPS or triangulation, if the unit is configured for such, or may be determined through other digital and/or analog means. For example, each grid asset, smart or otherwise, operates at, and therefore generates, a resonant frequency. This resonant frequency produces a sound wave that may be detected, and the source of which identified. Hence, by turning the appliance on and off, the appliance may be identified by the resonant frequency it generates, which frequency can be received by the ICS of one or more of the smart energy storage units, and its relative position mapped. For example, the smart energy asset, e.g., the smart energy storage unit, may be configured so as to be able to receive, analyze, and triangulate harmonic data, such as a generated resonant frequency.

Particularly, harmonics may travel up and down a circuit or in the air in all directions when the appliance is on. Hence, having a single appliance being "on" may inform the smart unit as to how far away the appliance is, but it may additionally be useful to have a plurality of smart assets that can receive this harmonic signal and therefore triangulate relative positions based on the times the signal is sent and received by the two smart assets. Having multiple smart assets, therefore, allows triangulation based on differences in time period during which the harmonics of the appliance were heard. Listening on both sides and comparing which unit heard it first and when, and then applying this data to the topological map being generated gives a better understanding of the positioning of each unit and/or appliance of the system. Accordingly, in various embodiments, a smart asset of the system may include a high fidelity clock and/or stopwatch, and/or timer.

Further, the identity of the appliance may then be determined such as via look up table of what class of appliances generate resonant frequencies in that range, and if its circuit has been determined, such as by a method similar to that explained above, then as the unit turns on, the load generated from that appliance may be determined such as by an increase of load being drawn from the smart energy storage unit serving that circuit (such as prior to re-setting the breaker switch). Additionally, such data may be verified and/or determined such as via a ping in listen protocol. In such an instance, one or more smart energy units or other smart assets of the system may send out a pulse, e.g., a digital or analog pulse, so as to ping the appliance whose identity is to be determined and/or confirmed. If multiple smart assets all ping the same appliance at the same time, then it can be determined, based on the time signature of when the reflective ping was heard back, where the general position and/or location of the appliance is relative to the other assets of the system. Likewise, if the ping and listen protocol is timed so as to be performed with the turning of the appliance on and off, it can be determined that the resonant frequency of the appliance corresponds to the received ping, and it thus may be confirmed that the appliance does in fact have the given identified position, spatially, as well as the determined location with respect to its relation to the circuit.

For instance, as indicated above, since each electronic device, e.g., appliance, coupled to a circuit of the local electric grid has its own resonant frequency, such appliances can be mapped by turning them on and off and sensing the increase in decrease of the load on the circuit. Specifically, as the appliance is turned off, the load on the circuit, e.g., being supplied by the smart energy storage unit on that circuit, decreases. Likewise, turn the appliance on, and the load increases, a characteristic amount. If a ping is transmitted when the appliance is off, then there will be no return. The appliance is not on the subject circuit. However, if a ping is transmitted and sensed when the appliance is on, it will be returned and detected. In such an instance, if desired, this result may be confirmed, or at least suggested, by also testing for the resonant frequency of the appliance at the same approximate time that the ping is returned and/or the load change on the circuit is detected, and/or thereby associated with the identified resonance. It is also to be noted that the identity of the appliance may also be detected based on its load. Then, because all electric appliances have a characteristic load and frequency range demarcating when its electronic motor or mechanism turns on, this identity can be confirmed by that resonant frequency response.

This positioning, for one or more devices, may also be determined and/or confirmed by triangulation, such as using a smart meter. For instance, as the appliance or smart energy storage unit turns on, the load on the grid increases. This is demarcated by the amount of energy being pulled from the regional macro grid across the smart meter and into the circuits of the house increases. As the energy crosses through the meter, the meter may then send a communication to the smart unit as to the amount of energy crossing through the fuse box. The smart unit can then orient itself based on the timing of when it receives the communication, and when it receives the energy transmission.

Likewise, the smart unit can determine its relative position to an appliance on its circuit by sending a "ping" or other communication to the appliance after it receives the communication from the meter. This can therefore determine the relative location of the appliance based on when it received the communication from the smart meter, and when it experienced the load being consumed on the circuit, e.g., by a decrease in its supply of energy. The location may further be confirmed by the receipt of the sent ping and/or a detection of the resonant frequency of the appliance. Hence, employing a variety of these methods by a multiplicity of the smart energy storage units, or other assets of the system, allow for a comprehensive map to be built up of the general system and its associated circuits.

Specifically, the smart meter and/or battery can "ping" both the device and each other, determine the time of communication, and/or energy transmission so as to determine accurately which circuit the appliance is on and where it is along the circuit based on the time/distance differences. As stated, this can be done for all the devices of the system, so as to determine the relative arrangement of all of the appliances with identified load draws, and their identity determined, so as to map the loads across the circuits. This can also be confirmed by the other smart energy storage units running the same or similar mapping protocols, such as ping and listen, triangulation, and/or using Wifi, GPS, and the like.

For example, a unique feature that may be implemented with respect to ping and listen is that it may be configured such that the "ping" will travel linearly along the circuit, and thereby allow a good determination as where an appliance is on the circuit relative to a smart energy storage unit sending out the ping. For instance, once the "ping", e.g., of about 40 or 60 Hz, is transmitted, it is known how fast it travels out and back, and therefore the distance to the appliance can be calculated. The shorter the duration, the more likely the two assets are to be on the same circuit. Additionally, when pinging another smart asset, a pre-designated pulse having a preselected waveform may be sent so as to identify the pinging device to the pinged device, which may then send back its own characteristic waveform. Hence, each unit may have or otherwise be assigned its own characteristic waveform so that each unit has its own characteristic pulse, e.g., 40.5, 43, 46.2 etc. that can be used to identify that unit and the others. This may be used for smart meters, smart appliances, and smart power generators as well.

Additionally, as another way to identify and/or validate one or more of the data factors above, a power line communication (PLC) protocol may be implemented. In a manner like the above, a data packet may be sent from the smart energy unit believed to be on the same circuit as the appliance to the appliance, and its receipt, or lack thereof, can either confirm or disaffirm that the appliance is or is not on the suspected circuit. Specifically, power line communications (PLC) may be conducted through a circuit, such as where a data packet with a determined header may be sent along the circuit to another smart appliance or smart asset, such as to other smart energy storage units, on the same circuit. Confirmation of receipt of the data packet, is also confirmation that the two assets are on the same circuit. Accordingly, where ping and listen may be performed wirelessly, PLC may be performed through transmission of a data packet through power lines. An advantage of PLC is that it functions best when communicating along the same circuit, and struggles when going off circuit. Therefore, if a PLC is received by a smart device recipient, it is likely that both pingee and the pinged are the on the same circuit.

This may also be useful when bringing a new smart energy storage unit online, such as for the first time. For instance, as the smart storage unit is brought online, it may, as indicated above, signal that it is coming online, and it may then purposefully trip the breaker, by putting out a surge at high amperage so as to trip the breaker. Hence, after the breaker trips, everything on that circuit should be dead. The new energy storage unit may then send out a second pulse and if that second pulse is received by another device they necessarily have to be on the same circuit, because since the breaker is tripped the signal could not travel off circuit. Additionally, in such an instance, various appliances can be determined to be on the same circuit such as by simply turning them on. Specifically, since the breaker is still tripped, and has not yet been reset, if the appliance does indeed turn on, and the smart energy storage unit sees the demand, then the appliance necessarily must be on the same circuit. Such protocols can be performed in addition to one or more of the other identifying methods herein discussed to further improve the accuracy of the iterative map being generated.

Accordingly, methods such as these are useful especially for determining if one or more energy storage units are on the same circuit or not. For instance, where two or more smart energy storage units are coupled to a local electric grid network, the two units can communicate with each other so as to determine if they are or are not on the same circuit. For example, one or more of the smart energy storage units may indicate a mapping test is going to be performed, it then may communicate with the other, subsequent, unit(s) being brought online via a suitable communications protocol, such as via a cellular, WiFi, or cloud based network, requesting identity and/or GPS data, which information may be sent to the first unit. Likewise, the first unit may confirm its position such as by determining its resonant frequency, or a designated frequency signal generated by the second unit, and calculating general distance based on the time signature of receipt. Additionally, a ping and listen and/or PLC protocol may be implemented with the respective data being transmitted to the second unit and its connection confirmed. Additionally, the position of the second smart unit may be determined and/or confirmed via triangulation, such as using both devices and a third smart unit, such as a smart meter, smart source of power generation, a smart sensor, or other smart energy storage unit. Furthermore, as indicated above, it may be determined if the two units are on the same circuit simply be tripping the breaker and allowing the two units to send a signal, such as an impulse, ping, and/or PLC communication along the circuit and see if it is received by the second unit.

Any combination or all of these operations may be repeated for each and every smart asset, e.g., for each smart energy storage unit, of the system and/or with every appliance coupled to the local electric grid. In this manner a comprehensive map that lays out all the circuits of the local grid network may be built. Additionally, one or more of these protocols may be implemented to further identify any and all of the appliances and smart assets that are coupled to the local grid, and to which circuits they are coupled. Various of these protocols may also be employed so as to determine their respective loads are, what their use cycle is, and/or what their periodicity of use is. For instance, these methods may be employed and repeated as often as necessary so as to determine how many and what circuits are in the house; what the potential and/or actual maximum load for each circuit is, what appliances are on each circuit, their identity, their loads (e.g., amperage being drawn by appliance), and what smart assets are coupled to that circuit so as to supply and/or offset that load. Once this data is known, then it can be determined whether and when and how much any given smart energy asset may charge and/or discharge in safety, so as to supply energy to and/or withdraw energy from the local electric grid.

All of this data may then be compiled, patterns determined, and a systematic formula for maximizing the charging and the discharging of the smart energy storage units of the system may be determined and implemented. Specifically, once the system, its circuits, and its loads and supplies have been mapped, then the system, or a control unit associated therewith, can be employed to control what smart assets do what, when, and where (e.g., which units charge and/or which units discharge, on what circuits, when, and at what power for how long), so as to meet the load on the circuits and/or to zero out the load coming in off of the regional macro grid.

Additionally, it is to be noted that one or more sensors may also be provided in a manner so as to be associated with any other smart source of power supply. Such a sensor may be useful especially where the source of power supply is through an electric vehicle. Such sensors can be positioned on each circuit of the local electric grid where there is a grid-loading source (such as an electric car, PV, battery, and/or smart meter) so at know how much each asset is producing and/or loading on to the local grid. Further, since a map will have been generated, it will be known where on the grid each power-supplying asset is, and to which circuit these assets are coupled. Accordingly, where the system may include one or more smart energy storage units, and at least one other smart source of power generation, a control unit of the smart energy storage unit, such as the ICS, may then communicate with, and/or direct any other smart energy storage units and/or any other smart power providing assets on the system, such as through direct communication with the asset or via an associated sensor. Specifically, the ICS of one of the smart energy storage units may communicate with any and all other smart assets of the system so as to send and receive data, and thereby be able to make intelligent decisions about what units or assets charge and/or discharge what, and when, and how much, at what rate, and in what condition.

This communication will be useful in a situation where by employing smart sensing it can be determined if a consumer side power generator, e.g., PV, is over producing, and if so then the ICS can instruct any other battery containing unit, or other sources of power generation, not to discharge their power reserves. Rather, in such an instance, the ICS can instruct those assets capable of being charged to charge. For instance, if PV is connected to the consumer side grid and/or one or more smart energy storage units are coupled to the PV, then in a situation where over production is occurring, the ICS can instruct the PV to decrease or cease generation or to charge any batteries directly coupled to PV. In such an instance, at a later time, such as at night when the PV is no longer generating power, the ICS can instruct the batteries, once charged, to now provide energy to the local grid. Likewise, if an EV is coupled to the local electric grid and/or supplying energy to it, then ICS can instruct other storage units not to charge, so as not to drain the batteries of the EV, or to only charge if the EV was charged at lower rate then during high peak demand.

Further, where smart appliances, or at least a smart sensor associated with those appliances, are provided, the smart appliances and/or sensors may be configured so as to talk to one another and one or more of the ICSs of the smart energy units of the system, such as with regard to how much energy is being produced and offloaded onto the grid, as well as how much energy is being consumed, and/or used to charge associated batteries. This information may received by the ICS, be processed thereby, and further allow the ICS to make smart determinations with respect to its control of the charging and discharging paradigm of the system as a whole. Also, in certain instances, where the appliance is not a "smart" appliance capable of communicating with the other components of the system, then the appliance may be associated with a smart sensor, such as the smart power cords set forth and described herein below, so as to allow data from even "dumb" units to be communicated to a control unit, such as an ICS, of one or more smart energy storage units disclosed herein. Accordingly, the various components of the system, as well as their configurations, may be monitored and/or controlled either from within and/or from outside of the system. Such control can be exerted either by an ICS of a smart energy storage unit, or by a third party server accessible by the cloud. In either of these instances, such control can be exerted so as to regulate both the individual component parts and/or the system as a whole, such as in a calculated, coordinated, and predetermined manner. Such control, for instance, may be implemented by configuring the component parts of the system so as to include or otherwise be associated with a communications module, such as a communications module that is connectable peer to peer or via WiFi, the energy cloud, or via other suitable communications protocol. This connective communication capabilities allow one or more controllers of the system to send and/or receive communications to and from each smart system component, and thereby to configure one or more operational parameters of the system, so as to configure one or more of the smart energy storage units, such as with respect to its charging an/or discharging.

Such communicative control is useful, for instance, for both aggregation as well as disaggregation. Particularly, as indicated above, each circuit of a local electric grid is configured for transmitting energy at a prescribed level, and in a pre-configured condition, such as where, in one example, the amount of energy to be transferred is restricted so as not to exceed 15 A. Accordingly, once the circuits, the loads on the circuits, and the locations of sources of energy provision have been determined, as set forth herein above, the system as a whole may be configured to run as a collective whole so as to effectively and efficiently net zero the energy requirements of the property in a safe manner.

For instance, once the loads and supply on all the circuits is known, it may be determined which smart energy storage units can discharge, when, and by how much. Hence, when the smart meter communicates to one or more controllers, such as to one or more ICS units of the smart energy storage units, the one or more controllers can determine and configure the smart energy assets of the system to supply exact amounts of energy to the predetermined circuits to meet the load demand of the entire local electric grid thereby effectively net zeroing the demand of the household with respect to the regional macro grid. For example, in such an instance, all of the smart energy storage units will know which appliances are on, and which are pulling load from their associated circuits, e.g., by performing ping and listen, PLC, and other associated protocols, as described above, which data may be sent to one or more control units, e.g., a master controller of the system.

The master controller may be an ICS of a selected smart energy storage unit, or it may be a suitably configured computing system external to, but communicably coupled with the system, such as by the energy cloud. Such a computing system may be a computer, such as a desktop or laptop computer, mobile computing device, or smart phone, remote server, super computer, or server farm, which may be accessed via a suitably configured app. In any of these instances, the master controller, e.g., ICS controller, may receive system configuration and condition data, apply it to the circuit map, and then instruct the associated GFC's of the associated smart energy storage units or other smart assets of the system to discharge a determined amount of energy at a prescribed rate to supply the load on each individual circuit, thus effectively effecting a net zero condition with respect to the regional macro grid.

Additionally, in such a configuration, the system may be agile and can adjust on the fly such that if the load on any one circuit is increased, such as by a toaster or other appliance coming on line, the system will recognize this change and change its configuration so as to accommodate this change. For instance, when an appliance comes online the respective smart energy storage unit coupled to that circuit will detect the load of the appliance. Such detection may be determined in a number of different manners, such as by a change in the load on that system, or via communications with a smart sensor, or via a look up table, or the like. Consequently, as the appliance comes online, the output from that smart energy storage unit on that circuit will, to the extent necessary to avoid overloading the circuit, be decreased by that amount so as to not over heat that circuit. In such an instance, one or more of the discharges of the other units of the system may be ramped up to make up for this deficiency, and/or another smart energy supplying asset may be brought on line. Accordingly, with respect to smart asset management, it is not just a matter of controlling what any one smart unit is outputting or taking in, but what all of the units as a whole are outputting and/or taking in. In various instances, it may be desired to determine the load on the macro grid, and then to split the supply of that load equally over a multiplicity of smart energy providing assets, such as on a circuit by circuit bases, or for the entire local grid collectively.

It is to be noted that all sources of energy production, provision, and/or distribution sources on the consumer side of the meter may also be accounted for. Hence, it may be determined how much consumer side provision, e.g., PV, is being produced, when it is produced, and how much is going back on to the macro grid. Additionally, it may be determined how much locally generated energy is going in to storage, when, and how much is going out from storage and onto the local energy grid so as to offset the macro grid. It may also be determined and/or predicted as to how circumstances might change in a given time period, such as over 10 minutes, 1 hour, 2 hours, 5 hours, etc. all of which can be communicated to or otherwise determined by the controller, such as a master controller, so as to optimize the energy provision of the entire system.

It is to be further noted that various of the data discussed herein may in certain instances be derived, sensed and calculated, communicated, manually entered, and/or the like. Regardless of how this data is attained, it may be used such as by the master control unit so as to optimize the charge and discharge and/or other provision of energy to the individual circuits of the local grid, such as in a highly efficient and safe manner. Such energy provision may be constant, periodic, stepping up, or down, as needs be to reach an optimized provision of energy to the local grid. Hence, in various embodiments, such as where the circuit map is well known, the energy to be input into the energy storage unit, and output to the local electric grid may be configured so as to be constant. However, where the map is not well known such charging and discharging may be limited to the iterative process described above.

Accordingly, when the map is known, one or more of the control units, such as an ICS acting as a master controller for the system, may instruct one or more of the GFCs of the smart energy storage units of the system to discharge energy at a constant rate so as to offset the load on one or more circuits of the local energy grid. However, when the map is not well defined, then the master controller may instruct one or more GFCs of one or more smart energy storage units to charge and/or discharge in an intermittent and/or cyclical manner, such as cycled energy input. Furthermore, as discussed above, as each appliance turns on, it emits a waveform having its own resonant frequency by which it may be identified. This frequency may be picked up by one or more sensors, e.g., a CT clamp, of the system and/or otherwise be received and analyzed by one or more of the ICSs of the system, such as an ICS acting as a master controller. The ICS then receives the resonant frequency, identities the device, may verify the data received, such as by ping and listen, PLC, triangulation, and the like, and then may instruct its own or another GFC associated with the system to discharge an amount of energy sufficient to meet the needs of that load.

Additionally, if useful, the ICS may not only identify the resonant frequency but may further characterize the appliance and/or its load, such as via a look up table accessible in its own database or a remote database accessed through the cloud. Specifically, the resonance may be received by the ICS, analyzed, and the appliance identified. Further, the power the appliance is consuming may be characterized and calculated. For instance, the energy being consumed by the appliance may be sensed and/or determined by the ICS of one or more smart units, such as by a change in the power draw off of the circuit. More specifically, in such an instance, a smart energy storage unit may go from supplying 10 A to the circuit, prior to the appliance going online, to supplying 13 A to the circuit, once the appliance goes on line. This delta, therefore, represents the load of the appliance. Further, a LUT may be used to verify this determination, such as where the identified resonant frequency of the appliance is compared to a standard in the LUT, which standard may include a list of which range of resonant frequencies applies to what appliances, and may further be used to verify that the determined load is the actual load for that class of appliances.

Furthermore, as indicated, once the identity of the appliance is determined and its load is known, the ICS, e.g., of the master control unit of the system, may then determine the circuit to which the identified appliance is attached, such as by one or more of the methods described above, such as through communication via the internet of things, Ping and Listen, PLC, GPS, and/or Triangulation. Such protocols may be used to not only identify the appliance, but to also identify the closest smart energy asset to that circuit which may be engaged so as to supply the load of that appliance with the required energy. Hence, in the manners set forth above, a master controller, or other ICS(s) of the system, may determine where the circuits serving as a local energy grid are, may determine the various appliances that are coupled to each of those circuits, and may identify their loads. Additionally, the master controller or ICS may also determine where the various smart energy storage units supplying energy to those circuits are, and what their capacity is.

In such an instance, once the master controller, or other ICS(s) of the system, knows the various circuits of the local energy grid, knows the appliances coupled thereto, knows the respective loads on those circuits, and further knows which smart energy assets are available and positioned appropriately to meet those loads, then the master controller or ICS can configure the one or more units of the system in a strategic manner to supply energy to the various identified circuits of the grid by a multiplicity of associated smart energy storage units, and/or other smart assets, so as to meet those loads in a safe manner, and with out risk of tripping any circuit breakers or creating an unsafe condition. Alternatively, the ICS may identify that sufficient mapping has not been performed and as such the ICS may determine that there is a deficiency in the information needed to be able to charge and/or discharge safely. Thus, in such a scenario, the ICS will know that care must be taken when charging/discharging.

Further, if all the appliances on a circuit and their loads are known, then the ICS can determine the maximum push rate that any smart energy storage unit may deliver to that circuit. Additionally, in such an instance, if it is determined that the maximum draw of energy across that circuit has been reached, the ICS will know to shut any smart energy storage unit serving that circuit, or the entire system, down or to at least go into idle mode. Likewise, if all the appliances on a circuit and their loads are known, then the ICS can determine the maximum withdrawal rate that any smart energy storage unit may receive from that circuit. However, if such mapping has not been performed, the ICS will also know that charging and/or discharging may have to be performed intermittently. The ICS can also suggest optimum placement of appliances based on the load on the various circuits, and current positioning of the smart energy assets.

Any and/or all of these functionalities may be controlled, such as by an "app" such as on a smart phone, computer, and the like. Additionally, such an app may be engaged in the iterative mapping process be allowing the user to directly engage with the smart, and/or dumb assets of the system, to identify them as well as their circuits such as by scanning an RFID or other code associated with the item and uploading the data into a database associated with the system. Such identification may include the ticking of boxes presented as a menu via a user interface of the app. Both charge times, discharge times, amounts, and rates can all be entered either automatically or manually through such an app.

Accordingly, in various embodiments, there are three basic types of smart or pseudo-smart charging and discharging. There is the intermittent stopping and starting of charging and discharging protocol, such as where no or only partial mapping of the system and/or local electric grid has taken place. As noted above, such charging and discharging may be at constant rates, and/or may be stepped up or stepped down, dependent on grid capacity. Further, in various instances, even though mapping has not fully occurred, a collection of units can be collectively controlled in this manner so as to charge and discharge a multiplicity of units, e.g., at set low rates deemed to be safe, so as to at least partially zero out the load on the macro grid.

Alternatively, where mapping has been performed, or where a substantial portion of the assets that make up, or are part of, the local electric grid can communicate with one another, then a complex calculation may be performed to determine the exact load that is represented by the household demand. In such an instance, it may further be determined how the various smart energy storage units or power generators can be deployed, and in what arrangement, and under what conditions so as to meet that load and achieve a much closer approximation of attaining net zero. Specifically, in a first step, how much energy is coming in off of the regional electric grid may be determined. This energy represents the amount of energy being consumed. This amount may be subtracted from how much energy, if any, is being produced on the consumer side of the grid, such as by a consumer side power generator. If the amount of energy being generated is above the amount of energy being taken in off the grid, this information can be communicated to the ICS, e.g., of the master controller, which can then instruct the other storage units of the system to cease discharging and either enter idle mode, or charge mode (dependent on the load on any one circuit at that time.

However, if the generated supply is still not enough to meet the household demand, than the ICS may determine the difference and instruct one or more of the mapped smart units to discharge energy on to the local grid so as to meet the household demand, such as in the most efficient way. This may be done, for instance, by selecting those units to supply energy that are on or closest to the circuit having the appliances consuming the most amount of energy. Likewise, if there is no consumer side generation, then how much energy is being consumed e.g., the demand, can be easily determined. For instance, demand in this instance may be determined based on calculating the individual load on each mapped unit, on each mapped circuit, so as to determine what appliances are on, and how much load they are drawing. This may then be used to determine how much, where, and at what rate energy needs to be discharged so as to zero out the demand, and/or if and when charging should occur and where.

Accordingly, in one embodiment, the ICS need only discharge the delta between what is being consumed and what is being produced, and/or in various instances, may discharge only an amount to net zero what is being taken in off of the macro grid, while yet staying below the maximal amperage capacity of the circuit. However, in various instances, a more intelligent paradigm may be implemented such as where the ICS, e.g., of the master controller, determines over time and/or over multiple use patterns, a load curve, which load curve may represent a single moment in time or a multiplicity of moments in time, such as over minutes, hours, days, weeks, months, and/or years of use. This data may then be analyzed so as to determine an ideal load demand curve from which a response supply curve may be generated and/or implemented so as to meet the demand on the system in a more precise manner, such as by corresponding and/or matching the supply curve, such as in a curvilinear fashion over minutes, hours, days, weeks, months, and years.

As noted above, in order to most efficiently and safely meet the energy needs of a grid, such as a local electric grid served by one or more, e.g., a plurality of, smart energy storage units or other smart assets, these grid components should be configured so as to act in a collective manner. However, in order for a collection of smart energy storage units to act together, there must be a mechanism by which one or more of the units establishes a master role in the system, thereby giving it the ability to establish communications with and/or control over the other units of the system, and thereby allowing it to act as a master controller for the overall system.

There are several different ways in which such an organizational hierarchy may be implemented. First, a user, or third party, may select a master controller. Alternatively, a master controller may be determined by the smart energy storage units themselves self-selecting, based on a number of different parameters, which parameters may take into account changing conditions in their local environment. In either instance, there needs to be a mechanism for establishing various evolving master servant relationships, and/or for determining the parameters by which a master control unit (e.g., a master group unit "MGU") is selected, and criteria by which the multiple devices are to become interconnected and communicate with one another.

For instance, an MGU may be determined amongst a variety of smart energy storage units, by the smart units communicating with one another, sharing data, and self selecting which unit is to be the MGU based on that shared data. Such sharing of information may occur in any number of ways, such as by peer to peer communications, such as Bluetooth, WiFi, cellular, or the like. Once communicably coupled to one another, the smart units may share data, such as to determine which unit was plugged in first, which unit is in better communication with the smart meter or outside world, e.g., greatest WiFi or cellular signal strength, which unit is in a better position to meet various load demands, and/or the like.

Selecting a master group unit is important, for example, in a situation where without having determined a MGU, two units may end up being coupled to the same circuit. In such an instance, both units may then begin discharging on that same circuit at the same time, e.g., at 10 A, resulting in the circuit being overloaded. However, where an MGU has been determined, this situation may be avoided, because in such an instance, the MGU will have control over both units and will determine which one discharges, when, and at what rate, etc.

Accordingly, the MGU may be determined based on whether it was the first or a subsequent unit that was coupled to the local energy grid. Likewise, the MGU can be determined based on its ability to conduct and/or control communications throughout the system. Alternatively, the MGU may be user selected, such as where each of the smart units is depicted as a graphic on a representation of a map that may be displayed to a user interface on an app, thereby giving the user the ability to select which smart unit will serve as the MGU. However, one or more of these alternatives may suffer from the drawback that without a mapping protocol having been determined, there is no way to be sure from their geographical representations, where each located unit is actually positioned relative to any given circuit. Further, in certain instances, it is not only the MGU that is selected, but a hierarchy may be determined so as to account for situations where one MGU goes offline and/or off-grid and a new MGU needs to be determined and/or selected. As indicated, this may be based on relative time stamps, or MGU status may be shifted based on a dynamic sampling of relative WiFi and/or cellular strength, or the like.

Specifically, the MGU, once determined may function to control the connections and/or communications between the various smart assets of the system, both inside of a local network system, and outside of the local network system, such as via a suitably configured communications module employing a suitable communications protocol, and in response to received data and/or instructions. More specifically, in various instances, the MGU may be one of, and may be connected to, the other smart energy storage units thereby forming a collective or system of smart energy storage units. For instance, the MGU gains control or priority over the other smart units, so as to form a collective out of the smart units, and then functions to configure the other units within that system. Additionally, the MGU, once established may instruct one or more, e.g., all of the smart units in the performance of one or more tasks orientated objectives, such as to do one or more of identifying themselves to one another, orientating themselves spatially, determining to which circuits they are coupled, and further assessing what appliances are on the circuits they serve and what the loads of those appliances are (e.g., maximum and minimum potential load as well as various daily averages). Once this has been done, the entire property circuit layout may be determined, and this and other such data may be used to regulate and/or control the smart charge and discharge of the collective units of the system, e.g., so as to effectuate a zero net balance with respect to the macro energy grid.

To perform these functions, the MGU may establish communications between the various smart units of the system, such as via a peer to peer communications protocol, such as BlueTooth or Zigbee, or a cloud based connection, e.g., established via Wifi or cellular interface, or otherwise being hardwired thereto, or other form of communications that allows the transfer of information and/or other data between the smart energy storage units, smart appliances, smart meters, smart inverters, as well as any smart sensors of the system. Accordingly, the MGU may function to configure itself to act as the communications hub and/or master controller of the various system of units, thereby conducting or otherwise moderating inside and/or outside group communications, such as sending data outwards and/or receiving data and then distributing received information and/or commands internally.

For instance, in one particular aspect, a system is provided, wherein the system includes one or more of a smart meter, inverter/converter, e.g., GFC, a sensor(s), and one or more smart energy storage units, where one of the smart energy storage units becomes the MGU, establishes connections either directly or indirectly to the various smart assets of the system, and begins to take on control responsibility for the collective. In such an instance, the smart meter may function to detect a load demand, such as an appliance on a consumer side circuit of the electric grid, for example, by detecting the flow of electricity through the fuse box and into the consumer side of the electric grid, such as into the local consumer electric grid. The smart meter then communicates this data, via an associated communications module, to the smart energy storage unit(s), such as to the ICS of the MGU.

Specifically, the Integrated Control System (ICS) of the MGU becomes the master controller of the entire system. It receives the communication from the smart meter, determines the amount of energy being consumed by the appliances associated with the local electric grid, and sends instructions to one or more grid flexible converters of one or more smart energy storage units, e.g., via their respective ICSs, directing them to pull energy from their energy storage cells, as described in greater detail herein above, so as to then provide that energy to their associated circuits of the local electric grid, so as to offset that amount of energy being consumed. Accordingly, the ICS of the MGU determines the production of energy needed to supply the required needs of the load on the collection of local circuits, and under the direction of the ICS of the MGU, the grid flexible converter directs the battery component, e.g., the energy fuel cells, to discharge that amount of energy so as to thereby zero out the demand on the wider regional grid network, e.g., to zero out the amount of energy coming into the local electric grid, e.g., in to the house.

Hence, the system as herein disclosed, may be configured so as to determine, by the various methods disclosed above, demand load data, or detect actual aggregated power data from the property side of the grid (e.g., the power required by the property), which may then be used to calculate an optimum discharge rate for the various battery components of the various smart energy storage units of the property. More specifically, the master controller of the MGU receives from the smart meter the amount of energy being consumed to meet the energy needs of the local grid network, e.g., household, and determines whether it can by itself meet the requirements of the household, and if not then it determines how many and which of the plurality of smart energy storage units will be deployed so as to meet that need and how.

For instance, the discharge capacity of each smart energy storage unit in the system can be self determined by each individual unit and communicated to the MGU, which may then process that data to calculate how much production is needed given available capacity in the accessible system, so as to meet the energy requirements of the household, and further determine how much energy from each unit needs be discharged, and with what characteristics, so as to net zero out the energy being supplied by the macro electric grid while at the same time ensuring each individual unit discharges at its optimum discharge rate, while maintaining safe charging and discharging conditions. For example, data on energy capacity from each unit may be aggregated and subtracted from the demand load and the result may be used to calculate the optimum discharge rate for each individual unit, e.g., which may take into account to which circuit each unit is coupled and the individual loads thereof. Therefore, maximum group output data is collected, analyzed and calculated by the MGU, and used to determine which units discharge, how much energy they discharge, at what rate, and with what characteristics.

Accordingly, to perform these functions, it is useful for the multiplicity of units to form a cohesive collective, a MGU, therefore, should be determined, and the MGH should establish and exert control over the other smart assets so that the multiplicity of units may act in concert. To effectuate this strategy, a community and/or hierarchical network of smart energy storage units may be established, such that the MGU takes over the decision making for the group, and further determines which unit is discharging what amount of energy, when, and how based on the relationships it establishes between the various units on the system. Hence, when a local electric grid network is to be serviced by a plurality of the smart energy storage units, as disclosed herein, the system may self-select, by a variety of different methods, which of the multiplicity of units is to assume the position of master, whereby once a master is determined, the remaining units then assume servant roles receiving instructions and taking orders from the master unit or MGU.

For instance, the MGU may be determined by time stamping, such that the first unit to be added to the local electric grid being serviced establishes itself based on its time stamp when a subsequent unit is then subsequently added so as to establish the system network. Alternatively, the master unit can be determined based on signal strength derived by access to an associated communications network, such as WiFi, or cellular signal strength, or the like. In other instances, a master unit may be determined based on a strategic positioning within the network, such as on a circuit to circuit basis. However, in some instances, the MGU may be determined by user or third party selection.

Regardless, once selected, the MGU may then give orders to the servant units in the network, which orders may be simple, e.g., in response to a determined load demand, such as "Unit 1 is the master, therefore, Unit 1 will discharge fully to depletion first, then it will select the next unit to be discharged, and so on daisy chaining the units together so as to supply the needs. Nevertheless, such an organizational arrangement is not ideal because the harder an electrical appliance is worked, or otherwise run, the more prone to break down it will be. In view of this, it may be better to run all units of the system, e.g., multiple energy outputs, at the same time, at less than maximum discharge, so as to distribute the load equally amongst the units, rather than to disproportionately run and/or control the units. For example, where the collective load demand on the local network is about 1.6 kW, the MGU can decide it will itself supply the about 1.6 kW, or it can divide the load between available smart energy storage units, such as evenly, such as where the system includes 4 storage units in total, the MGU can command each unit, including itself, to each discharge at about 0.4 kW, thereby collectively meeting the load demand.

However, in order to cooperatively discharge the collective storage units in this manner, that is safely, then a local circuit map, as set forth above, detailing what appliances and/or smart assets, including smart power generation units, that are coupled to the local electric grid, should be determined, so as to avoid potential dangerous grid conditions. For instance, as indicated above, without a map or other knowledge as to where each smart unit is coupled to on the individual circuits of the local energy grid, each individual smart unit may end up discharging on to the circuit, what it determines to be a safe amount, e.g., 10 A, but collectively this adds to 20 A that if discharged on to the same circuit by the two separate storage units would over load the circuit thereby causing an unsafe condition. Hence, when running multiple units in a system formation, determining an accurate map, as described above, is important. Accordingly, for producing such a map, in accordance with the methods set forth above, the master controller of the MGU may instruct each individual smart energy storage unit to implement one or more of the mapping protocols set forth above.

For example, as indicated above, the MGU may notify a user of the unit, such as via a suitably configured app to manually enter appliance and asset locations, in response to prompts from the app. This may involve the user walking around the home and scanning items such as appliances and/or assets having RFID or other digital tags, with a smart phone so as to geotag the location of all devices and appliances, and thereby build up a topographical map of the various components of the system. Likewise, the system and/or the app may include, or may otherwise make use of, a sensing function such that as the various appliances and units are turned on or off, a current passing through a given circuit is detected, which detected data may be used to identify to which circuits each appliance or unit is coupled, and this may then be used to overlay the topographical map with a circuit map. In other instances, the MGU can organize, initiate, and run one or more automatic mapping protocols, such as those described above, such as via group talk, e.g., Internet of Things, peer to peer, ZigBee, WiFi, Bluetooth, etc.; use of various smart sensors, e.g., smart meters, CT clamps, smart plugs; sending and receiving various forms of digital and/or analog data between the various appliances and units of the system, e.g., detecting resonant frequencies, Ping and Listen, PLC, and the like, such as where the MGU acts as the hub for the sending and receiving of the results data so as to build the topographical and circuit map iteratively as this data is received, analyzed and collated together. And as indicated, this data may be used to charge and/or discharge the various smart energy storage units of the system smartly and with constant energy input and output.

The MGU may also exert control over the transmission of information both within and outside of the local system, so as to control the push and pull of data and other information across the various components of the system. For instance, data may be received from outside sources so as to inform the MGU of conditions that might be relevant to the control of the charge states of the energy storage units. Such data may be from a utility provider, weather service, or other third party. The ICS of the MGU may then use this data to calculate potential charge and/or discharge regimes. Such data, for example, may be related to a rate increase, high cost usage periods (for discharging), low costs usage periods (for discharging), weather forecasts, disaster alerts, and the like. The master controller will then use this data to properly configure the system. Likewise, data from the individual smart units and/or asset may be pushed or pulled to the MGU, where such data may be used to identify trends, inefficiencies, and/or use characteristics, which data may be analyzed by the master controller so as to change its operation parameters in response thereto and/or may be pushed outwards to the utility or other interested third party.

Any and all of such data may be used, for instance, to calculate optimum charge vs discharge rates, optimal scheduling, when to turn on or off, such as based on determined usage and/or environmental trends, e.g., predicted weather patterns, such as unusually hot or cold days, or based on data from previous usage, prediction of future usage, or data used to calculate optimum charge/discharge rate for units, and/or entered usage parameters. Particularly, data received from the utilities may be pushed to the master unit and used to coordinate charge and discharge characteristics based on such received data, such as in determining when to charge v discharge, when to go On/Off line and/or circuit, rate and/or voltage and/or frequency and/or amperage at which to charge or discharge.

Accordingly, in various instances, the MGU may configure the system so as to not be a net exporter of energy. Hence, via the various methods disclosed herein, the MGU may determine the balance between what is being produced and consumed on the consumer side of the electric grid, and in response thereto turns smart assets "on" or turns them "off", and/or otherwise regulates their functional capacities, so as to at most only match consumer production or supply with demand, in a manner so as to not be a net exporter of energy. Although, in some instances, when desired, the system and/or individual smart units may be configured so as to be a net exporter of energy. This may be useful in those situations where money or credits earned by being a net exporter of energy (e.g., turning the meter backwards), is less than the costs incurred when consuming energy, e.g., turning the meter forwards. Hence, in such an instance, it may not be economical to be an exporter of energy. Rather, it is more useful to produce, store, and use that energy during times of high demand costs.

Hence, to avoid being a net exporter of energy, the MGU determines how much energy is coming in off of the regional macro grid, and then determines how much energy needs to be generated and/or discharged to meet that demand, and may also determine where and how to best meet the various load demands. In such instances, once the MGU receives all the requisite information about energy coming in, e.g., from the smart meter, it then determines how energy supply is to be allocated to the various smart assets, e.g., energy storage units, and then instructs those smart assets to meet those supply demands, e.g., on a circuit by circuit basis.

Specifically, in various embodiments, the ICS of the MGU may determine a total amount of energy that needs to be supplied, where, and how, and the MGU may further determine which units need to be employed so as to meet those needs, and how much each unit is to supply, and over what time period. This information may be used to generate instructions that may then be sent from the ICS of the MGU to the various ICSs of the servant smart energy storage units, which instructions may then be forwarded to their respective GFCs, and the GFCs will then control the discharge of the instructed amount of energy to the grid in the characterized conditions. More specifically, each unit's individual ICS instructs its corresponding GFC at what rate and character to discharge energy at, e.g., what amount of amps, at what frequency, voltage, and over what time, which may be in accordance with instructions received by the MGU. However, it is to be noted, in various instances, the GFC may not discharge even when instructed to discharge such as when certain conditions are met. For instance, the GFC may include or otherwise be associated with a ground fault circuit interrupter (GFCI) or Residual Current Device (RCD) or other such device that is configured for shutting off the electric power circuit, such as under one or more prescribed conditions, such as when it detects that current is flowing along an unintended path, such as through water or other non-grid coupled artifact.

Additionally, the MGU, once established, may configure the individual units to function as a collective with respect to charging and discharging. For instance, the MGU will determine how much load is on any one circuit, and will then direct the charging and discharging of any such circuit associated smart energy storage units to ensure that they operate within safe parameters. This may include iterative, continuous, stepped up or stepped down, and/or curvilinear charging and discharging of the units, including the coming on and going off line, so as to perform their operations in an efficient manner, and avoid tripping of the breakers. Further, the MGU can direct the mapping functions of the various smart assets and appliances, and once mapping is done, it can then determine how much any one unit as well as the collective can charge and discharge, which map may be maintained until something changes in the positioning of the assets, and if such changes in position occur, then mapping can be performed again.

Accordingly, once mapping has been performed, such as to integrate the smart energy storage units, sensors, and appliances, and/or power generators, into a collective system, then off-setting and/or net zeroing may occur, such as in a smart manner. Such mapping may be useful so as to allow the MGU to locate all sources of energy provision, can determine load, and can determine offset and timing of such, such as during high peak times, and charging during low peak times, and in some instances, the MGU can determine a load curve and then determine and implement a corresponding supply curve. Specifically, once it is known what appliances are on what circuits, then the MGU can determine the load on all of the circuits, can determine what amount of supply is capable of meeting that load, and can then configure the system to meet and zero out that load.

Additionally, where mapping has been performed, the MGU can determine when and how to charge the various battery components of the smart energy storage units, such as for those units not discharging on circuits where the maximum capacity has not been reached. In such an instance, the charging may be performed up to the maximum capacity limit. The MGU can also determine the conditioning of discharging so as to be within various predetermined ranges and having determined conditions (e.g., such as to minimize and/or remove oscillations of the energy wave). Further, it is to be noted that in some embodiments, a smart energy storage unit or at least a battery portion thereof may be positioned inside of an appliance, and can therefore be controlled by the MGU, which MGU can then control the appliance, especially with respect to its charging and discharging, and power conditioning.

In some instances, such control can include the splitting of power coming in, such as between part going to supplying the running of the appliance load, and the other part going to charging the smart battery component. The control can also include switching between the appliance going on grid and going off grid. In such an instance as this, the appliance may be controlled remotely via the ICS of its attendant battery component, via a suitably configured communications protocol, which may include the appliance being controlled by an interactive "app" that is accessible via a smart computing device, such as a smart phone, thereby allowing the user to access the system configuration and/or turn various smart assets and appliances on or off, as desired or suggested by the system. Further, it is to be noted that the term appliance may be expanded to include any piece of furniture having a smart energy storage unit therein, and not simply to electronic appliances. Thus, an appliance may include a sofa, a chair, a table, a cabinet, dresser, bed, etc. that includes one of the smart assets herein, including various Bluetooth, ZigBee, WiFi or cloud based connectivity capabilities.

Accordingly, as indicated herein, the system may be accessible via an "app," which app may further verify that all safety parameters are being met. For instance, one such safety parameter may include the placement of a placard indicating that the household, or building, or complex, is serviced by a smart grid asset system. Particularly, the placard could be required to be correctly displayed and verified, e.g., via the app, prior to the smart unit and/or system being allowed to go online and/or on-grid. For example, the system, e.g., accessible via the app, may require that a specified placard identifying the system be positioned, such as on cover of the fuse box, so as to identify and/or warn that an off-utility grid energy system is provided to the household.

The system may also require that the placement of the placard be verified such as by taking a time stamped photo of its placement and uploading the picture, e.g., via the app, to the system for system verification, where once verified will allow the system to go online and/or on-grid. This may also be verified by GPS location associated with the photo. Such verification can also be done through RFID tagging and/or via use of a smart meter and/or CT clamp recognizing the presence of the placard on the fuse box.

FIG. 1A shows a schematic diagram of an exemplary embodiment of multiple energy storage units connected to circuits of a building, the energy storage units offsetting energy taken in from energy source 100 to safely produce a net zero intake of energy from energy source 100. Energy source 100 is electrically connected to fusebox 102 of a building (not depicted) and supplies electric energy to fusebox 102. The energy source may be an electric grid or a local grid equivalent, such as a photovoltaic energy source, a heat exchange energy source, a wind turbine, a fuel cell, an electric vehicle, a wave energy converter, and the like. An energy monitor or sensor 104 is attached to the main energy inputs (not shown) of fusebox 102, in order to detect the electric energy being taken into fusebox 102 from the energy source 100. Exemplary energy monitors may include smart meters, current clamps, or other sensors. Fusebox 102 is also connected to multiple electrical circuits 1, 2, and 3 of the building. Energy storage units 106, 108, and 110 are each electrically connected to circuits 1, 2, and 3, respectively. Energy storage units 106, 108, and 110 may include energy storage cells to store energy and may output power as either alternating current or as direct current. In the embodiment depicted, energy monitor 104 has wired or wireless communication functionality that allows it to send data regarding energy intake into fusebox 102. In this embodiment, energy storage unit 106 is designated as a master unit 116, while energy storage units 108 and 110 are designated as slave unit 117a and slave unit 117b, respectively; however in some embodiments, energy storage units 108 or 110 may be designated a master unit and the other two units may be designated slave units. An appliance 112 is also electrically connected to circuit 1, and drawing 1.8 kW of power on that circuit.

Energy monitor 104 sends data signal(s) 114 to energy storage unit 106 that 1.8 kW of power are being taken in at the main energy inputs for the building (about the maximum safe amount of power for a given household circuit in the United States). Energy storage unit 106 then determines how many units are required to safely discharge the energy required to offset the load being drawn by the appliance 112, in this case 1.8 kW of power can be safely discharged by the energy storage unit 106 on circuit 1. As energy storage unit 106 begins to discharge stored energy onto circuit 1, that energy is consumed by appliance 112, and thereby reducing the energy being taken into fusebox 102. Energy storage unit slowly increases its energy discharge onto circuit 1 to offset the power being taken in at fusebox 102, while receiving data from energy monitor 104 regarding the decreasing amount of energy being taken in at fusebox 102. Energy storage unit 106 continues to increase its power output until energy monitor 104 signals that about zero power is being taken in via the main power inputs at fusebox 102.

Figure 1B:
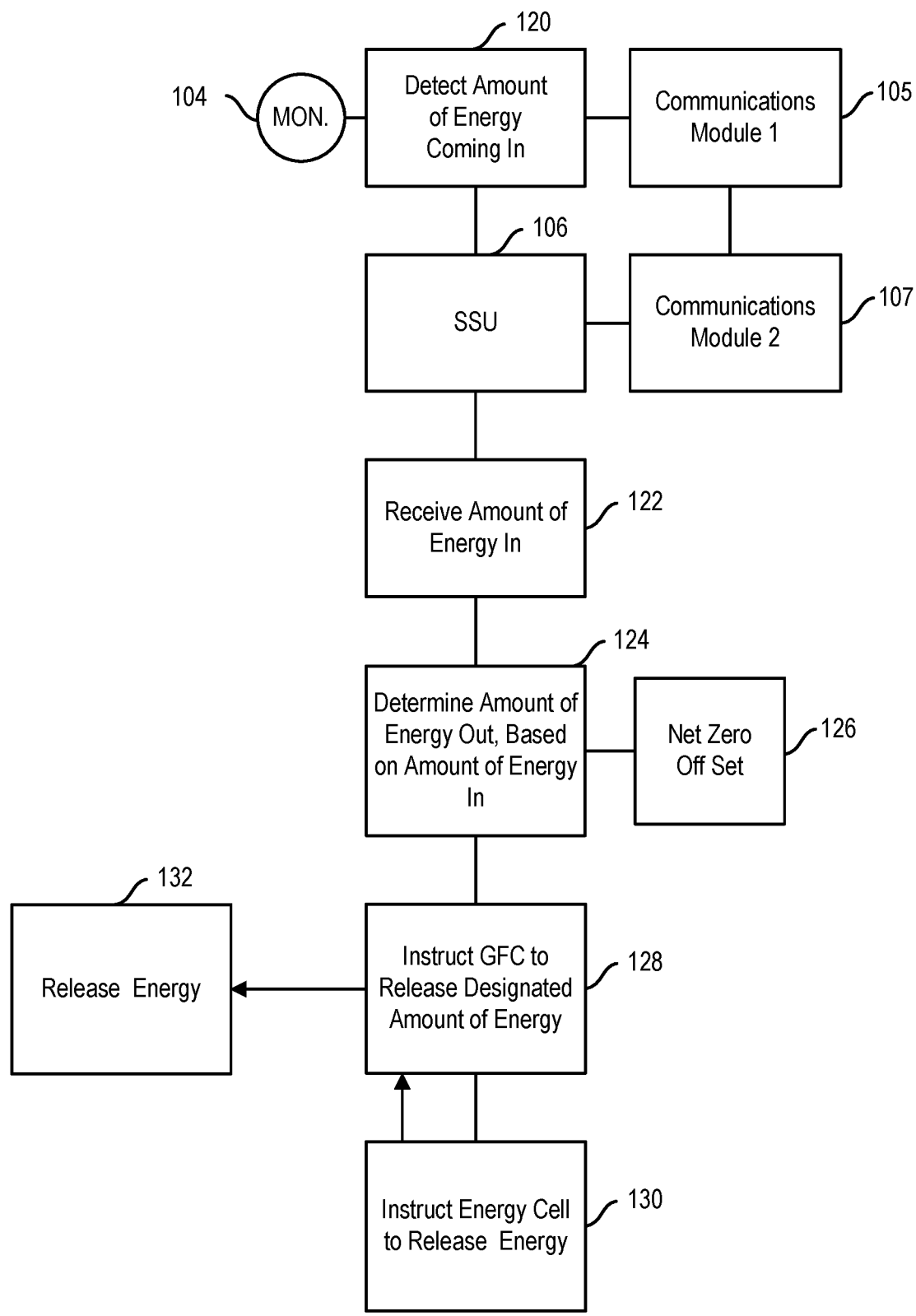
FIG. 1B is a flow chart of steps for the smart discharging of a smart storage unit.

FIG. 1B is a flow chart of steps for the smart discharging of smart storage unit 106 described above for FIG. 1A. At step 120, energy monitor 104 detects the amount of energy being received at the main energy inputs (such as into fusebox 102 of FIG. 1A), and sends data signal(s) from an associated communications module 105 of energy monitor 104 to another communications module 107 that is associated with smart storage unit 106. At step 122, smart storage unit 106 receives the data signal representing the amount of energy being taken at the main energy inputs, and at step 124 the smart storage unit 106 determines the amount of energy it needs to output or discharge, based on the amount of energy detected by energy monitor 104. This is the net zero offset 126. At step 128, the smart storage unit 106 instructs its GFC (not shown) to discharge a designated amount of energy, and at step 130, the GFC instructs the storage cell(s) (not shown) of the smart storage unit 106 discharge the specified amount of energy. Finally, an amount of energy is discharged at step 132 from the storage cell(s) of the smart storage unit 106 into the circuit to which it is electrically connected.

Figure 1C:
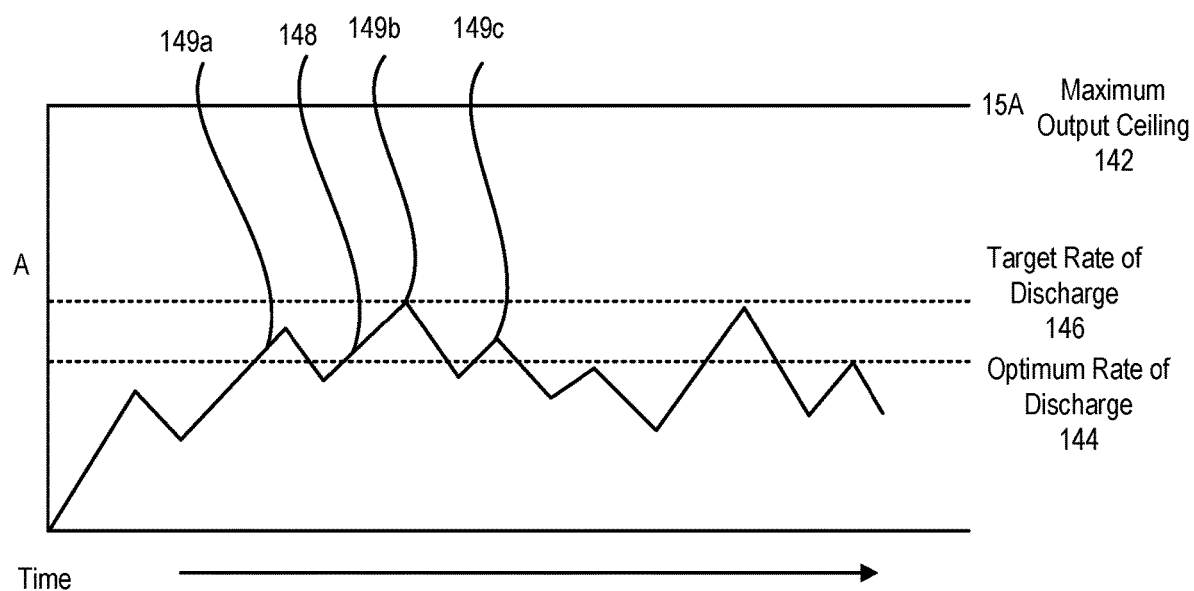
FIG. 1C shows a graph that demonstrates an exemplary desired energy discharge from an energy storage unit in amperage over time.

FIG. 1C shows a graph that demonstrates an exemplary desired energy discharge from an energy storage unit in amperage over time. Energy discharge by energy storage units of the instant disclosure may be output in gradually increasing amperage over time, using a target rate of discharge and/or an optimum rate of discharge in order to avoid tripping a breaker in a fusebox for the energy storage unit's circuit. The discharge rate line 148 slowly increases from 0, starting at the origin of the graph, reflecting the gradual increase of energy being discharged from the energy storage unit, in order to avoid activating the breaker on the energy storage unit's circuit due to sudden energy peaks. The graph of FIG. 1C depicts a maximum output ceiling 144 of 15 A, reflecting a maximum circuit rating for the circuit to which the energy storage unit is connected; however, in certain embodiments, larger output ceilings (e.g. 20 A) may be used, or smaller output ceilings (e.g. 10 A) may be used by energy storage units of the instant disclosure.

An optimum rate of discharge 144 of the energy storage unit is indicated on the graph, and the discharge rate line 148 of the graph is within a range of the optimum rate of discharge 144. The graph of FIG. 1C also depicts a target rate of discharge 146, which is larger than the optimum rate of discharge 144. In some embodiments, if the target rate of discharge 146 is too close to maximum output ceiling 142, then the optimum rate of discharge 144 may be lower than the target rate of discharge 146. In some embodiments, if the target rate of discharge 146 is sufficiently lower than maximum output ceiling 142, then the optimum rate of discharge 144 may be the same as target rate of discharge 146. In the exemplary graph of FIG. 1C, energy peaks 149a, 149b, and 149c are kept within a range of optimum rate of discharge 144 to prevent extended current above 15 A and thus setting off a circuit breaker. In a manner such as this, a plurality of smart energy storage units can function collectively in a coordinated manner, where their charging and discharging is optimized, so as to ensure the longevity of the units, and/or the lifespan of their respective energy storage cells.

In certain instances, turning on appliances that are electrically connected to a given circuit may cause the circuit to have an unsafe load. For example, in the United States, circuits within a home may each only safely draw 15 A, or about 1.8 kW of power. If a circuit draws more than that amount of power, then a fuse in a fusebox trips to separate the circuit from power drawn from a power source (such as grid power or a grid equivalent), and forestall the dangerous condition. If an energy storage unit were to supply power to a circuit despite an unsafe amperage being supplied to a circuit from a power source, then even if the associated circuit breaker trips, power could still be supplied to the circuit by the energy storage unit, creating an unsafe electrical condition in the circuit.

Figure 2A:
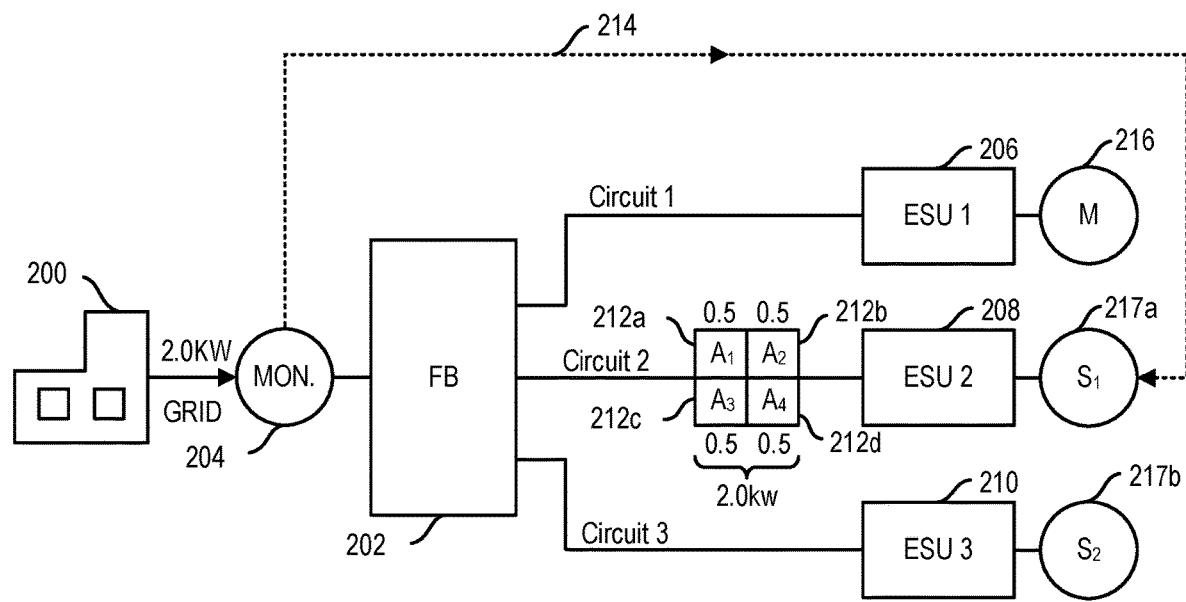
FIG. 2A shows a schematic diagram of an exemplary embodiment of multiple energy storage units electrically connected to circuits in a building in an instance in which an unsafe load occurs on circuit.

FIG. 2A shows a schematic diagram of an exemplary embodiment of multiple energy storage units electrically connected to circuits in a building in an instance in which an unsafe load occurs on circuit. Energy source 200 is supplying energy to fusebox 202 via main energy inputs (not shown). The energy source may be an electric grid or a local grid equivalent, such as a photovoltaic energy source, a heat exchange energy source, a wind turbine, a fuel cell, an electric vehicle, a wave energy converter, and the like, or any mixture thereof. Energy monitor 204 is attached to the main energy inputs to detect the energy entering fusebox 202 from the main energy inputs. In the embodiment depicted, energy monitor 204 has wired or wireless communication functionality that allows it to send data regarding energy into fusebox 202. Circuits 1, 2, and 3 are electrically connected to fusebox 202 and include energy storage units 206, 208, and 210 respectively. In the depicted embodiment, appliances 212a, 212b, 212c, and 212d are each on circuit 2, and each are capable of drawing about 0.5 kW of power. Initially, only appliances 212a, 212b, and 212c are drawing power (with a power draw of about 1.5 kW, under a circuit safety maximum of about 1.8 kW), with appliance 212d being in an off state and not drawing any power from the circuit. Energy monitor 204 sends one or more data signals 214 to energy storage unit 208 that represents the power being taken into the fusebox (about 1.5 kW when appliances 212a, 212b, and 212c are powered on). In the depicted embodiment, data signal(s) 214 is received directly by energy storage unit 208; however, in certain embodiments, data signal(s) 214 may be received by energy storage unit 206, designated as a master unit 216, which then sends another data signal to energy storage unit 208, designated as a slave unit 217a (energy storage unit 210 is also designated as a slave unit 217b). In some embodiments, energy storage units 208 or 210 may be designated a master unit and the other two units may be designated slave units.

When appliance 212d is powered on, it immediately begins drawing an additional 0.5 kW of power to circuit 2, thus drawing about 2.0 kW of power from power source 200. Power monitor 204 detects this increase in power and transmits it via data signal(s) 214 to energy storage unit 208. Energy storage unit 208 compares the detected power draw from data signal(s) 214 to a predetermined power threshold; since the detected power draw is above a safety limit of about 1.8 kW, energy storage unit 208 does not discharge any power from its storage cells or batteries (not depicted). A circuit breaker for circuit 2 in fusebox 202 may then open as needed to separate circuit 2 from main power source 200 and prevent dangerous conditions in the circuit. It is to be noted, that in this instance, an electronic and/or digital signal is sent from the power monitor to the smart energy storage unit, however, in certain instances, this need not be the case, such as where the smart storage unit coupled to the same circuit as appliance 212d recognizes the appliance 212d coming on-line by the increase load the unit experiences. Additionally, where a plurality of smart energy storage units are provided, a master group unit been determined, and/or mapping been performed, as per above, then the MGU may determine this change of conditions and respond by instructing the storage unit 208 to go offline, while bringing on another off-circuit 2 energy storage unit, if necessary to meet demand. In such an instance, the circuit breaker of the circuit 2 will recognize the overloaded condition, and the breaker will trip, thus, removing the entire circuit from the grid. Further, any depletion of the local network as a whole will be met by the new unit brought on line on a different, non-overloaded circuit.

Figure 2B:
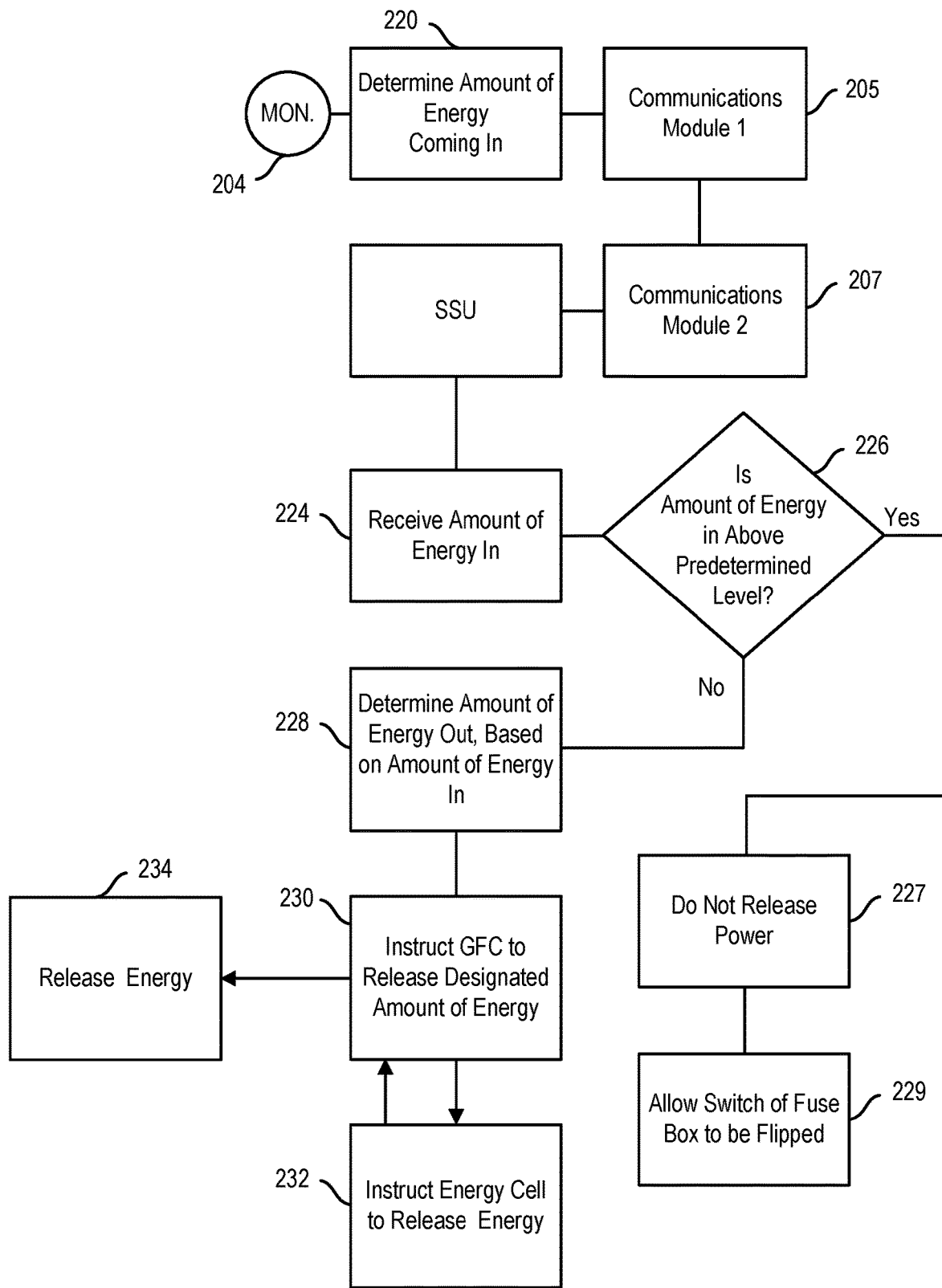
FIG. 2B is a flow chart of the steps for intelligent discharging or non-discharging of an energy storage unit.

FIG. 2B is a flow chart of the steps for smart discharging or non-discharging of energy storage unit 208 described above for FIG. 2A. At step 220, energy monitor 204 detects the amount of energy being received at the main energy inputs into fusebox 202 (not shown), and sends one or more data signals from communications module 205 (associated with monitor 204) to a communications module 207 of smart storage unit 208. At step 224, smart storage unit 208 receives the data signal representing the amount of energy being taken at the main energy inputs and at step 226 analyzes whether the amount of energy being taken in at the main power inputs is above a predetermined level. If not, then at step 228, the smart storage unit 208 may determine the amount of energy to output or discharge based on the amount of energy being taken in. At step 230, smart storage unit 208 instructs its GFC to discharge a designated amount of energy, and at step 232, the GFC instructs the storage cell(s) of the smart storage unit 208 to discharge the specified amount of energy. Finally, at step 234 an amount of energy is released or discharged from the storage cell(s) of the smart storage unit 208 into the circuit to which it is electrically connected.

If the smart storage unit 208 determines (at step 226) that the amount of energy being taken in at the main power inputs is above a predetermined level, then at step 227, smart storage unit 208 does not instruct its GFC to release or discharge any energy from its storage cells, thereby allowing an associated circuit breaker in fusebox 229 to open.

In another example, an energy storage unit may already be discharging energy into a circuit in order to offset energy intake from a power source, such as a grid or grid equivalent, and the circuit may experience dangerous excess current, such as from a high-load appliance or a short circuit or other issue with the circuit. In such instances, the energy storage unit may force the circuit breaker to trip or open. Such an instance is easily dealt with when the circuit is serviced by the smart energy assets set forth herein, such as where any circuit associated sensors, appliances, and/or power generators are communications enabled and capable of communicating their conditions to a smart energy storage unit, e.g., MGU, of the system, I which case, the MGU can recognize the unsafe condition and reconfigure the circuit associated assets to alleviate the dangerous condition. However, where the circuit coupled assets are not smart, or not otherwise communications enabled, an unsafe condition could result, if the smart energy storage unit were not configured with certain safeguards to account for such circumstances.

For instance, returning to FIG. 2A, appliances 212a, 212b, and 212c may collectively be on a given circuit and drawing 1.5 kW of energy. If energy storage unit 208 is discharging 1.5 kW of energy to supply those appliances, then no energy will be drawn from energy source 200 into fusebox 202 via main energy inputs, a net zero state, therefore, results at the main energy inputs. If appliance 212d turns on, it will begin drawing a 0.5 kW load, and energy storage unit 208 will only be able to discharge another 0.3 kW of energy up to its predetermined output ceiling of 1.8 kW. The remaining 0.2 kW required by appliance 212d will be drawn from energy source 200. A dangerous current draw of 2.0 kW is now occurring on circuit 2; however the breaker for circuit 2 in fusebox 202 may not detect the condition.

In such instances, where energy monitor 204 is communicably present, it sends one or more data signals to energy storage unit 208 that additional energy is being taken in. Energy storage unit 208 compares the amount of energy it is discharging (in this instance 1.8 kW) with the amount of energy being taken in at energy monitor 204 (0.2 kW); if this amount is over a predetermined threshold (in this instance 1.8 kW), then energy storage unit tells its GFC to cease discharging energy, and go into off-grid mode. When this occurs, energy source 200 will then step in to supply the required energy, and the entire 2 kW of power will flow into the circuit. As this amount of energy is 0.2 kW above the safety limit for this circuit, the circuit will heat up, and/or the breaker will trip, thus, taking the entire circuit off-grid. In such an instance, the energy storage unit could, then go back on-grid, however, its output would be bounded by the safety limit for that particular circuit, e.g., 1.8 kW, and thus, the smart storage unit will not discharge energy above that limit.

Figure 3:
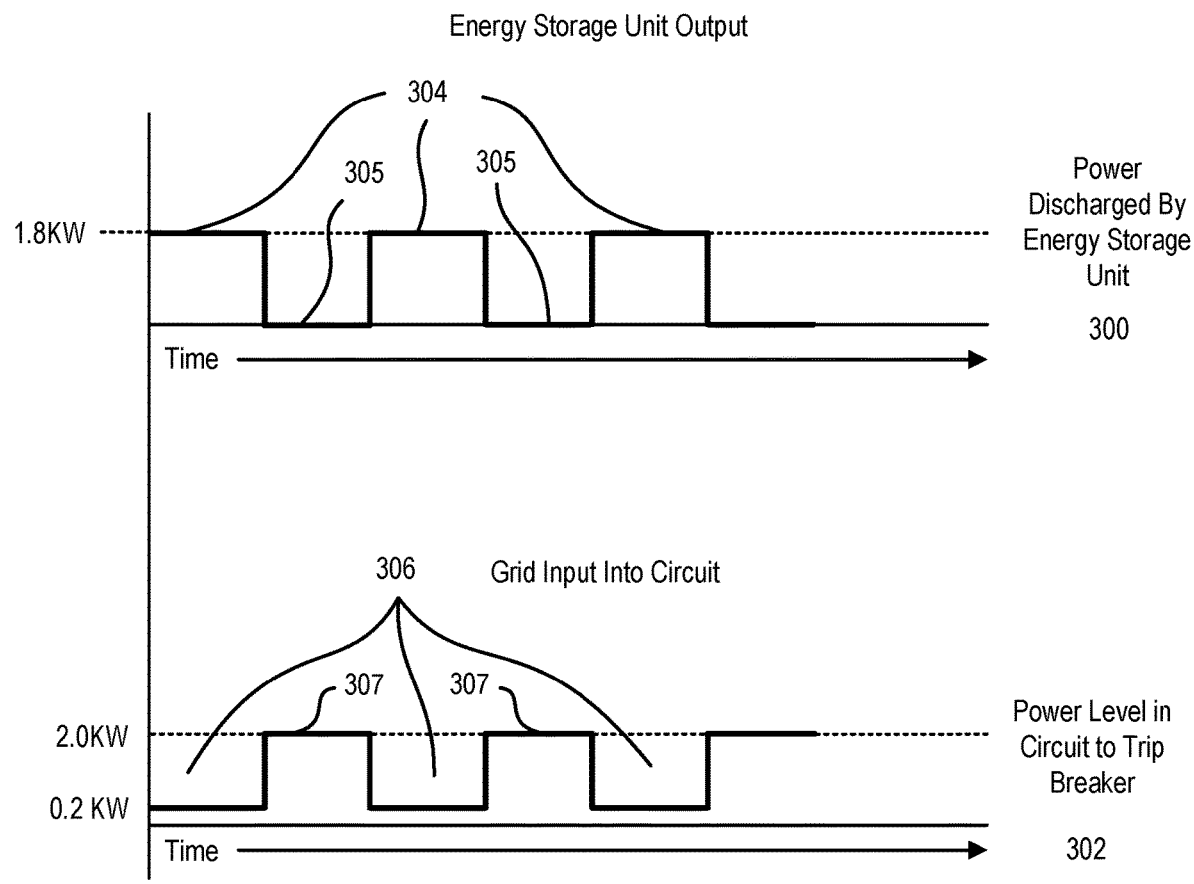
FIG. 3 shows graphs that illustrate an exemplary energy storage unit output, as well as the simultaneous grid input into a circuit.

FIG. 3 shows graphs that illustrate the energy storage unit output, as well as the grid input into the circuit. Both graphs show energy level over time. Energy peaks 304 of energy storage unit output are at a level that is at least the maximum output for the circuit. Here, energy discharged by energy storage unit 300 is at 1.8 kW, or 15 A; however, the energy level may be much higher to ensure that the breaker opens quickly, such as about 30, 35, 40, 45, 50, 55, 60, 65, 70, 75, or 80 A. Energy peaks 304 are timed so as not to be too long and cause overheating. Energy peaks 304 are followed by dwells 305, which are long enough to allow the breaker to trip and therefore open. The cycle of energy peaks 304 and dwells 305 may change over time to ensure that heat builds incrementally at the circuit breaker. Energy peaks 304 are of a nature to produce or otherwise correspond with dwells 306 of the grid input of energy into the circuit, which thereby results in the energy peaks 307, following dwells 306, within the circuit being large enough to trip the circuit breaker. In this instance, the power level in the circuit to trip the breaker 302 is at about 2.0 kW, well above the 0.2 kW being supplied by the grid (or grid equivalent) input.

Figure 4A:
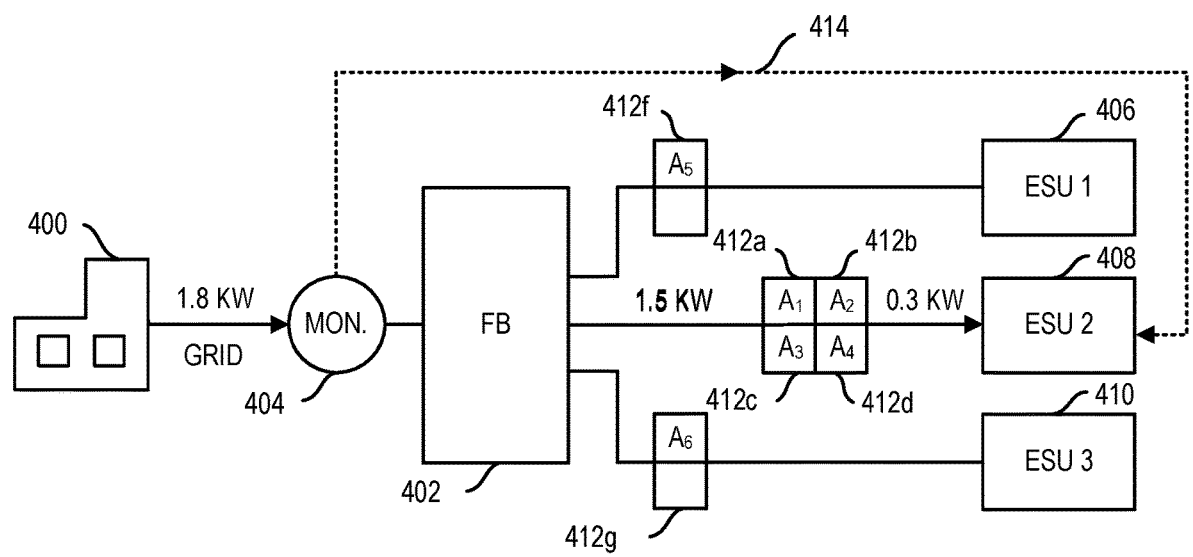
FIG. 4A is a schematic diagram of multiple energy storage units connected to circuits of a building and receiving available energy from a utility grid energy source to charge their storage cells.

In certain instances, appliances that share a circuit with an energy storage unit may be consuming less energy than the safe maximum allowed for that circuit. This excess available energy bandwidth may be received by the energy storage unit and stored in the energy storage unit's storage cells. FIG. 4A is a schematic diagram of an exemplary embodiment of multiple energy storage units connected to circuits of a building, the energy storage units receiving available energy to charge their storage cells. Energy source 400 is electrically connected to fusebox 402 of a building (not shown) and supplies electric energy to fusebox 402. The energy source may be an electric grid or a local grid equivalent, such as a photovoltaic energy source, a heat exchange energy source, a wind turbine, a fuel cell, an electric vehicle, a wave energy converter, and/or the like and mixtures thereof. An energy monitor or sensor 404 is attached to the main energy inputs (not shown) of fusebox 402, in order to detect the electric energy being taken into the entire building from the energy source 400. Exemplary energy monitors may include smart meters, current clamps, or other sensors. Fusebox 402 is also connected to multiple electrical circuits 1, 2, and 3 of the building. Energy storage units 406, 408, and 410 are each electrically connected to circuits 1, 2, and 3, respectively. Energy storage units 406, 408, and 410 may each include one or more energy storage cells to store energy and may output power as either alternating current or as direct current. Energy monitor 404 has wired or wireless communication functionality that allows it to send one or more data signals 414 regarding energy intake by circuits 1, 2, and 3 to energy storage unit 408.

Circuit 2 includes electrically connected appliances 412a, 412b, 412c, and 412d; circuit 1 includes an electrically connected appliance 412f, and circuit 3 includes electrically connected appliance 412g. Appliances 3 412a, 412b, 412c, and 412d on circuit 2 are drawing about 1.5 kW of energy (about 0.375 kW per appliance), 0.3 kW below the safe operating maximum of 1.8 kW for circuit 2. This allows for about 0.3 kW that can still be utilized by energy storage unit 408 on circuit 2 for charging its storage cells (not shown). Before energy storage unit 408 begins charging and becoming a load on circuit 2, energy monitor 404 may detect an energy draw of 1.5 kW, assuming that appliance 412f and energy storage unit 406 on circuit 1, and appliance 412g and energy storage unit 410 circuit 3 are not drawing or offsetting power. Energy monitor 404 transmits one or more wired or wireless data signals 414 to energy storage unit 408 that the current draw into fusebox 402 is about 1.5 kW. Energy storage unit analyzes the amount of energy (from data signal(s) 414) against a predetermined upper limit, in this case 1.8 kW, and determines that 0.3 kW of energy can be drawn from the circuit for charging purposes. Energy storage unit 408 may then signal its GFC to begin drawing a load up to about 0.3 kW in order to charge its storage cell(s).

Figure 4B:
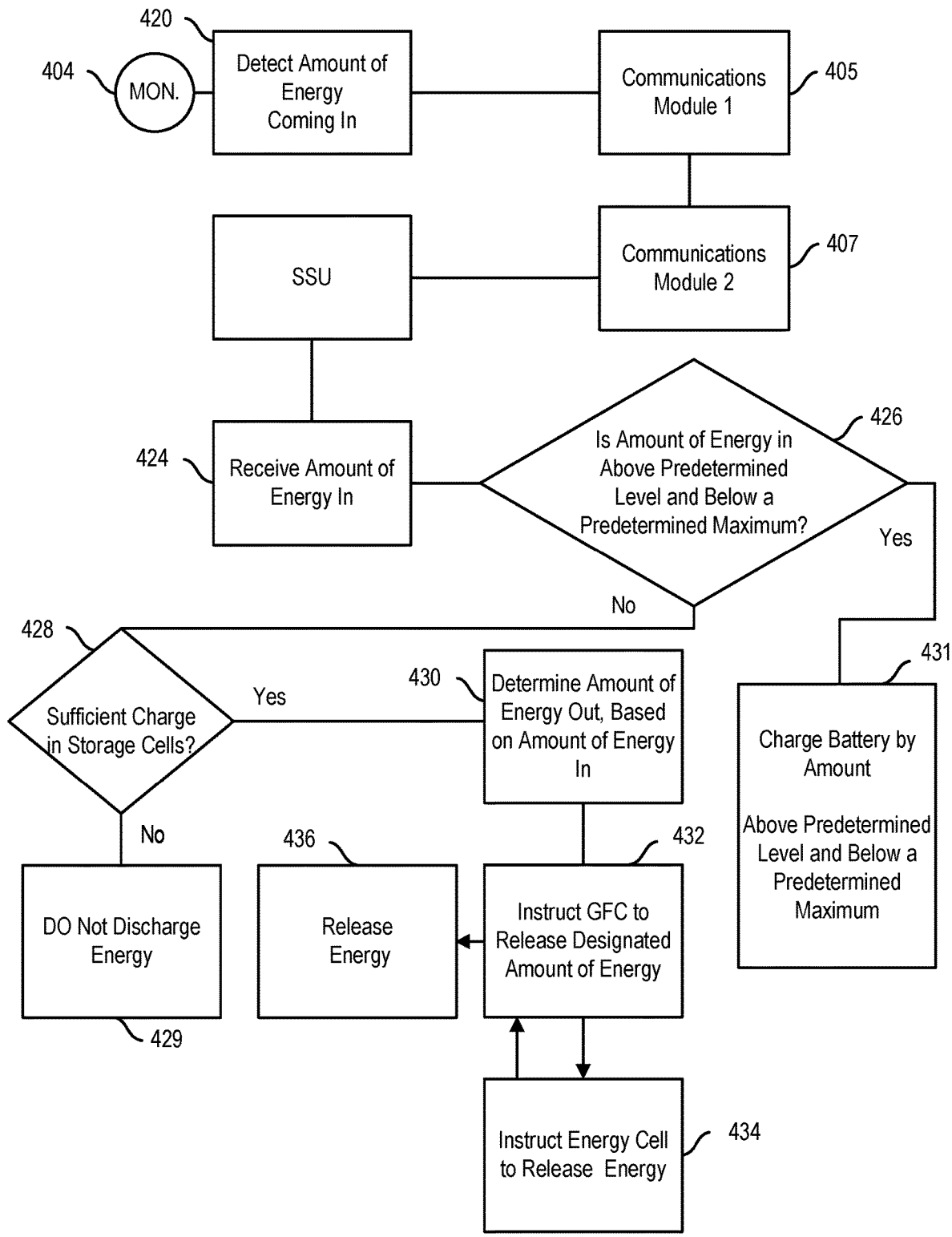
FIG. 4B is a flow chart of steps for the smart charging of an energy storage unit.

FIG. 4B is a flow chart of the steps for the smart charging of energy storage unit 408 described above for FIG. 4A. At step 420, smart storage unit 404 detects the amount of energy coming in to main inputs of fusebox 302, and sends a data signal from a communications module 405 associated with energy monitor 404 to a communications module 407 associated with smart storage unit 408. At step 424, smart storage unit 408 receives the data signal representing the amount of energy being taken at the main energy inputs and at step 426, smart storage unit 408 analyzes whether the amount of energy being taken in at the main power inputs is above a predetermined level and below a predetermined maximum level. If so, then at step 431, the smart storage unit 408 may instruct its GFC to begin charging its storage cells by a load amount that would not bring the energy detected by energy monitor 404 above the predetermined maximum level.

If the amount of energy being taken in at the main power inputs is not above a predetermined level and below a predetermined maximum level, then at step 428, smart storage unit 408 may determine whether its storage cells are in a condition to be charged. If the storage cells do not have sufficient charge, then at step 429 smart storage unit 408 may take in energy so as to charge the energy storage cells. Alternatively, if the storage cells of the smart storage unit 408 do have sufficient charge to supply energy to its circuit, and there is a need for energy to be supplied to the circuit, then at step 430, the smart storage unit 408 may determine the amount of energy to output or discharge based on the amount of energy being taken in. At step 432, smart storage unit 408 instructs its GFC to discharge a designated amount of energy, and at step 434, the GFC instructs the storage cell(s) of the smart storage unit 408 discharge the specified amount of energy. Finally, at step 436 an amount of energy is released or discharged from the storage cell(s) of the smart storage unit 408 into the circuit to which it is electrically connected.

In certain embodiments of the energy storage systems and methods described herein, it is useful for the energy storage units to have information regarding what other appliances and/or smart assets may be on a given circuit, the loads of those appliances when they are turned on, and whether multiple energy storage units are on a given circuit. Such information may be determined such as by performing one or more mapping protocols, as described herein above. Knowing what appliances are on a given circuit with one or more energy storage units allows disaggregation of energy output from the energy storage units, and allows each energy storage unit to produce what it can for a given circuit, without concern that one or more energy storage units will discharge too much energy while trying to offset energy from a grid or grid-equivalent energy source and cause circuit overheating beyond its safety limit.

Figure 5A:
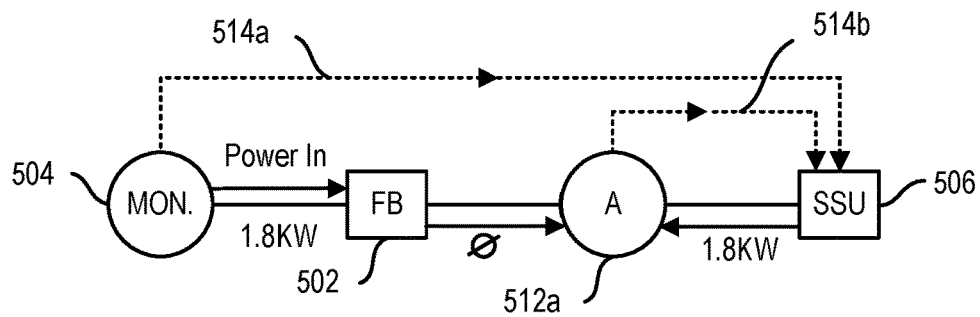
FIG. 5A shows a schematic diagram of an energy monitor, a fusebox, an appliance, and a smart storage unit, with the energy monitor and appliance communicating with the smart storage unit.

Additional information from appliances regarding the load they are drawing while on a given circuit may be transmitted via wired or wireless communication to an energy storage unit via an AC plug having a microprocessor and/or communication module (see disclosure below), or via a sensor and communication module manufactured into the appliance itself. For example, FIG. 5A shows a schematic diagram of a fusebox 502 that receives energy from a power source (e.g. a utility or utility equivalent power source) via main energy inputs (not shown). An energy monitor 504 (e.g. smart meters, current clamps, or other sensors) is associated with the main power inputs to detect the electric energy being taken into fusebox 502. Energy monitor 504 detects the amount of energy coming into fusebox 502 over time and transmits data representing the amount of energy over time via one or more data signals 514*a* to smart storage unit 506. The data signal(s) 514*a* may be transmitted in a wired or wireless fashion (e.g. WIFI, BLUETOOTH, ZIG-BEE and the like). In addition, appliance 512*a* also includes a sensor for detecting the current it draws when turned on and a microprocessor to convert that into data that may also be transmitted to smart storage unit 506 via one or more data signal(s) 514*b*. If smart storage unit 506 knows that only appliance 512*a* is on its circuit, it can discharge as much energy as is required for appliance 512*a*, or more, up to the circuit safety limit (in this case 1.8 kW), taking into account the amount of energy being taken in at fusebox 502. Accordingly, if the load is known and/or the smart energy storage unit knows the amount of energy being taking in off the grid, and/or directed to its particular circuit, then the smart energy storage unit may easily make a determination as to whether it is safe to charge or discharge with respect to this circuit.

Figure 5B:
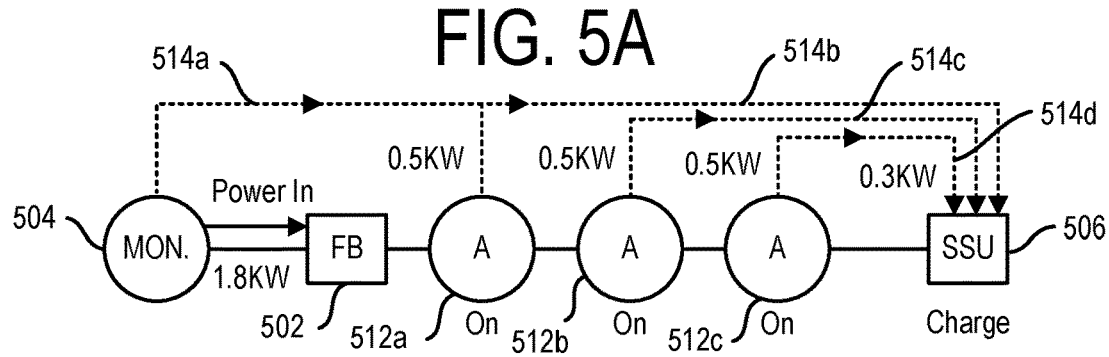
FIG. 5B shows a schematic diagram of an energy monitor, a fusebox, three appliances, and a smart storage unit, with the energy monitor and the appliances communicating with the smart storage unit.
Figure 5C:
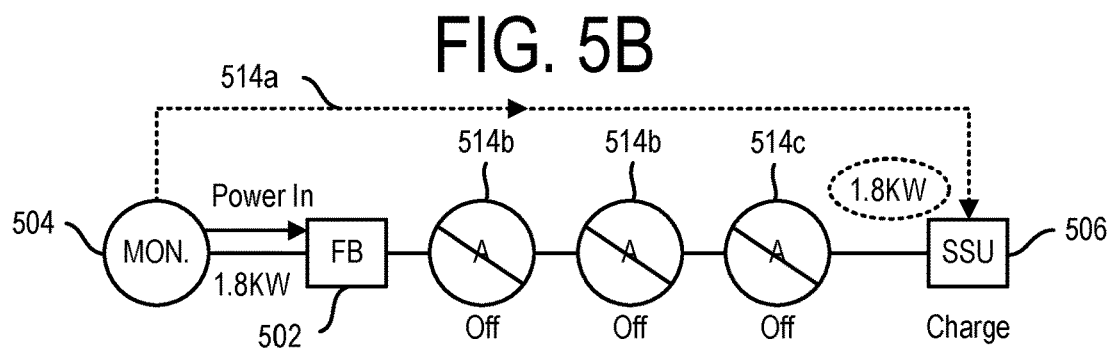
FIG. 5C shows a schematic diagram of an energy monitor, a fusebox, three appliances that are turned off, and a smart storage unit, with the energy monitor communicating with the smart storage unit.

FIG. 5B shows a schematic diagram of another embodiment of a circuit that includes three appliances 512*a*, 512*b*, and 512*c* in series. As energy enters fusebox 502 from an energy source, the current may be detected by energy monitor 504 and transmitted in a wired or wireless fashion to smart storage unit 506 via data signal(s) 514*a*. Each of the appliances 512*a*, 512*b*, and 512*c* have either an AC plug with a sensor, communications module, and microprocessor, or have those components built into the appliance itself. When each of the appliances is turned on, they each draw about 0.5 kW of energy into the circuit, for a total of about 1.5 kW. Appliances 512*a*, 512*b*, and 512*c* each transmit data signal(s) 514*b*, 514*c*, and 514*d*, respectively to smart storage unit 506 for analysis. Smart storage unit 506 knows that only appliances 512*a*, 512*b*, and 512*c* are on its circuit, and receives the data signal(s) 514*b*, 514*c*, and 514*d*, and matches its output to the loads. About 0.3 kW of energy may still be drawn by smart storage unit 506 in order to charge its energy storage cell(s) (not shown) while it is offsetting the load on its circuit. Any circuit issues or addition of unsafe loads along with appliances 512*a*, 512*b*, and 512*c* can be addressed by the circuit breaker for that circuit. FIG. 5C depicts the schematic diagram of FIG. 5B when appliances 512*a*, 512*b*, and 512*c* are all turned off. In this instance, smart storage unit 506 may charge its storage cell(s) by drawing up to the full current allowed for the circuit, about 15 A or 1.8 kW of energy. If one or more of appliances 512*a*, 512*b*, and 512*c* are turned on, then the respective data signal(s) for the appliance may be sent to smart storage unit 506 and it can accordingly decrease the amount of energy it draws for charging.

Figure 5D:
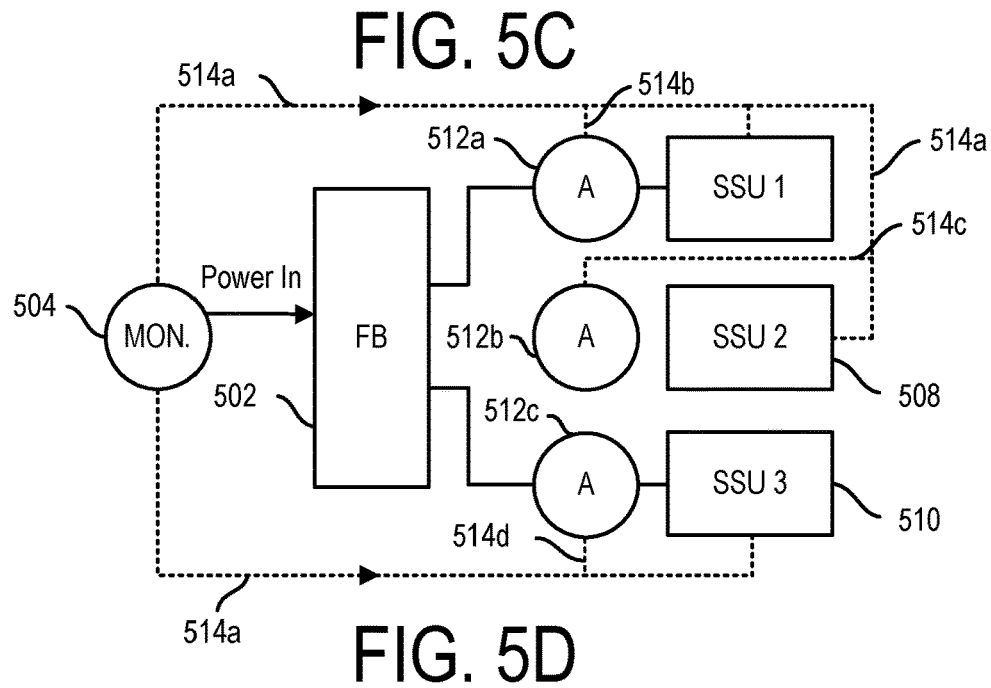
FIG. 5D shows a schematic diagram of an energy monitor, a fusebox, three appliances on different circuits, and a smart storage unit, with the energy monitor and all three appliances communicating with the smart storage unit.

FIG. 5D shows an embodiment in which appliances 512*a*, 512*b*, and 512*c* are each on separate circuits along with a single smart storage unit. Smart storage unit 506 is on the same circuit as appliance 512*a*, smart storage unit 508 shares a circuit with appliance 512*b*, and smart storage unit 510 shares a circuit with appliance 512*c*. Energy monitor 504 detects the energy taken in at fusebox 502 and sends data signal(s) 514*a* to smart storage units 506, 508, and 510. Each appliance 512*a*, 512*b*, and 512*c* also send respective data signal(s) 514*b*, 514*c*, and 514*d* to smart storage units 506, 508, and 510. Each of the smart storage units 506, 508, and 510 can discharge energy appropriately to an appliance on its respective circuit, and if the appliance load is not above the circuit's safe maximum, each smart storage unit can also receive current as appropriate to charge its storage cell(s). Any circuit issues or addition of unsafe loads along with appliance 512*a* can be addressed by the circuit breaker for that circuit.

Automatic or semi-automatic topological mapping of appliances and energy storage units to specific circuits for a given building or fusebox is advantageous, as it can save large amounts of time and effort by user who would otherwise need to determine the information and enter it into one or more energy storage units manually. Additionally, the circuit topology may not be consistent or match a given AC outlet. For example, two outlets in close proximity may or may not be on the same circuit, requiring knowledge and/or testing of the outlets, which may be beyond the abilities of many users.

Figure 6A:
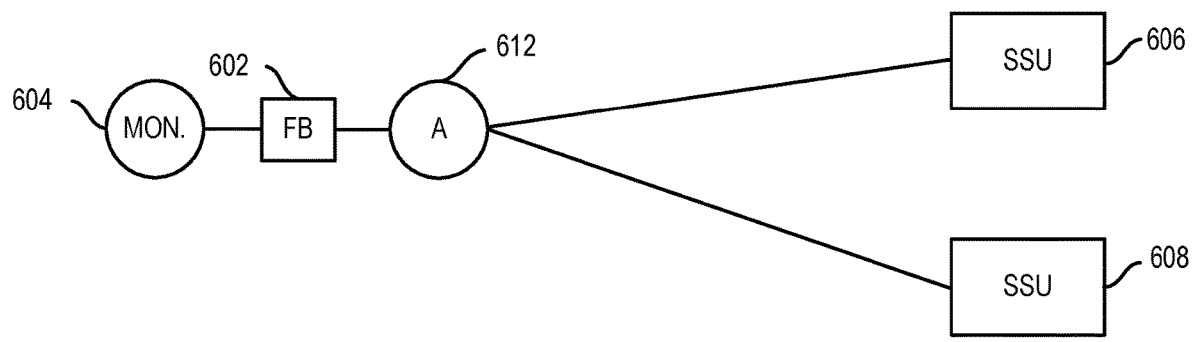
FIG. 6A shows schematic diagram of an energy monitor, a fusebox, an appliance, and two smart storage units.

In some embodiments, the energy storage units described herein may use a variety of methods in order to automatically or semi-automatically build a topological map that includes information regarding the types and electrical loads of appliances and/or other energy storage units on one or more circuits to which the energy storage units are connected. FIG. 6A is a simple schematic diagram for reference as these methods are described below. FIG. 6A depicts a fusebox 602 receiving energy from an energy source (not shown), and detecting the energy via an energy monitor 604. An energy storage unit 606 is on a circuit with appliance 612. Energy storage unit 608 may or may not be on the same circuit as energy storage unit 606, but is in wired or wireless communication with energy storage unit 606.

Figure 6B:
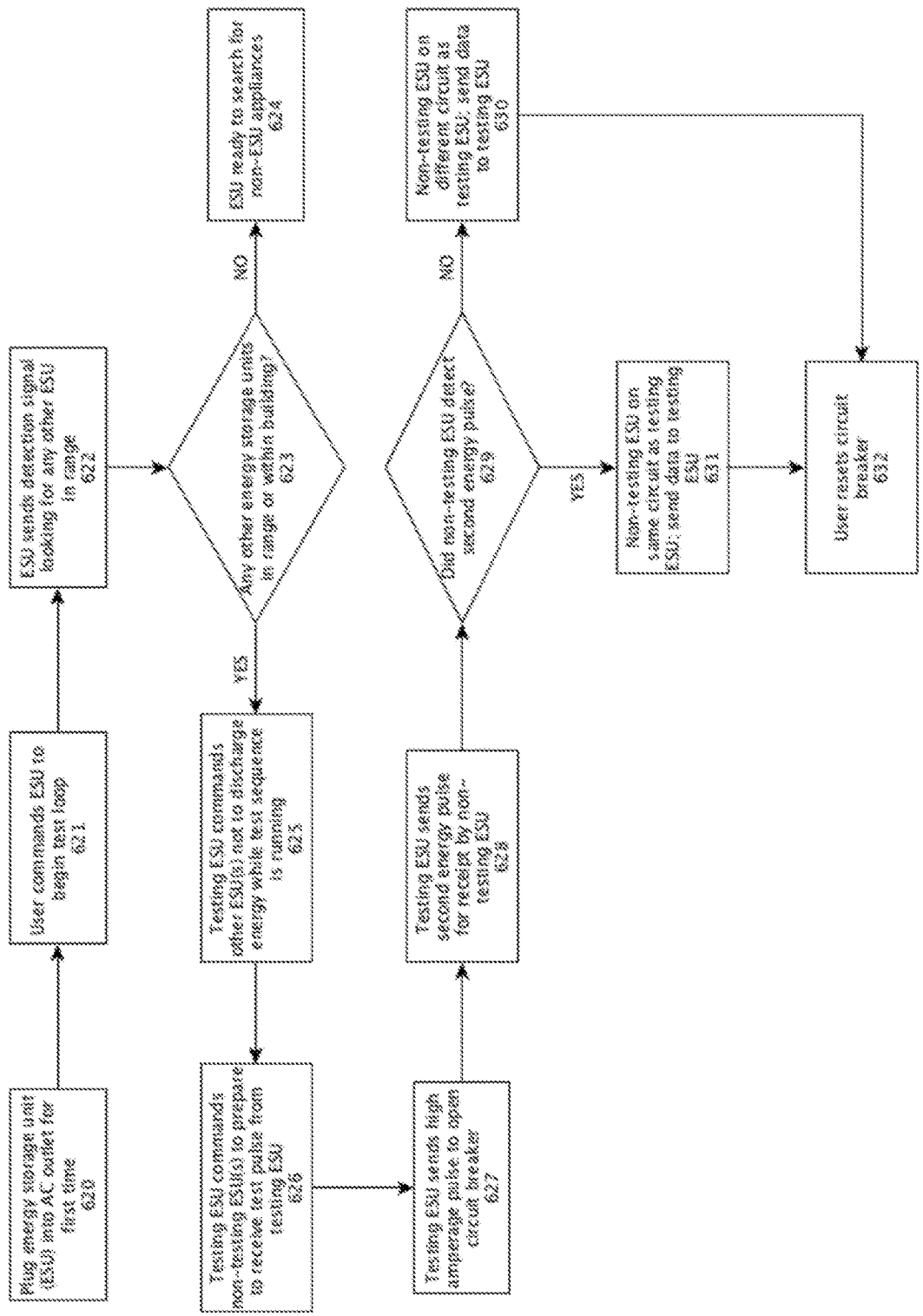
FIG. 6B shows a flow chart for a method of determining whether more than one energy storage unit is on the same circuit.

FIG. 6B shows a flow chart for a method of determining whether more than one energy storage unit is on the same circuit. At step 620, a user plugs an energy storage unit (ESU) into an AC outlet for the first time. For example, energy storage unit 606 (FIG. 6A) may be plugged in. The user commands the ESU to begin a test loop, such as by a user interface on the ESU or by a computing device such as a smartphone or tablet in wired or wireless communication with the ESU. At step 622, the ESU sends a local detection signal, such as via WIFI or BLUETOOTH to look for any other ESUs in range. At step 623, the ESU determines if any other energy storage units are within range of the signal or within the building. If no other ESUs are detected, then at step 624, the ESU may indicate that it is ready to search for non-ESU appliances (e.g. toasters, refrigerators, computers, TVs, etc.) If one or more other ESUs are detected (e.g. energy storage unit 608 of FIG. 6A), then at step 625, the testing ESU commands the other ESU(s) not to discharge energy while the test sequence is running. At step 626, the testing ESU commands the non-testing ESU(s) to prepare to receive a test pulse of energy from the testing ESU. At step 627, the testing ESU then discharges a high amperage pulse of energy (e.g. 75 A) in order to open the circuit breaker for the circuit on which the ESU is connected. The testing ESU then sends a second energy pulse for receipt by the non-testing ESU(s) at step 628. The second energy pulse may have a specific frequency and/or amperage to facilitate detection by the non-testing ESU. The non-testing ESU(s) then determine whether it detected the second energy pulse at step 629. If no energy pulse was detected, then at step 630 the non-testing ESU determines that it is on a different circuit from that of the testing ESU, and sends data signal(s) to the testing ESU to indicate this. If the non-testing ESU does detect the second energy pulse, then at step 631 the non-testing ESU determines that it is on the same circuit as the testing ESU, and data signal(s) to the testing ESU to indicate this. Finally, at step 632, the user resets the circuit breaker after the testing ESU has indicated that its test sequence is complete.

Figure 6C:
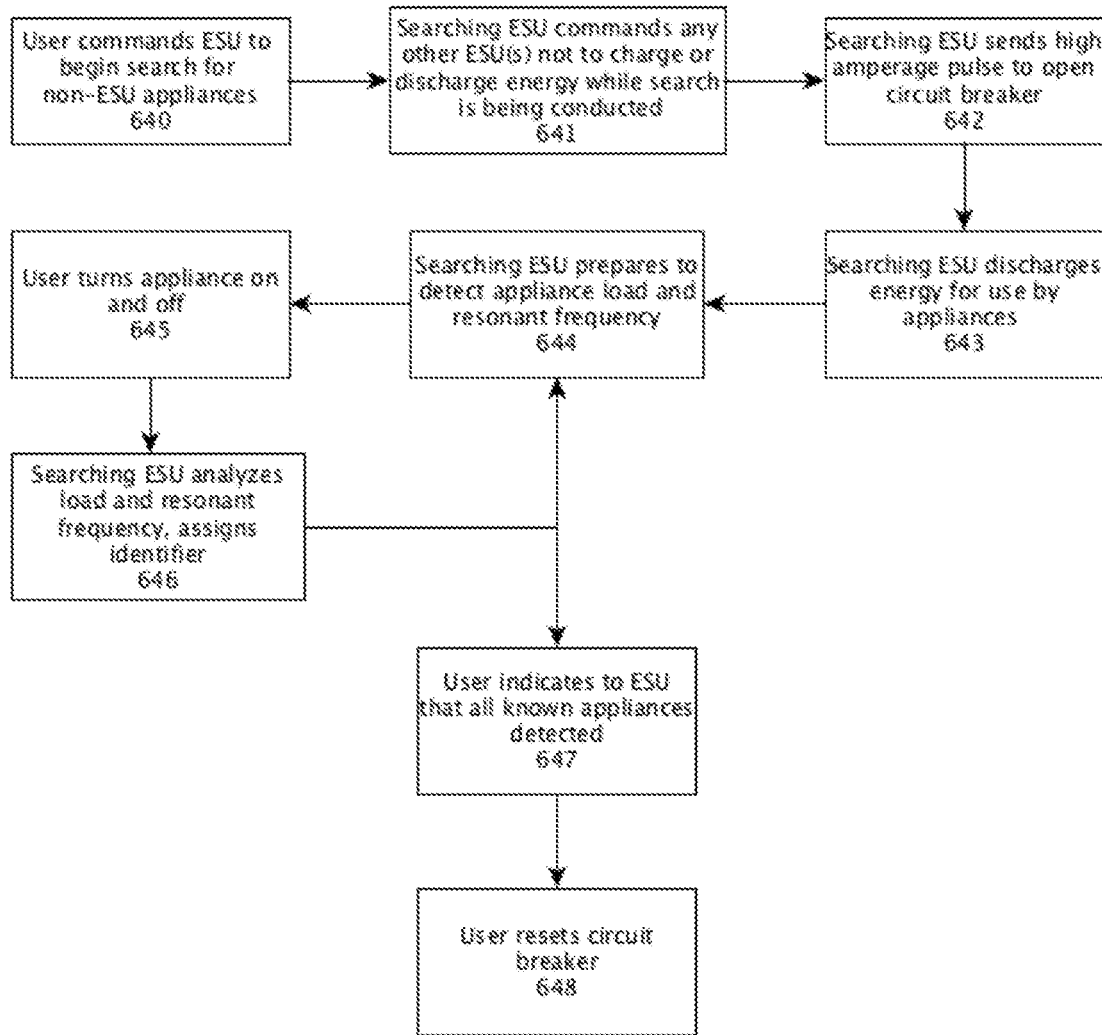
FIG. 6C shows a flow chart of an exemplary method for searching for and detecting appliances on a circuit using an energy storage unit.

Energy storage units as disclosed herein may also be able to search for and detect non-energy storage unit appliances on a circuit. FIG. 6C shows a flow chart of an exemplary method for searching for and detecting appliances on a circuit. The steps shown may be initiated following step 624 or step 631 of the flow char in FIG. 6B. At step 640, a user may command an energy storage unit (ESU; such as energy storage unit 606 of FIG. 6A) to begin a search for non-ESU appliances (e.g. appliance 612 of FIG. 6A). At step 641, the searching ESU (e.g. energy storage unit 606) commands any other ESU(s) not to charge or discharge energy while the search is being conducted. At step 642, the searching ESU then sends a high amperage pulse (such as about 75 A) to open the circuit breaker for the circuit of the ESU, thereby isolating the circuit from other power sources connected to the circuit. The searching ESU also discharges energy for use by appliances on the ESUs circuit at step 643. At step 644, the searching ESU prepares to detect appliance load and resonant frequency. A user may then turn one appliance on for a period of time, and then off (or vice versa) at step 644, thereby allowing the searching ESU to detect the load drawn by the appliance, and any resonant frequency that is particular to the appliance. At step 645, the searching ESU analyzes the load and resonant frequency detected, and assigns an identifier. The user may repeat steps 644, 645, and 646 until all of the appliances on the circuit have been detected by the ESU. At step 647, the user may indicate to the ESU (such as by a user interface on the ESU or via a computing device such as a smartphone or tablet) that all known appliances have been detected. At step 648, the user may then reset the circuit breaker to reconnect the circuit with any other circuits and other power sources. In some embodiments, data regarding the identified appliances may be uploaded to a remote server and stored and/or associated with a specific type of appliance; for example, an identified resonant frequency may be associated with televisions or dishwashers. The specific appliance type may then be associated with the identified appliance and that information stored with the ESU and/or on the remote server.

Figure 6D:
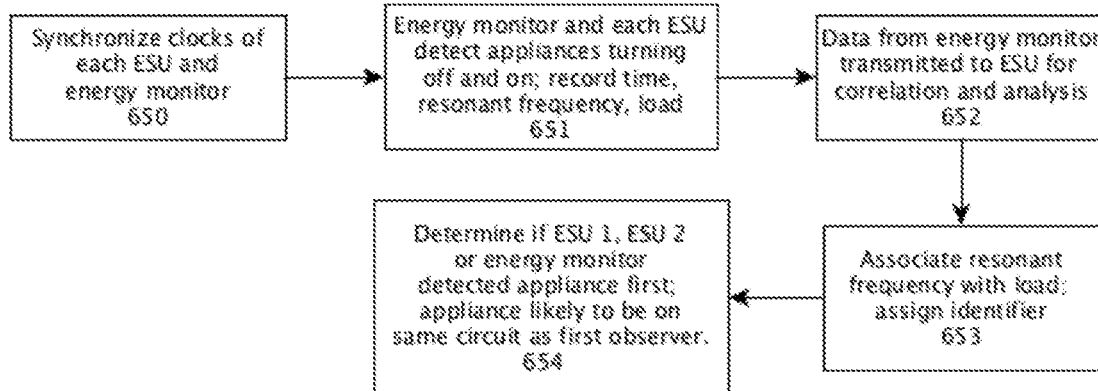
FIG. 6D shows a flow chart of an exemplary method for identifying and/or approximating a topological location of an appliance.

In certain embodiments, detection of appliances on one or more circuits may also be accomplished by analyzing and comparing detection times of appliance activation by one or more ESUs and an energy monitor (such as energy monitor 604 of FIG. 6A). FIG. 6D shows a flow chart of an exemplary method for identifying and/or approximating a location of an appliance. At step 650, clocks of each ESU (e.g. energy storage units 606 and 608) and an energy monitor (e.g. energy monitor 604) are synchronized. As appliances are turned on, either manually by a user (e.g. turning on a computer) or automatically (e.g. an appliance on a timer), at step 651, the energy monitor and each ESU detect and record the resonant frequency and load of a given appliance, as well as the time at which the resonant frequency and load were detected. In such instances, the circuit may not be isolated from other circuits or energy sources, and the appliances would not need to be specifically turned on and off during a search mode by an ESU. The data may be gathered over days, weeks, and/or months as appliances are used. At step 652, data from the energy monitor may be transmitted to one or more of the ESUs for correlation and analysis. At step 653, one or more of the ESUs may associate differing resonant frequencies and loads with a specific appliance, and assign an identifier. In addition, at step 654, one or more of the ESUs may determine if one of the ESUs or the energy monitor detected an appliance first, i.e. was a first observer; if so, then the identified appliance may be likely to be on the same circuit as the first observer.

In certain embodiments, detection of appliances on one or more circuits may also be accomplished by analyzing and comparing detection times of energy pulses from an ESU by a smart appliance or an appliance having a smart plug. A smart plug may include one or more sensors and a microprocessor, and communications module for transmitting data signals wirelessly or by wires (e.g. by power line communication). For instance, the Smart plug may include or otherwise be associated with a ground fault circuit interrupter (GFCI) or Residual Current Device (RCD) or other such device that is configured for shutting off the electric power circuit, such as under one or more prescribed conditions, such as when it detects that the plug is not coupled to an electrical outlet and/or current is flowing along an unintended path, such as through water or other non-grid coupled artifact.

Figure 6E:
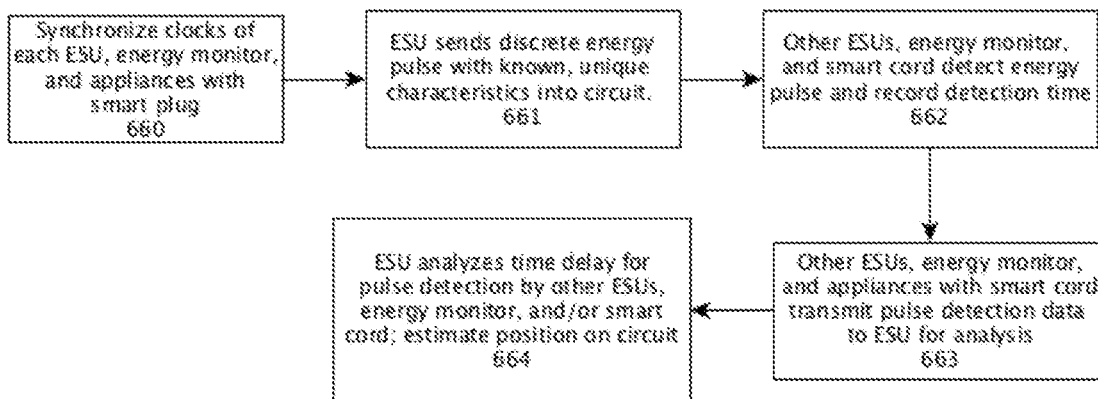
FIG. 6E shows a flow chart for an exemplary method of detecting appliances with a smart plug.

FIG. 6E shows a flow chart for an exemplary method of detecting appliances with a smart plug. At step 660, the clocks of each ESU, an energy monitor, and one or more appliances having a smart plug are synchronized. At step 661, an ESU sends a discrete energy pulse having known unique characteristics (such as a distinctive frequency and pulse length) into its circuit. At step 662, the other ESUs, the energy monitor, and the smart cord of the appliance may detect the energy pulse and record the detection time. In some embodiments, the smart cord may also detect a resonant frequency of the ESU. At step 663, the other ESUs, the energy monitor, and the smart cord of the appliance may transmit their pulse detection data to an ESU for analysis. At step 664, the ESU analyses the time delay for energy pulse detection by the other ESUs, the energy monitor and/or the smart cord, and thereby estimate an approximate circuit position of the appliance attached to the smart cord. In certain embodiments, steps 661, 662, 663, and 664 may be repeated with the energy pulse being discharged from another ESU. In some embodiments, once the time to receive an energy pulse for the smart cord is known, the information may be stored and associated with an identifier that indicates an appliance. If another energy pulse is sent and detected at some later time (days, weeks, months later), and the time until receipt differs from the recorded time until receipt, then the appliance attached to the smart cord was likely moved, and the relative position of the appliance on the circuit may be re-estimated.

Energy storage units may also use satellite positioning (e.g. GPS) or a wireless signal (e.g. WIFI, BLUETOOTH) to determine a location in physical space. In some instances, closeness of physical proximity between energy storage units determined by satellite positioning systems or a wireless signal pulse may be used as additional data in analyzing whether the energy storage units are on the same circuit. For example, the time for a given energy storage unit to receive a discrete energy pulse may be compared with the time for the given energy storage unit to receive a wireless signal. Larger discrepancies between these times may indicate that the energy storage units are not on the same circuit but are in close physical proximity (or vice versa). In some embodiments, power line communication may be used along with or instead of discrete energy pulses in mapping energy storage units and appliances with a smart cord in relative space and connection to a given circuit. The power lines of a circuit may be used as simultaneous data transmission lines, allowing an energy storage unit to send data packets for receipt by other energy storage units, by smart appliances or appliances with smart cords, and/or an energy monitor. As with a discrete energy pulse, the time for a data packet receipt by another energy storage unit, an appliance, or an energy monitor may be determined if a clock on the energy storage unit sending the data packet is synchronized with a clock of the other energy storage unit, the appliance, or energy monitor. In some embodiments, an appliance with a smart cord or a smart appliance may send its own data packet at the request of an energy storage unit via power line communication.

Figure 7A:
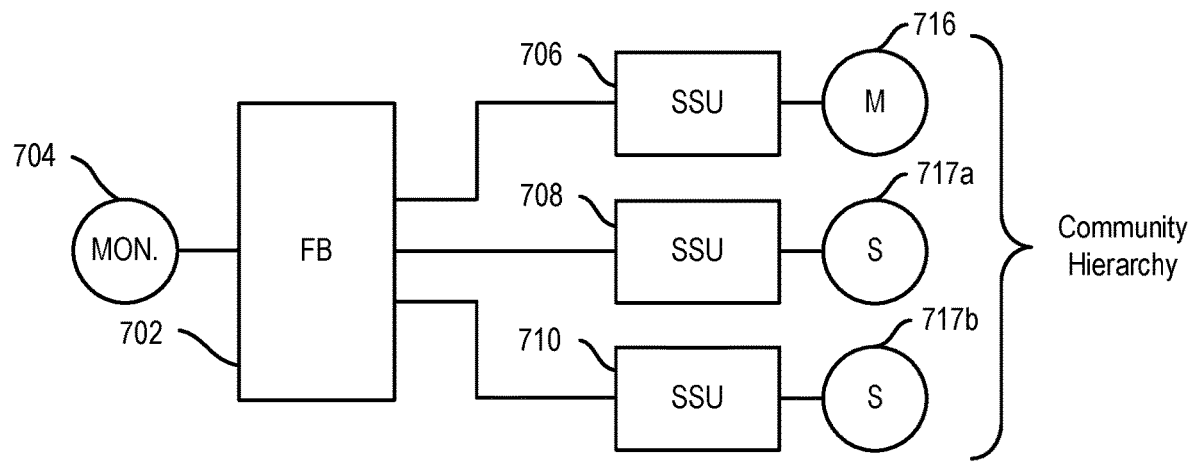
FIG. 7A shows a schematic diagram of one exemplary configuration of multiple energy storage units on different circuits.

When two or more energy storage units are used simultaneously on one or more circuits, coordination of the charging and discharging among the units is important for not only the efficient use of the energy storage units but to ensure that the energy storage units interact safely. In some embodiments, one of the energy storage units may be automatically designated as a master group unit, and all other units are designated as slave units, only acting to charge and discharge energy according to parameters and instructions set forth by the master energy storage unit. FIG. 7A shows a schematic diagram of one exemplary configuration of multiple energy storage units on different circuits. Energy monitor 704 is in electrical communication with power source inputs that enter fusebox 702. Electrical energy passing through fusebox 702 may be distributed to smart storage units 706, 708, and 710 via three parallel circuits. Smart storage unit 706 has a master designation 716, while smart storage units 708 and 710 each have slave designations 717a and 717b, respectively. Smart storage unit 706 can issue charge and discharge instructions to smart storage units 708 and 710, as well as receive data from any sensors associated with the slave smart storage units 708 and 710.

Figure 7B:
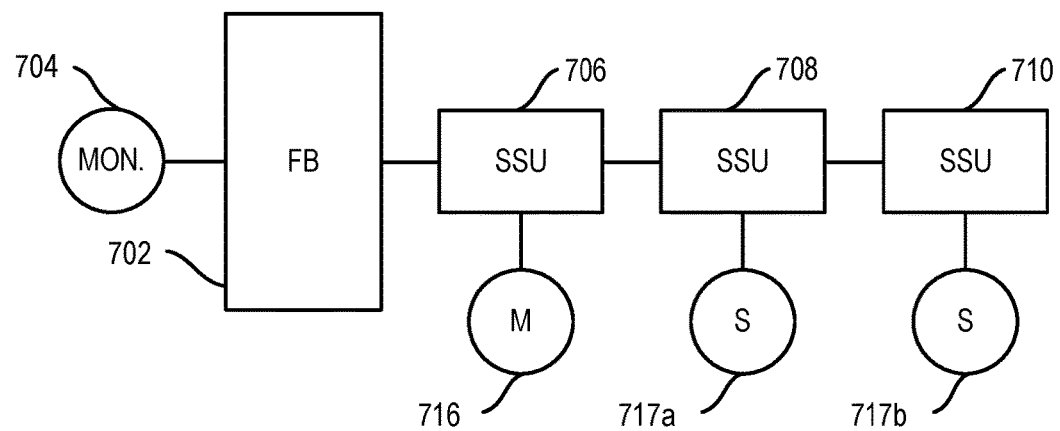
FIG. 7B shows a schematic diagram of another configuration of smart storage units connected in series on a single circuit.

FIG. 7B shows an alternative configuration of smart storage units connected in series on a single circuit. Energy monitor 704 is in electrical communication with power source inputs that enter fusebox 702. Electrical energy passing through fusebox 702 may be distributed to smart storage units 706, 708, and 710 via the single circuit. Again, smart storage unit 706 has a master designation 716, while smart storage units 708 and 710 each have slave designations 717a and 717b, respectively, such that smart storage unit 706 can issue charge and discharge instructions to smart storage units 708 and 710, as well as receive data from any sensors associated with the slave smart storage units 708 and 710. Management of the amount of energy discharged from each unit is important to avoid overloading the circuit (see, e.g. FIGS. 2A-2B and disclosure above). If smart storage units 706, 708, and 710 were each to discharge their maximum amount of energy without coordination, the circuit could quickly reach an unsafe condition.

A single energy storage unit may self-designate as a master group unit when initially being plugged into an AC outlet. For example, in one embodiment, a single energy storage unit may be connected to an AC outlet and undergo a test sequence (see step 621 of FIG. 6B). If the single energy storage unit does not detect other energy storage units at step 623, then the single energy storage unit may self-designate as a master unit. Thus, if other energy storage units are added to the master group unit's circuit or to another connected circuit, the master group unit instructs the newly added energy storage unit to self-designate as a slave unit to the master group unit. In certain embodiments, the master and slave designations may be re-assigned by a user, or may be automatically re-assigned by a remote server in communication with both the master group unit and one or more slave units.

Figure 8A:
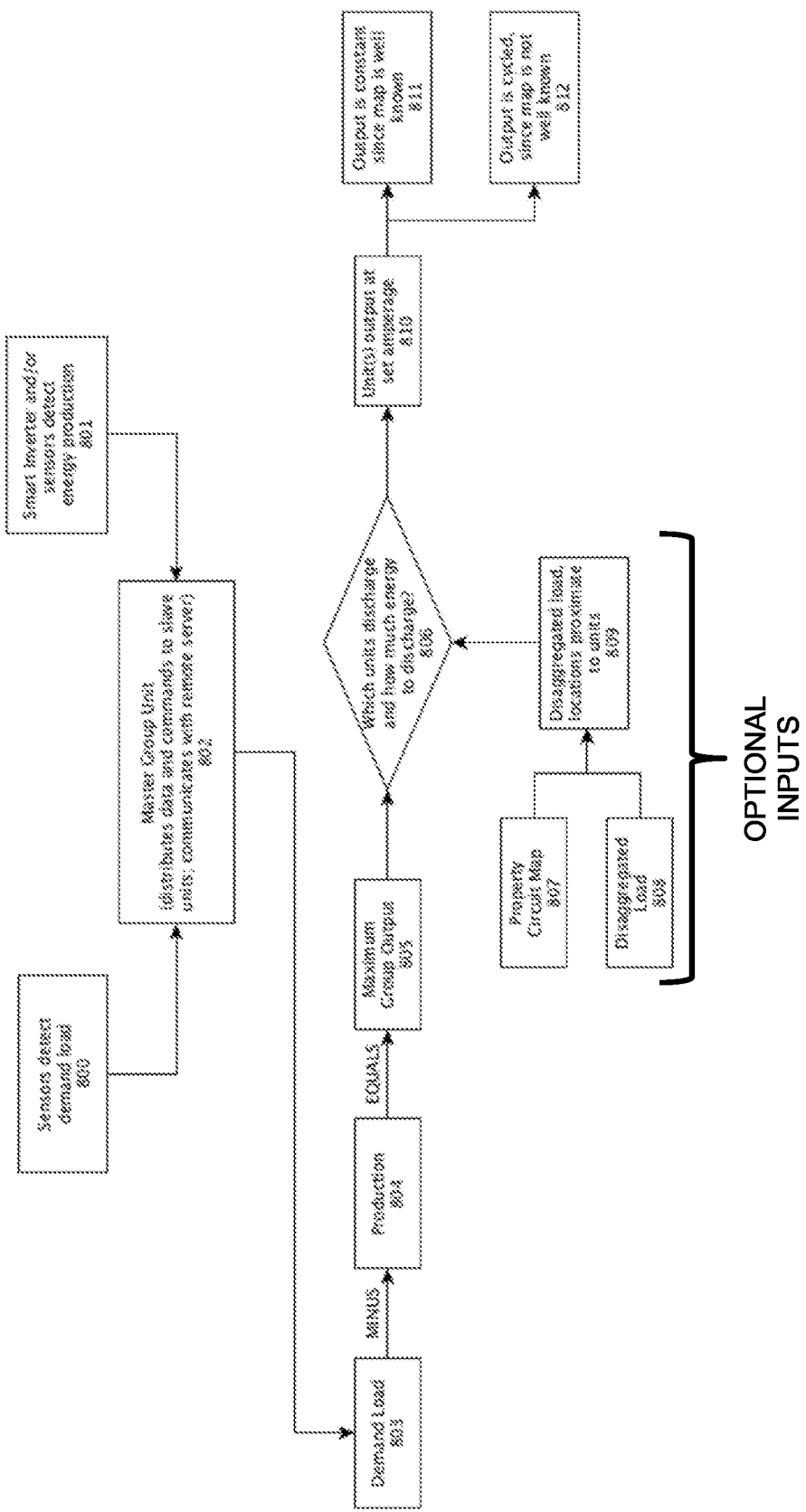
FIG. 8A shows a flow chart of an exemplary method for analyzing and coordinating energy discharge from multiple energy storage units, using a master energy storage unit.

FIG. 8A shows a flow chart of an exemplary method for analyzing and coordinating energy discharge from multiple energy storage units, using a master energy storage unit. At step 800, sensors (such as smart meters, energy monitors, and the like) detect a demand load from one or more circuits on a local energy network or grid, such as a building, and communicate data regarding the demand load to a master group unit 800. At step 801, a smart inverter (such as a grid flexible converter) and/or sensors detect energy production being received on the local energy network, and communicate data regarding the energy production to master group unit 800. Master group unit 800 is an energy storage unit designated as a master unit, and as such is configured to distribute data and commands to slave energy storage units, as well as to communicate with a remote server (not shown). The remote server may duplicate and store settings on the master group unit, analyze data received by the master group unit, a utility and/or third parties, and communicate data and instructions back to the master group unit.

At steps 803 through 808, master group unit 800 analyzes data in order to decide how to manage the discharge of energy from itself and/or one or more slave energy storage units. Energy production data 804, such as from a traditional grid power source and/or a grid equivalent energy source (e.g. photovoltaic energy source, a heat exchange energy source, a wind turbine, a fuel cell, an electric vehicle, a wave energy converter, and the like) is subtracted from demand load data 803 to determine a maximum group output of energy from the energy storage units at step 806. Master group unit 800 then determines which energy storage units to discharge, as well as at what amperage at step 806. In some embodiments, property circuit map data 807 and disaggregated load data 808 may be used to determine the disaggregated load at locations and/or circuits proximate to each energy storage unit at step 809. These optional inputs may be used at step 806 by master group unit 800 to determine which energy storage units to discharge and how much energy to discharge from each unit (including the master energy storage unit). At step 810, master group unit 800 then issues commands to one or more slave energy storage units and/or to its own grid flexible converter to output or discharge energy at one or more given amperages. At step 811, the energy output for a given energy storage unit may be constant if the map of energy storage units and loads (e.g. appliances) for the property circuit is known. Alternatively, at step 812 the energy output for a given energy storage unit may be cycled if the map of energy storage units and loads (e.g. appliances) for the property circuit is not well known, in order to minimize overloading the circuit to which the energy storage unit is supplying energy.

Figure 8B:
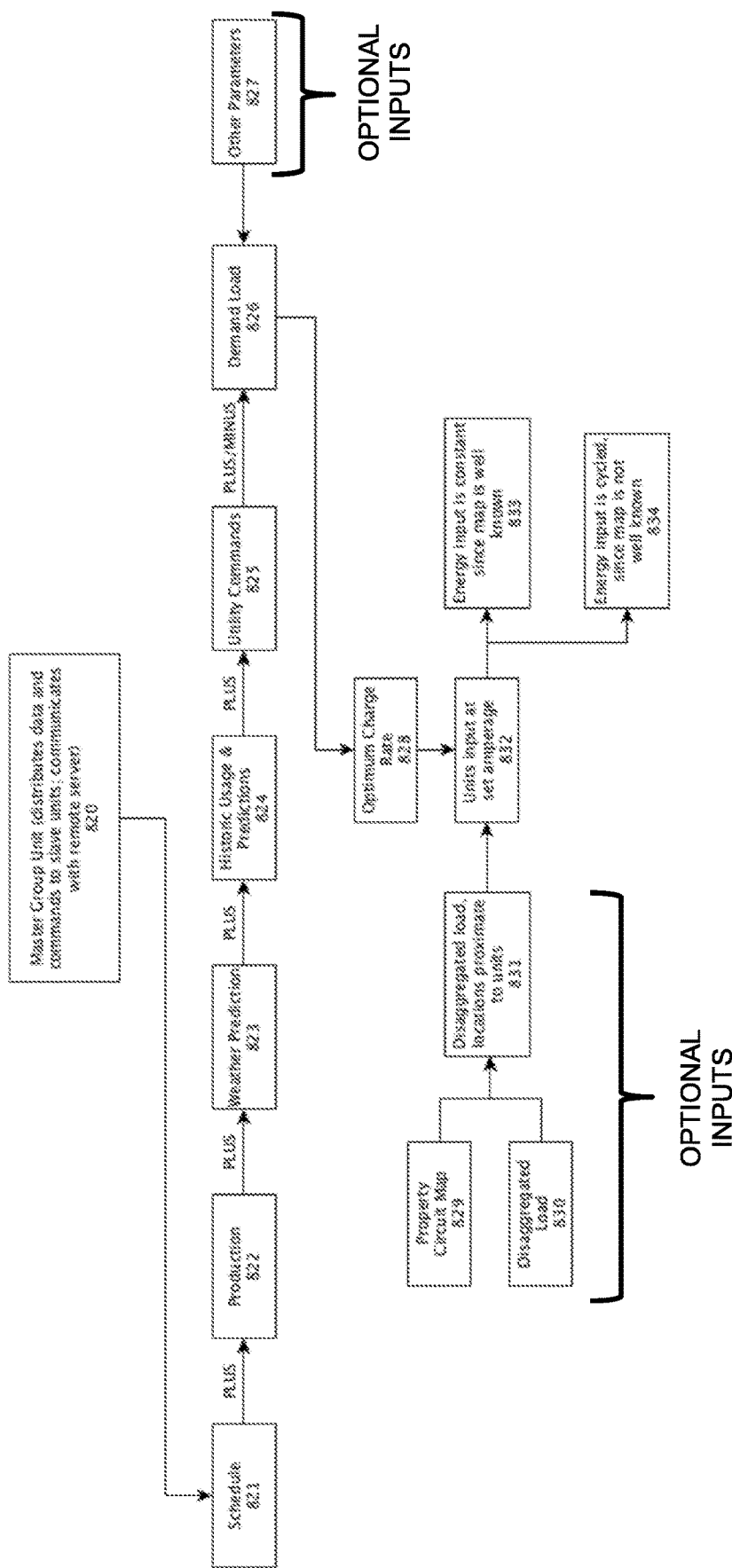
FIG. 8B shows a flow chart of an exemplary method for analyzing and coordinating the charging of multiple energy storage units, using a master energy storage unit.

FIG. 8B shows a flow chart of an exemplary method for analyzing and coordinating the charging of multiple energy storage units, using a master energy storage unit. Master group unit 820 is an energy storage unit designated as a master unit, and as such is configured to distribute data and commands to slave energy storage units, as well as to communicate with a remote server (not shown). The remote server may duplicate and store settings on the master group unit, analyze data received by the master group unit, a utility and/or third parties, and communicate data and instructions back to the master group unit. An optimum charge rate 808 may be determined by master group unit 820 by accounting for one or more data items, such as: schedule data 821 (regarding schedule times for charging entered by a user or a remote server); energy production data 822 (detected from sensors and/or received from a remote server, or an energy utility); weather prediction data 823 (received from a third party server); historic energy usage and prediction data 824 (stored by master storage unit 820 and/or received from a remote server); utility commands 825 (commands received from a utility that instruct the master group unit to charge its storage cells); and demand load data 826 (received from sensors such as an energy monitor, sensors on a smart cord for an appliance or integrated with an appliance). Other parameters 827 may also be taken into account in determining optimum charge rate 808. In some instances, the optimum charge rate may be determined for the entire group of energy storage units, including the master group unit. In some embodiments, two or more optimum charge rates may be determined for the master group unit 820 and each of the slave energy storage units. In some embodiments, property circuit map data 829 and disaggregated load data 830 may be used to determine the disaggregated load at locations and/or circuits proximate to each energy storage unit at step 831. These optional inputs may be used by master group unit 820 to determine which energy storage units to charge. At step 832, the GFC of the master group unit and the slave energy storage units are instructed to receive energy at a set or specific amperage. At step 833, the energy input for a given energy storage unit may be constant if the map of energy storage units and loads (e.g. appliances) for the property circuit is known. Alternatively, at step 834 the energy input for a given energy storage unit may be cycled if the map of energy storage units and loads (e.g. appliances) for the property circuit is not well known, in order to minimize overloading the circuit to which the energy storage unit is supplying energy.

Figure 8C:
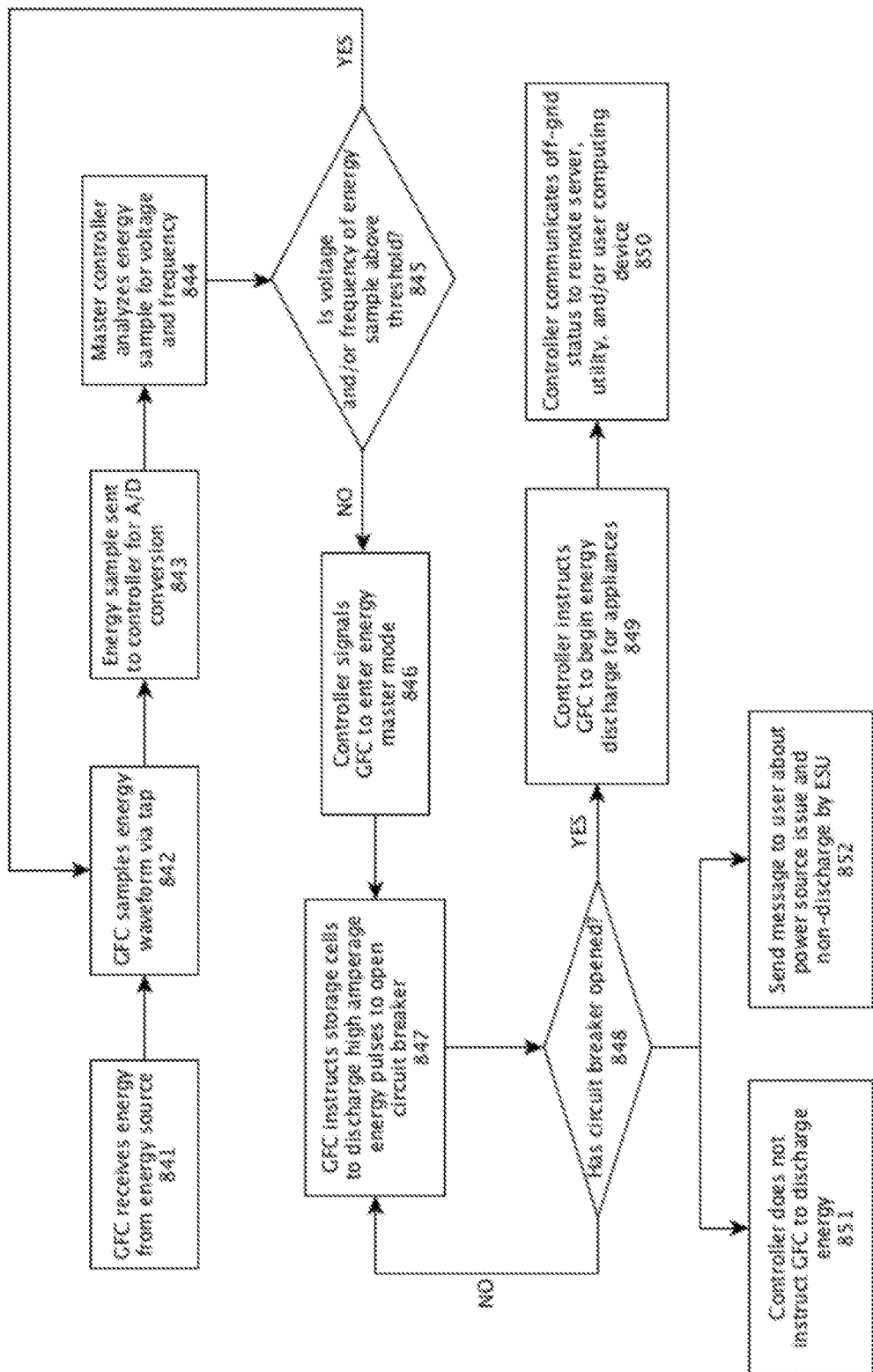
FIG. 8C shows a flow chart for a method of detecting a loss of utility grid power and discharging energy with an energy storage unit.

In certain embodiments, energy storage units as described herein may be able to sense and react to losses of utility grid power. FIG. 8C shows a flow chart for a method of detecting a loss of utility grid power and discharging energy. At step 841, a grid flexible converter (GFC) of an energy storage unit receives energy from an energy source, such as a utility grid or utility grid equivalent. The GFC samples the energy waveform by an electrical tap at step 842. The energy sample is transmitted to a controller of the energy storage unit for analog-to-digital conversion at step 843, and the controller analyzes the energy sample for its voltage and frequency. The controller determines if the voltage and/or frequency of the energy sample is above a given threshold at step 845. If the voltage and/or frequency of the energy sample are above a given threshold, then the controller continues to sample energy from the energy source at step 842.

If the voltage and/or frequency of the energy sample are below a given threshold, this indicates a possible blackout or brownout condition. The controller signals the GFC to enter energy master mode at step 846, in which the energy storage unit (e.g. a master group unit) is responsible for discharging energy and instructing slave energy storage units to discharge energy. At step 847, the GFC instructs storage cell(s) of the energy storage unit to discharge high amperage energy pulses (see, e.g. FIG. 3) to open the circuit breaker and isolate the circuit from the energy source. At step 848, the controller determines if the circuit breaker was opened or not. If the circuit breaker has been opened, then at step 849, the controller instructs the GFC to begin energy discharge for appliances or loads on the now isolated circuit. If the circuit breaker has not been opened, then steps 847 and 848 may be repeated additional times (e.g. two or more times). If the circuit breaker has not opened after a designated number of repeated loops of steps 847 and 848, then at step 851, the controller does not instruct GFC to discharge energy, and may also transmit a message at step 852 to a user and/or a remote server about the power source problem and non-discharge of energy by the ESU. In some embodiments, a user may mistakenly reset a circuit breaker despite the fact that energy is no longer being provided by the energy source. In such instances, the energy storage unit may detect the closing of the circuit breaker, then stop discharging energy, and loop steps 847 and 848 in an attempt to open the circuit breaker and re-isolate the circuit. If the circuit breaker is not reopened after a defined number of repeated attempts, then at step 851 the controller does not instruct GFC to discharge energy, and may also transmit a message at step 852 to the user and/or a remote server about the power source problem and non-discharge of energy by the ESU.

Figure 8D:
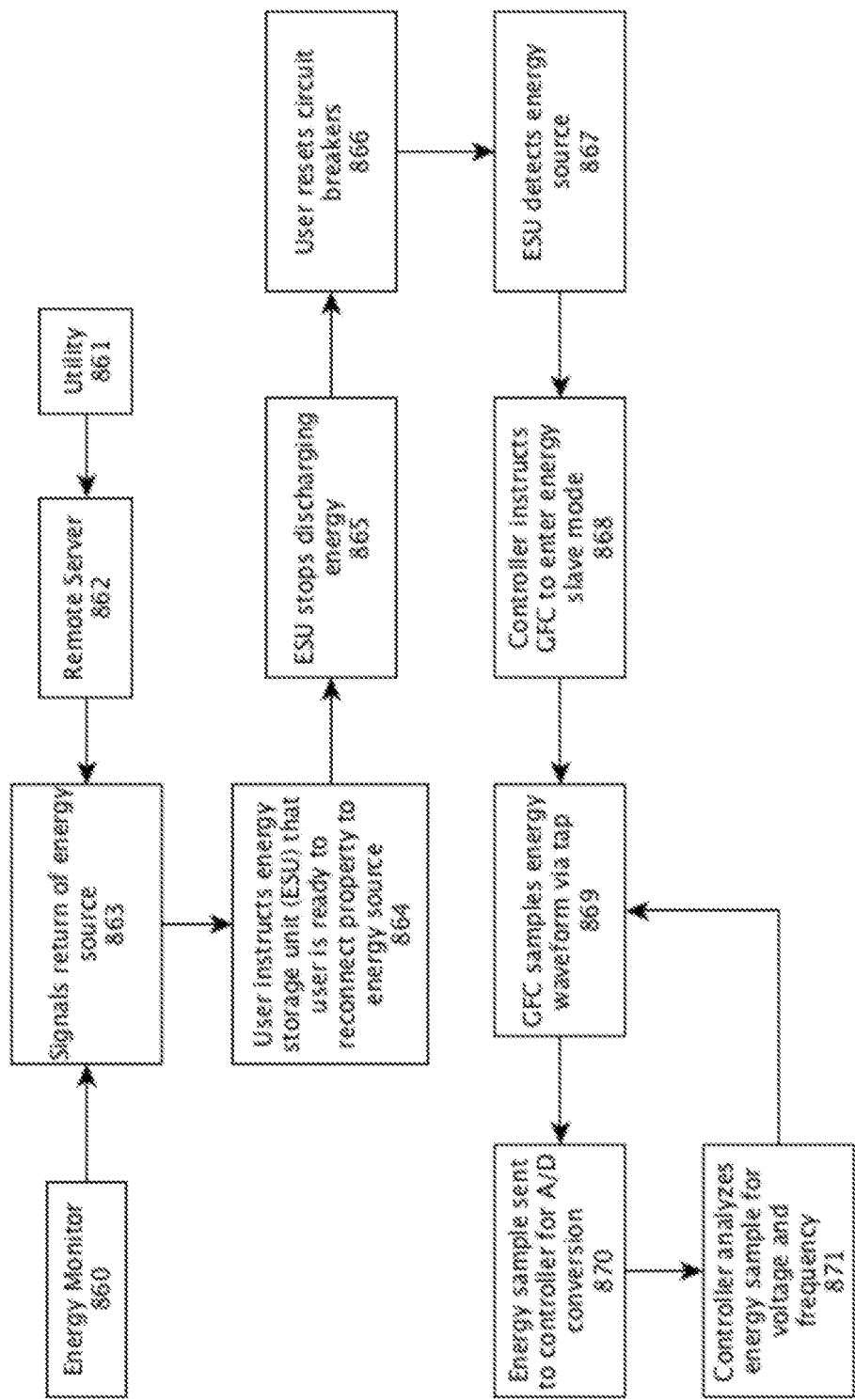
FIG. 8D shows a flow chart of an exemplary energy storage unit method for detecting and re-synchronizing with a restored power source.

In certain embodiments, energy storage units as described herein may be able to detect and respond to a restoration of utility grid power and change from an energy master mode to an energy slave mode. FIG. 8D shows a flow chart of an exemplary energy storage unit method for detecting and re-synchronizing with a restored power source. At step 863, an energy storage unit (ESU) receives signals that a previously unavailable power source is now available to the property circuits. The signal may be received from a utility 861 via a remote server 862, or from an energy monitor 860 that can detect the resumption of power availability. The ESU may indicate on a user interface that the ESU may be re-connected with the power source. At step 864, the user instructs the ESU (such as by a touchscreen and/or buttons) that the user is ready to reconnect property to the power source (e.g. a utility grid).

The ESU then stops discharging energy at step 865. The user may then reset (close) the circuit breaker(s) at step 866, thereby allowing the ESU to detect the energy source at step 867. The controller of the ESU may instruct the GFC to enter energy slave mode at step 868, and the GFC may begin sampling energy waveform from the power source via an electrical tap at step 869. The energy sample may then be transmitted to the controller for analog-to-digital conversion at step 870, and the controller analyzes the energy sample for its voltage and frequency at step 871 to determine if the voltage and/or frequency of the energy sample are above a given threshold at step 871.

In some embodiments, a user may be able to instruct an ESU regarding the time frame for responding to a loss of a power source. For instance, a user may be able to instruct the ESU that upon detection of energy source loss, the ESU will: immediately try to isolate its circuit and enter an off-grid mode; enter off-grid mode after some specified time period (e.g. 15 minutes); or will only enter off-grid mode when instructed by the user. In certain embodiments, a user or instructions from a remote server may instruct an energy storage unit to disable the on and off grid methods, if the fuses on the property are known to be too old or unidirectional, and thus unable to safely respond to high frequency pulses and isolate the circuit(s).

Connection of an energy storage unit to an AC outlet may require a legal notice or placard be placed on a fusebox for the property in order to notify electricians and other workers that an alternate and/or DC power source is connected to the main energy inputs of the property. It is desirable for a user or installer to verify that such a placard is placed on a fusebox. Energy storage units of the instant disclosure may require verification of placard installation prior to use. An exemplary method of verification of placard installation on a fusebox may require that the energy storage unit is in communication with a remote server, and cannot operate its discharging and/or charging functions without authorization from the remote server, such as instructions or a virtual token supplied by the remote server. The user may install the placard and then take a picture of the installed placard and fusebox. The picture may then be uploaded to a remote server for verification by an image processing program or by a employee's visual inspection. Once the picture is verified, the image processing program or employee may send instructions or a token to the energy storage unit that permits the energy storage unit to use its charging and discharging capabilities. In some embodiments, the picture may be required to include an energy monitor installed at the main energy inputs of the fusebox.

Embodiments of energy storage units disclosed herein may include an intelligent AC outlet cord that includes sensors for detecting characteristics of energy received via the AC outlet, and a microprocessor for processing and transmitting data regarding the energy characteristics back to a microprocessor of the energy unit for further analysis. As indicated, a fundamental aspect allowing for the "plug-and-play" nature of the smart energy storage unit is the smart plug. The smart plug, for instance, has two main sets of functionality. The first set of functionality is directed to safety. The smart plug is configured with multiple safety layers that may be implemented all through the smart plug and its connections, both on the wall side and on the smart energy storage unit side. The second set of functionality is directed to universal or internationalized connectivity. Particularly, the smart plug has been adapted for internationalization. Internationalization allows for common connectivity that may be implemented on one or both of the device side and/or the plug/outlet interface, and additionally, the smart plug may be configured to sense or otherwise determine and/or communicate to the unit which national region the unit is to be utilized in.

The safety features are important for ensuring that at no point in time will the smart plug be "hot" or "live," when the plug is not suitably coupled to both the outlet and the smart energy storage unit. Specifically, as described in greater detail herein below, the smart plug is configured in such a manner that unless both connectors are connected to their respective interfaces, live electricity cannot be transferred through the power cord. This configuration is useful so as to ensure the safety of the user and/or any other person, animal, or conductive object that could otherwise come into contact with the cord, completing the circuit, and being electrocuted and/or starting a fire.

Internationalization, in these regards, is useful because it makes manufacturing uniform, as the smart units may be used within any national region, with only small variations to the smart cord differentiating them region by region. This is additionally beneficial in that it allows great lead times for purchaser's to determine their inventory needs as units can easily be cancelled from one order and added to another by only changing the power cord, configured for designating the selected region, to which they are being shipped. Specifically, as described in greater detail herein below, the smart cable may be configured in such a manner that it identifies the region to which the smart unit is to be shipped, determines the regional electricity requirements, and communicates the same to the GFC of the power control unit, thereby allowing the GFC to configure itself so as to adapt to the region it is to be employed in. Hence, the GFC will adjust the power conditioning and outage based on the plug that is coupled to it, and/or the energy sampled thereby. Accordingly, both of these features, safety and internationalization, are individually important to making the smart energy storage units herein provided truly "plug-and-play."

More particularly, with respect to its safety features, the smart plug has been configured to implement several layers of safety mechanisms to ensure there are a multiplicity of fail safes, one or more of which, e.g., all of which, should be met prior to the smart plug allowing energy to be transferred to or from the energy storage unit. For example, as indicated it is important that the tines or prongs of the male end of the smart cord plug are not live, unless the plug is both plugged into the wall and/or the device connector suitably coupled to the smart unit device.

Accordingly, in various embodiments, the plug and/or connector side of the smart cord may include one or more, such as a plurality of sensors. Any number of sensors may be employed, which sensors are useful for being able to determine whether or not one or more of the connecting portions of the smart cord are sufficiently coupled with their corresponding connecting features, e.g., either grid side or device side, so as to enable the transference of energy there between, e.g., through the cord. Specifically, a multiplicity of sensors may be used, such as a light sensor, a magnetic sensor, a motion sensor, e.g., an accelerometer, gyroscope, speedometer, a pressure gauge, an impact sensor, and the like.

For example, in particular embodiments, one or more of a light sensor, a magnetic sensor, and/or a motion sensor may be included, such as where each of the sensors are configured for detecting when one member of a coupling or mating pair is in fact mated with its corresponding member. For instance, the male end portion of the plug element of the smart cord may include a light sensor that is adapted for detecting when it is coupled to a corresponding optical or opaque member associated with the outlet or cover thereof. Particularly, the light sensor may be positioned near an end region of the plug element, and emit light at a given wavelength, which when it is in optical contact with a corresponding element attached to a portion of the outlet, the light is either reflected back and detected, or, in another instance, is absorbed and not detected, which in either case detecting the reflected light, e.g., in or out of phase, or not detecting the light, dependent on how the light sensor is configured, indicates that the plug is in fact coupled to the outlet.

Additionally, a magnetic sensor may be included, such as where the magnet is configured for coupling to another element, such as another magnet or metal element attached in a corresponding location on the outlet portion. In such an instance, as the plug element is coupled to the outlet, the magnetic features come into proximity of one another and the magnetic forces can thereby be detected and thus signal that the plug has been appropriately coupled to the outlet. Of course, if two magnet elements are employed, the sensor can be configured to detect either attractive or repulsive forces. Further, the plug element of the smart cord may include a motion sensor, such as an accelerometer or gyroscope that indicates continued movement or a lack thereof, where continued movement would be a sign of a lack of connection, as it would be expected that when the plug element is coupled to the socket of the outlet, the device should be stationary and movement ceased. A suitably configured pressure sensor or strain gauge can also be employed in similar fashion so as to indicate coupling.

Along with the aforementioned sensors, the plug element of the smart cord may include intelligence, such as a microprocessor that may be positioned within the housing of the plug element and configured for running one or more logic functions, such as with respect to a program stored in a memory coupled to the microprocessor. For example, the microprocessor may be coupled to one or more of the above reference sensors and may be configured for receiving the sensed information, aggregating it, and making a determination as to whether appropriate coupling has occurred. If so, the microprocessor may signal to the ICS and/or GFC of the smart unit that all is good and energy transfer may commence, or it may communicate a fault condition exists thereby signaling that it is not safe to transfer energy across the smart cord, and thus prevent or cease energy transfer.

In various embodiments, only one sensed element need to indicate appropriate coupling has occurred in order to commence energy transfer, e.g., the optical sensor, magnetic sensor, and/or motion sensor indicate coupling has been achieved. However, in various other embodiments, to be more safe two or all three or more sensed conditions may need to be present so as to indicate it is safe to charge or discharge the energy storage unit. Additionally, more sensors can be included and/or needed to verify the existence of a suitably effectuated coupling state, such as activation of an appropriate pressure sensor. Nevertheless, once the appropriate sensed condition(s) has been determined by the processor to be present, it may then signal to the ICS and/or GFC that all is good to go for charging and discharging. Hence, in certain embodiments, only when the appropriate signal has been received by the ICS from the microprocessor will the ICS instruct the GFC to charge or discharge, which in the absence thereof, the GFC may be configured so as not to output.

In particular instances, a further check may also be implemented so as to ensure that a coupling has in fact taken place, which check may be in addition to or substitution for the sensors above. For example, in various instances, before allowing charging to occur, the smart cord and/or GFC may cause the ingress of a sampling of energy, which ingress may be indicative that a suitable coupling has occurred, which in the absence of would indicate a suitable coupling has not occurred. Specifically, as a practical matter, unless a suitable coupling has occurred, energy would not be able to be taken into the storage unit from the grid.

Hence, as another check against erroneous or mistaken coupling, the system may be configured for taking in and sampling a small amount of energy to verify the coupling before allowing the smart cord to go live and thereby discharge or otherwise transfer energy from the storage unit to the circuit of the outlet. Particularly, only where there is a suitably coupling will there be a complete loop that is grounded thereby allowing energy to flow in, and if energy can flow in safely it is expected that energy can flow out safely.

Consequently, in a manner such as this, the smart unit can make various verifications to ensure that it is safe to go live and begin charging or discharging, such as based on the positive sensing from the various sensors as well as the ingress sampling. This is useful because if the sensors show no-fault, but ingress is not possible, then there is likely to be an error in the coupling state, and therefore the unit should not go into a discharge mode, which could otherwise create a dangerous condition.

A further safety protocol that may be implemented may include the connector on the smart unit side indicating that it too is appropriately coupled to the unit so as to begin or otherwise allow charging and/or discharging. For instance, the smart unit may include a receptacle that includes one or more sensors, like above, that are configured for indicating an appropriate coupling has taken place between the connector side of the smart plug and the receptacle of the smart unit. In such an instance, the smart unit may be configured such that only when both the plug side and receptacle side connectors of the smart cord, e.g., the sensors thereof, indicate sufficient coupling may energy be flowed across the smart cable.

Particularly, the unit connector of the smart cord, or the unit itself, may have one or more of the above referenced sensors, or another proximity sensor configuration, that requires sensed evidence of a coupling before allowing the smart cord to go live. For example, in one embodiment one or both of the connector element and the device receptacle may include a pressure element, e.g., a contact relay, that needs to be depressed in order to indicate that a suitable coupling has been established before allowing the device to go live, e.g., the contact relay may be in the form of a button that is configured such that only when pushed in is energy allowed to flow across the smart cord device.

Additionally, in various instances, a further safety mechanism may include a ground fault circuit interrupter (GFCI) and/or residual current device (RCD) that is configured to shut off any electric power from flowing to or away from the circuit if the GFCI detects the presence of an unsafe condition being present. For example, the GFCI may be a sensor that is configured to detect if a current flowing through a circuit, is beginning to or is traveling along an unintended path, such as through water, a person, or other circuit completing artifact. Specifically, the one or more GFCIs may be included, such as where one or more of the GFCIs is configured for determining the difference on one or more characteristics of electricity flowing through a plug element. Particularly, the GFCI may be configured for determining a difference between energy flow characteristics between the "hot" plug tine, and the "neutral" plug tine, such as in microA and/or microV, and if there is a difference, then the GFCI can trip and/or otherwise instruct the ICS and/or GFC to go offline.

Accordingly, in various implementations, there may be four or more layers of safety features within the smart cord so as to fully enable the plug-and-play nature of the smart energy storage units. For example, the mechanisms herein disclosed, e.g., the plug side sensors, the energy sampling, the unit connector sensors, the GFCI, and other such sensors, may be employed so as to ensure that the smart energy storage units are suitably coupled to their respective paired mates so as to allow the smart units to discharge in a safe manner, and with the appropriate energy characteristics.

A further feature of the smart cord is that in various embodiments, a DC power line is included. For instance, a DC in and a DC out power line may be provided so as to power the various sensors, the microprocessor, and/or other included elements that require power such as a clock, light, e.g., LED light, display, etc. One or more, e.g., two or four or more, data lines for the transfer of data in and out of the power cord, e.g., from the processor and/or memory may also be included. In certain instances, the DC power line(s) may have their own casing such as to provide protection thereto and/or to prevent interference with data transfer. In some embodiments, a communications module including a suitably configured transmitter and/or receiver, as described herein above may be included.

An additional feature of the smart cord presented herein is regionalization. For instance, as described in greater detail herein below, the smart cord may include one or more, such as two, or three, or four, or more regionalization pins that are configured for determining what region the smart energy storage unit is adapted for functioning within. Specifically, as described herein, the smart cord may include a number of pins such as three or more pins that may have different configurations such that each different configuration code for a different geographical region. More specifically, each geographical region and/or country may have predetermined energy condition requirements, such that energy to be transmitted across the circuits of their respective grids is required to have specified characteristics, such as with respect to its voltage, amperage, frequency, and the like.

Particularly, various numbers and/or positions of pins can be present or not within the smart cord in such a manner that they present a 3 or 4 digit analog based code, which code may then be used to specify the region of the country to where the smart energy storage unit is to be deployed. The pins may form an electrical circuit that when closed signals the ICS and/or GFC a code that the ICS/GFC then interprets and thereby determines in what region the smart unit is employed and thereby determines what condition the energy to be transferred should be in so as to correspond with the energy being transmitted through the circuits of that region and/or country. Specifically, with respect to deployment within the US, the smart cord will have an internal pin configuration that indicates to the ICS/GFC that energy should be transmitted at 120V/60 Hz, whereas for Europe or Australia, the pin configurations may indicate that energy should be transmitted at 220-240V/50 Hz, and likewise for Asia, e.g., Japan, the pin configuration may indicate that energy should be transmitted at 100-110V/60 Hz, and the like, where each region may have its own designated pin configuration dependent on the characteristics of the energy to be transmitted in that region. Of course, where different regions transmit energy with the same or similar characteristics the pin configuration may be the same or different as desired.

Hence, regionalization allows the world to be broken down into different energy zones that may be served by a single core smart energy storage unit that largely differs in only the pin configuration of the smart cord and the conditioning of the energy to be transmitted thereby as indicated by respective pin configurations. It is to be noted that with respect to the plug element of the smart cord, the tine or prong configuration also varies region to region, and as such, the configuration as to shape, and positioning of the individual prongs, e.g., hot, neutral, and/or ground, of the plug element may also differ, and in some instances, may be configured as an interchangeable attachment member, thereby allowing the main cord body to be the same from region to region, save for the detachable prong elements. In other embodiments, the prong configuration may be capable of being repositioned and/or shaped so as to accommodate multiple regions simply by reconfiguring the shape of the prongs.

Additionally, in various embodiments, there may be several different configurations of the smart cords with respect to one or both of the plug and/or device connector elements. For instance, as described above, where AC current is being transmitted, the smart energy cord may have a configuration as described above, such as where the plug element includes a male, prong coupling mechanism, and the device connector may have a female or male type of connector configuration. Such a smart power cord is useful where energy is being transferred in both directions, such as both inwards and outwards.

However, in various instances, the smart energy storage unit may be configured for only transmitting energy in one direction, such as where an appliance is directly coupled to the smart storage device itself. In such an instance, the device, e.g., the smart power cord, need only be configured for transmitting energy in one direction. Hence, in instances such as this, the smart power cord may not need to include a male plug connective element. Rather, it may have a female receptacle element, such as configured to receive the plug element of the appliance, and then may have the device connector element, as herein described.

Thus, in this output only configuration, energy will be transferred directly from the smart energy storage unit to the device without having to be transmitted through the electric grid network. Since energy is being directly transmitted to the appliance, the smart cord may be configured for only transmitting AC energy, which may readily be used by an appliance that uses AC power. However, if the appliance uses DC power, than the cord will be configured for transmitting DC power. In these instances, the sensors in the various cords may be the same or different, and the regionalized pin configurations may be present or not.

Additionally, a smart power cord in this or a similar configuration may be useful when building blocks or stacks of energy storage units, such as where a plurality of energy storage units are daisy chained together via separate smart power cords. For instance, when daisy chaining the storage units together, both ends of the smart cord connectors may be configured so as to be the same element, and in such an instance may be reversible. Energy therefore could be transferred in both directions from one unit to the other along the chain, as needed. Such energy being transferred from unit to unit will likely be DC energy, and the cord adapted to transfer DC energy, however, in some instances, AC energy may be transferred and the cord adapted likewise. Of course, in such daisy chaining instances, the blocked or added storage units and their respective cords may or may not have intelligence, as desired. Any suitable number of energy storage units may be chained together in this fashion, such as two or four or eight or sixteen or more. Likewise, in these instances, the sensors in the various cords may be the same or different, the regionalized pin configurations may be present or not, but likely wont be necessary, and data lines may or may not be present.

Accordingly, in various embodiments, since there may be a multiplicity of smart power cords that may be in use at any one instance, the configuration of the device connector element of the smart power cord may have a different configuration so as to distinguish the different types of transmission that the power cord is configured for transmitting. This is useful so as to prevent the wrong cord being positioned in the wrong receptacle for transmitting the wrong form of energy, which could otherwise lead to a dangerous condition, e.g., the AC in/out connector element may be configured to only be received within the AC in/out receptacle, the AC out connector element may be configured to only be received within the AC out receptacle, and likewise, the DC out connector element may be configured to only be received within the DC out receptacle, etc. A color matching coding system may also be employed, so as to indicate which connector element connects with which receptacle element, such as by sharing the same colors.

In another aspect, a smart outlet faceplate for an electrical socket may be provided. The faceplate may include a processor, a memory, a communications module, as described herein, and/or rechargeable power source, such as a power source capable of being charge via induction. In various instances, the smart faceplate may also include one or more sensors such as a sensor that is capable of recognizing a smart cord and/or plug of the disclosure, and may further have the regionalization technology described herein.

Accordingly, embodiments of energy storage units disclosed herein may include an intelligent AC in/out, AC out only, DC out only, or DC in/out smart power cord. In various embodiments, the smart power cord includes one or more sensors for detecting characteristics of energy received via the AC (or DC) outlet, and may further include one or more microprocessors such as for processing and transmitting data regarding the energy characteristics back to a microprocessor of a smart energy unit to which it is coupled for further analysis. In particular instances, the microprocessor may be configured for transmitting data directly to an ICS or GFC of the smart energy storage unit. In some instances, the smart power cord, e.g., a plug connector element thereof may include a communications module, as described herein throughout that is capable of communicating with various other smart assets of the system, such as through the energy cloud.

For example, in a particular implementation, the smart power cord or cable may have a pronged AC plug element that includes first AC power pin, such as a "hot" element, configured for transferring energy, and may have a second "neutral" pin, as well as ground pin. Accordingly, collectively the power pins and ground pin may be configured to interact with a reciprocal female connector portion of an AC outlet, which in some instances, may include a smart face plate or may otherwise be a smart outlet. In such instances, the first and second AC (and third, where included) power pins are configured so as to connect the smart cord to the AC outlet.

As indicated, the interior of the AC plug element may include multiple sensors, such as sensors that are configured for detecting one or more characteristics of energy to be transferred, such as frequency, current, and/or voltage characteristics, of energy that passes through the power pins. The sensors may be any suitable sensors, as indicated, including a proximity sensor, a light sensor, a magnetic sensor, a motion sensor, and/or a pressure sensor, and may be connected with microprocessor so as to enable the microprocessor to receive and process the information from the sensors, which information and/or data may be sent, e.g., to the ICS and/or GFC through one or more data cables. Further, as set forth above, in various embodiments, the plug side element may additional include a GFCI for added safety precautions.

On the opposite side of the smart cable is a device connector element that is configured for connecting the power cord to the smart energy storage unit. This cable end connector is configured for removably connecting the smart energy storage unit with the AC power outlet so that AC power may be communicated there through. Additionally, as noted, in some instances, not only is AC power transmitted through the cable, but data and/or DC power may also be transmitted, such as from the smart unit to the processors, sensors, LED lights, clocks, and other associated elements, so as to power the same and/or to allow data to be transferred there between.

The device connector element will include a first AC power cable contact, which corresponds to the AC "hot" pin contact, and a second AC power cable contact, which corresponds to the neutral pin, as well as a ground cable contact. Additionally, the device connector element will include the various sensor data cable contacts for transmitting sensor data from microprocessor to the ICS and/or GFC. Likewise, the device connector element will include corresponding DC power-in cable contacts and DC power-out cable contacts so as to supply DC power to microprocessor and sensors.

As indicated above, the included sensors, microprocessor, and GFCI may be included as safety measures so as to allow for safe, plug-and-play use of the smart energy storage units disclosed herein. Further, as described, a pressure sensor, such as a contact relay, may be present on the device connector element or the housing of the receptacle of the smart unit itself, so as to ensure appropriate connectivity has occurred on the connector element side of the smart power cord as well. As a further safety precaution, the smart energy storage unit and smart cord may engage in energy ingress sampling prior to discharge so as to sample and determine the patency of the smart cord coupling prior to full energy transmission, e.g., discharge.

Further, the smart power cord may also include one or more regionalization elements, such as various region pins and contacts. Any suitable number of region contacts may be included such as two, three, four, or more. Hence, where present, the smart plug element may have a plurality of regionalization pins, and the device connector element will have a corresponding number and configuration of regionalization pin contacts. In various instances, the regionalization pins and contacts may be coupled in a hardwired configuration so as to be present or not present, open and/or closed in a given configuration so as to code for the particular country or region in which the smart energy storage unit is to be deployed.

Accordingly, where the plug element includes a given configuration of pins, the device side connector element will include a corresponding, reciprocal configuration of contacts, such that differently wired smart cables may indicate to the energy storage unit which region the device and plug should be used within. Both the plug connector element and/or the device connector element may include one or more magnetic materials, such as for interacting with reciprocal magnetic materials on the outlet and/or device side connectors, so as to thereby removably secure the cable end connectors with socket and/or smart energy storage unit.

Specifically, the smart plug may have an appliance-side connector that may be positioned on or proximate an outer surface of the energy storage unit to allow the cable end connector to be removably connected with the energy storage unit, and to permit the transmittance of power, e.g., AC power, DC power, and data, through the plug connector and plug. For instance, the power unit may include a plurality of contacts, such as a first AC "hot" contact, a second AC "neutral" power unit contact, and a ground unit contact where each interface is configured so as to connect with their corresponding power transmission line, such as with the first AC "hot" power cable contact, the second AC "neutral" power cable contact, and the ground cable contact, respectively, such as when the cable end connector is connected with the appliance-side connector unit.

Similarly, the sensor unit may also have a series of wires and contacts, as described herein. For instance, the sensor data unit may include one or more contacts that interface with a plurality of sensor power and/or data cable contacts such as for transmitting data between the AC plug and the energy storage unit. Additionally, the power cord having the microprocessor and/or sensors as described herein, may further include a DC power-in unit contact and a corresponding DC power-out unit contact that are configured for interfacing with their corresponding DC power-in cable contacts and the DC power-out cable contacts, respectively, so that DC power may be supplied to the microprocessors and sensors herein. Further, the appliance side connector may also include or otherwise be associated with a magnetic material so as to interface with magnetic material, e.g., on cable end connector, so as to thereby removably secure the cable end connector with the appliance-side connector. In some embodiments the cable end connector may be configured to mate with an appliance that is not an energy storage unit, such as a toaster or stereo receiver.

In additional instances, the plug may also include a communications module for transmitting wired or wireless communications such as to another communications module in an energy storage unit. For instance, energy from an outlet may be transmitted via the power pins, e.g., the first "hot" and second "neutral" power pins, and through the cable, reaching the GFC of the energy storage unit via the cable end connectors and appliance-side end connectors. In certain instances, the plug may further include one or more sensors that may be in electric communication with the internal power lines, and may be configured for detecting frequency, voltage, and current characteristics of the energy being transferred along those power lines, and may therefore communicate with the plug side and/or the device side microprocessors, which microprocessors may then process the sensor information, such as converting an analog signal to a digital signal, and transmitting the sensor data to the energy storage unit.

More specifically, power, e.g., AC, moves from the transmission lines through the outlet, into and through the first and second power pins, and along respective power lines within the power cord. The power lines then continue through the power cord and are in electrical connection with respective cable end contacts on the cable end connector portion. Likewise, DC power lines may be present to supply DC power from the energy storage unit through the cable and to corresponding contact points on the microprocessor and sensors. Further, a data line may be present and configured to transmit data signals to and/or from the microprocessor and/or the sensors, e.g., via data unit contacts.

These contacts at the cable end connector and their corresponding appliance-side contact connectors are present so as to allow the power cord to transmit power and/or data from smart energy storage unit to the power cord and/or to and from the power outlet. These various contacts for ensuring this transfer may have any suitable configuration and/or position within the cable. However, in one implementation, the appliance-side connector may be in a circular, or oval, triangular, square, or other polygonal shape, or other configuration so as to allow the cable end connector to be connected with less regard to the orientation of the two connector portions. For instance, with respect to power transmission, the power cable may include a ground unit contact that may be surround by an annular configuration of a "ground" power unit contact, which is in turn surrounded by annular configurations of "neutral" and "hot" power unit contacts, and the like.

Additionally, a magnetic material layer may be present and configured also in an annular configuration surrounding the power unit contacts. Likewise, a series of annular DC power unit contacts may also be included. Further, the region unit contacts may be annularly configured and positioned in different areas. Accordingly, in certain embodiments, the various power unit contacts and/or sensor data unit contacts and/or region unit contacts may have a number of different configurations, and may be repeated in intervals along a given contact, in order to allow the cable end connector and the appliance-side connectors to be connected in a variety of orientations, e.g., independent of any one given orientation.

Figure 9A:
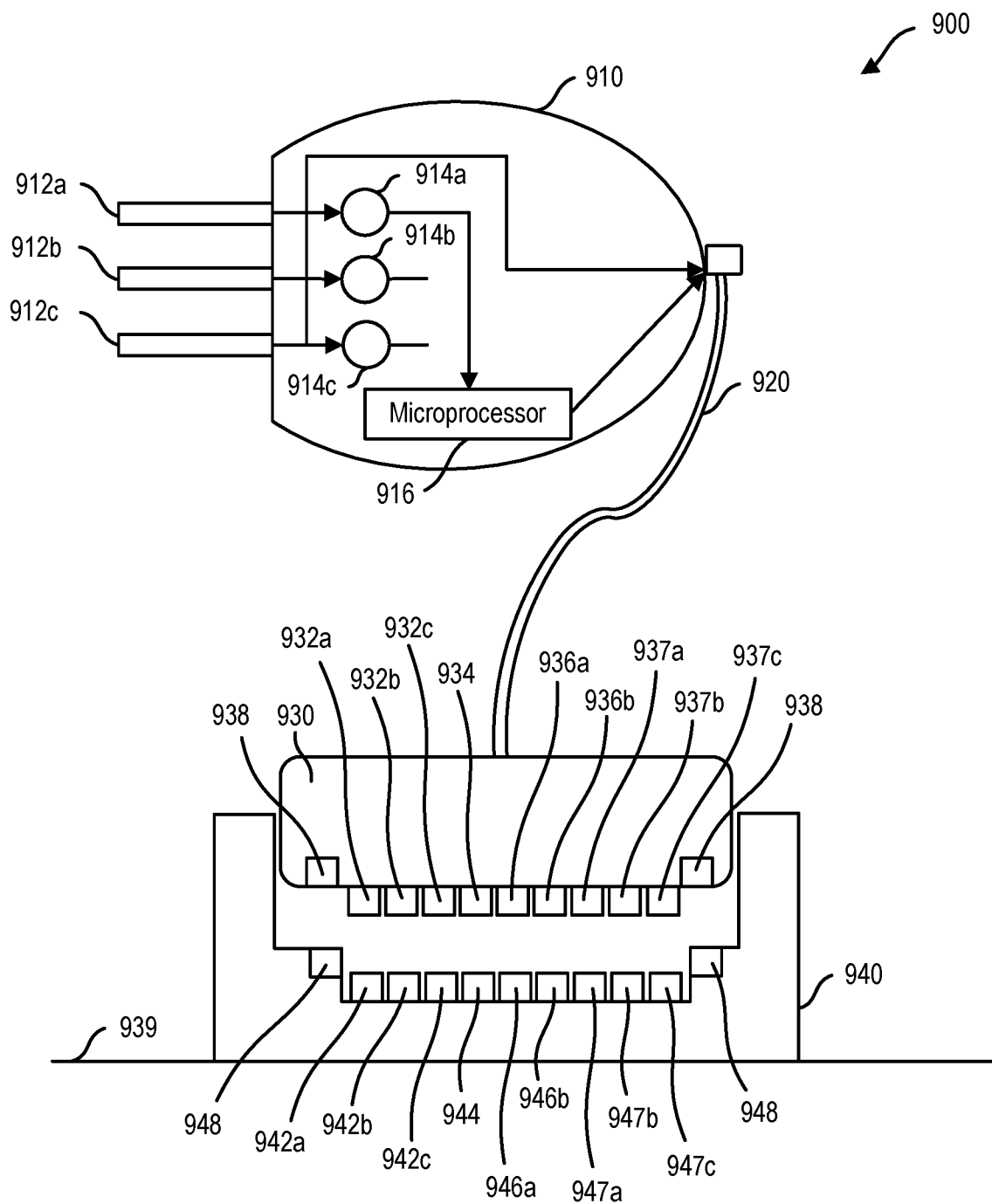
FIG. 9A shows an exemplary embodiment of a smart cable.

FIG. 9A shows an exemplary embodiment of a smart cable 900. The drawing is not drawn to scale in order to more clearly show its features. Smart cable 900 has an AC plug 910 that includes first AC power pin 912a and second AC power pin 912b, as well as ground pin 912c. First and second AC power pins 912a-b and ground pin 912c are configured to interact with reciprocal female connectors of an AC outlet (not shown). The first and second AC power pins 912a-b may be designated as hot or neutral, while ground pin 912c connects smart cable 900 to the ground wire of an AC outlet The interior of AC plug 910 includes multiple sensors, including a first sensor 914a, second sensor 914b and third sensor 914c, each of which can detect frequency, current, and/or voltage characteristics of energy that may pass through first AC power pin 912a, second AC power pin 912b, and ground pin 912c, respectively. Sensors 914a-c are connected with microprocessor 916 for receiving and processing information from the sensors and sending the data through cable 920, along with AC current.

Cable 920 terminates with a cable end connector 930, having a body 931. The cable end connector removably connects with appliance-side connector 940 for allowing transmission of AC power, data, and DC power between AC plug 910 and energy storage unit 939. Cable end connector 930 has a first AC power cable contact 932a, second AC power cable contact 932b, and ground cable contact 932c, which each correspond with first AC power pin 912a, second AC power pin 912b, and ground pin 912c, respectively. Cable end connector 930 also includes sensor data cable contact 934, for transmitting sensor data from microprocessor 916 into energy storage unit 939. DC power-in cable contact 936a and DC power-out cable contact 936b also reside on cable end connector 930, and supply DC power to microprocessor 916 and sensors 914a-c. Region contacts 937a, 937b, and 937c are also on cable end connector 930; the region contacts 937a-c may be hardwired in order to open and close reciprocal contacts on appliance side connector 940, such that differently wired smart cables 900 may indicate to energy storage unit 939 which region the plug should be used for. Cable end connector also includes magnetic material 938, for interacting with reciprocal magnetic material on appliance side connector 940, thereby removably securing cable end connector 930 with appliance-side connector 940.

Appliance-side connector 940 is positioned on an outer surface of energy storage unit 939 to allow cable end connector 930 to be removably connected with energy storage unit 939, and permit the transmittance of AC power, DC power, and data with AC plug 910. First AC power unit contact 942a, second AC power unit contact 942b, and ground unit contact 942c each interface with first AC power cable contact 932a, second AC power cable contact, and ground cable contact 932c (respectively) when cable end connector 930 is connected with appliance-side connector 940. Similarly, sensor data unit contact 944 interfaces with sensor data cable contact 934 for transmitting data between AC plug 910 and energy storage unit 939. DC power-in unit contact 946a and DC power-out unit contact 946b each interface with DC power-in cable contact 936a and DC power-out cable contact 936b, respectively, so that DC power may be supplied to sensors 914a-c and microprocessor 916. Appliance side connector also includes magnetic material 948 to interface with magnetic material 938 on cable end connector 930, thereby removably securing cable end connector 930 with appliance-side connector 940.

In some embodiments of a smart cable 900, the cable end connector 930 may be configured to mate with an appliance that is not an energy storage unit, such as a toaster or stereo receiver. In such instances, AC plug 910 may also include a communications module for transmitting wired or wireless communications to another communications module in an energy storage unit.

Energy from an AC outlet may be transmitted via first and second AC power pins 912a-b and through cable 920, reaching a GFC of energy storage unit 939 via cable end connector 930 and appliance-side connector 940. Sensors 914a-c may be in electric communication with AC power lines 922a and 922b, and detect frequency, voltage, and current characteristics of the AC energy, and communicate with microprocessor 916. Microprocessor 916 may then process the sensor information, such as converting an analog signal to a digital signal, and transmit the sensor data to energy storage unit 939.

Figure 9B:
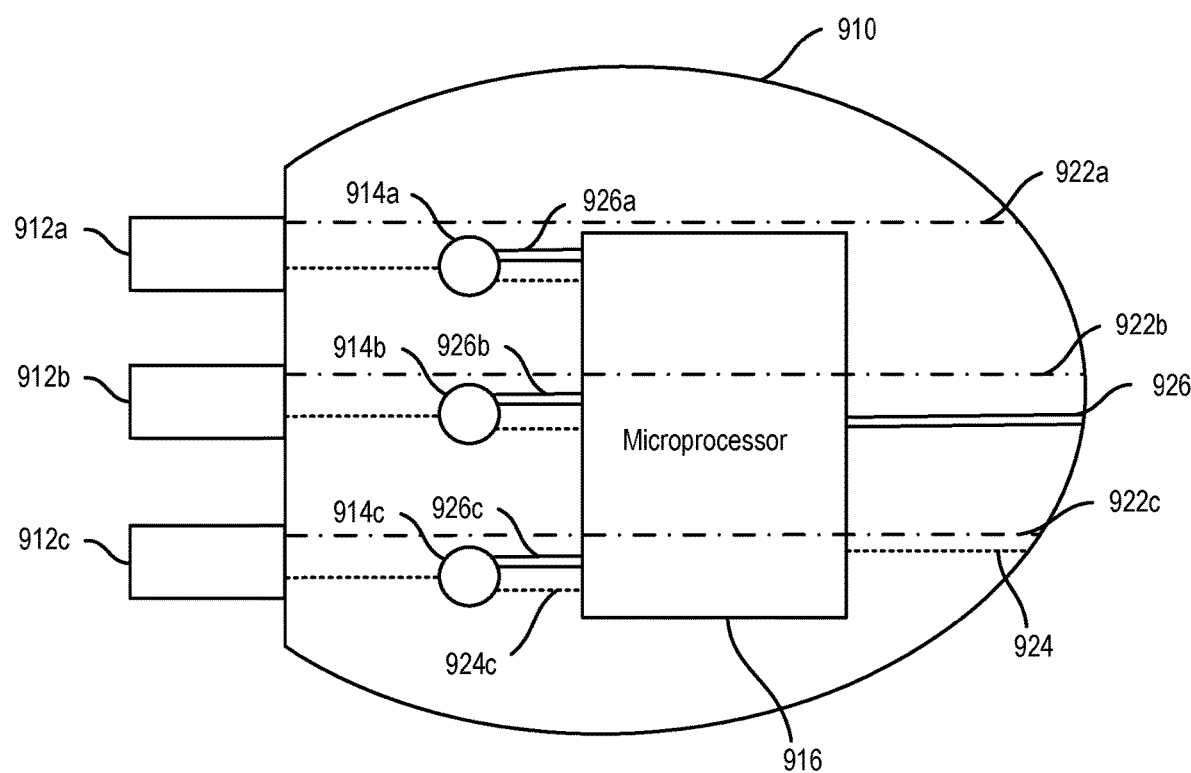
FIG. 9B shows a diagram of an AC plug of a smart cable, revealing the internal components and exemplary wiring.

FIG. 9B shows a diagram of AC plug 910 revealing the internal components and exemplary wiring. AC power moves through first and second AC power pins 912a and 912b and along respective first AC power line 932a and second AC power line 932b. Ground pin 912c is in electrical connection with ground line 922c to act as safety measure for short circuits. First and second AC power lines 922a and 922b continue through cable 920 and are in electrical connection with respective first and second AC cable end contacts 932a and 932b on cable end connector 930. DC power lines 926 supply DC power from energy storage unit 939 through cable 920 and to microprocessor 916 and sensors 914a-c. In this embodiment, the DC power passes through microprocessor 916 to sensors 914a-c. Sensor data line 924 transmits data signals from microprocessor 916 through cable 920 (not shown) and into sensor data unit contact 944.

Figure 9C:
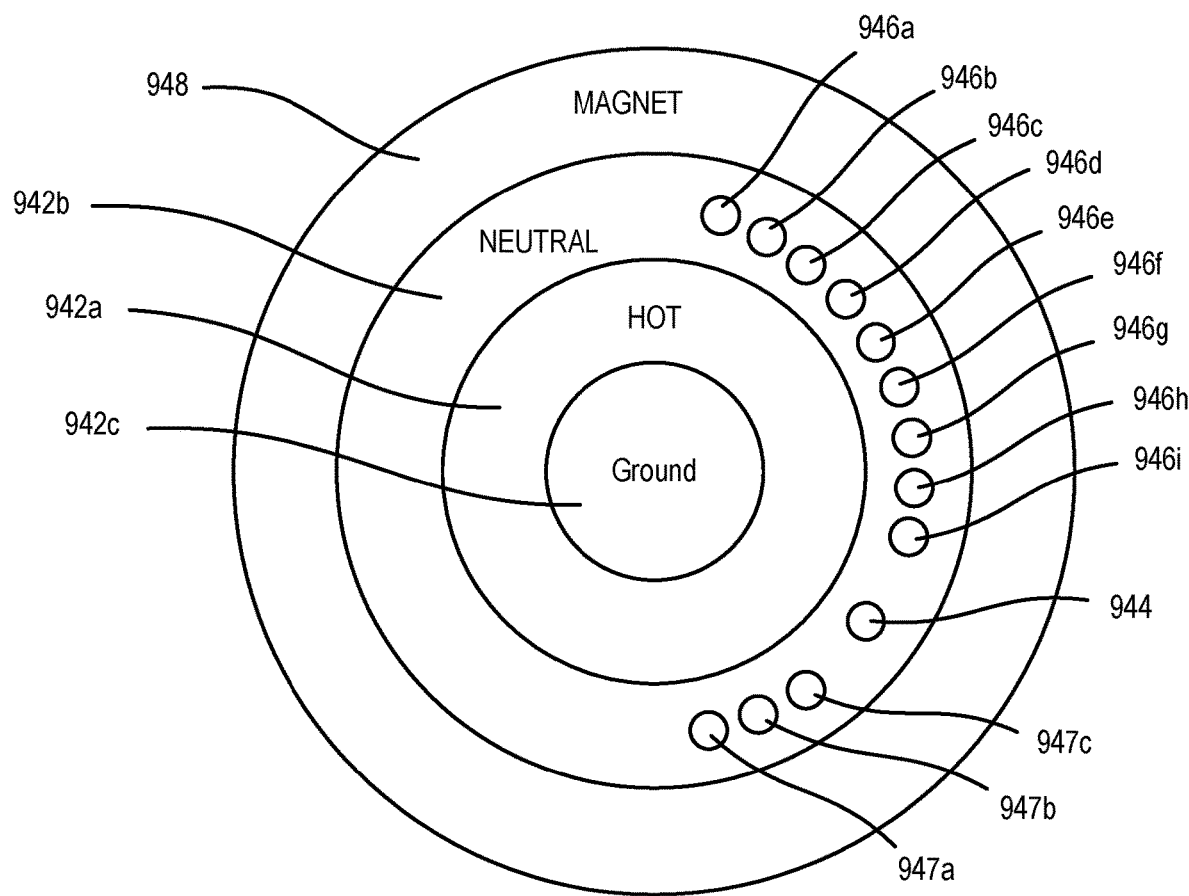
FIG. 9C shows a drawing of an appliance-side connector 940 in a circular configuration.

The contacts for cable end connector 930 and appliance-side connector 940 are depicted in a linear configuration in FIGS. 9A and 9B. However, other configurations are contemplated, and the contacts may be in a different order. For example, FIG. 9C shows a drawing of an appliance-side connector 940 in a circular configuration, which allows the cable end connector 930 to be connected with less regard to the orientation of the two connectors. Ground unit contact 942c is surround by an annular configuration of first AC power unit contact 942a, which is in turn surrounded by an annular configuration of second AC power unit contact 942b. Magnetic material 948 is in annular configuration surrounding second AC power unit contact 942b. In the depicted embodiment, a series of DC power unit contacts 946a-i are shown positioned in the second AC power unit contact.

In some embodiments, the DC power unit contacts 946a-i, sensor data unit contact 944, and region unit contacts 947a-c may be positioned in different areas, such as ground unit contact 942c. In certain embodiments DC power unit contacts 946a-i, sensor data unit contact 944, and region unit contacts 947a-c may be repeated in intervals along a given contact, in order to allow cable end connector 930 and appliance-side connector 940 to be connected in a variety of orientations.

Figure 10:
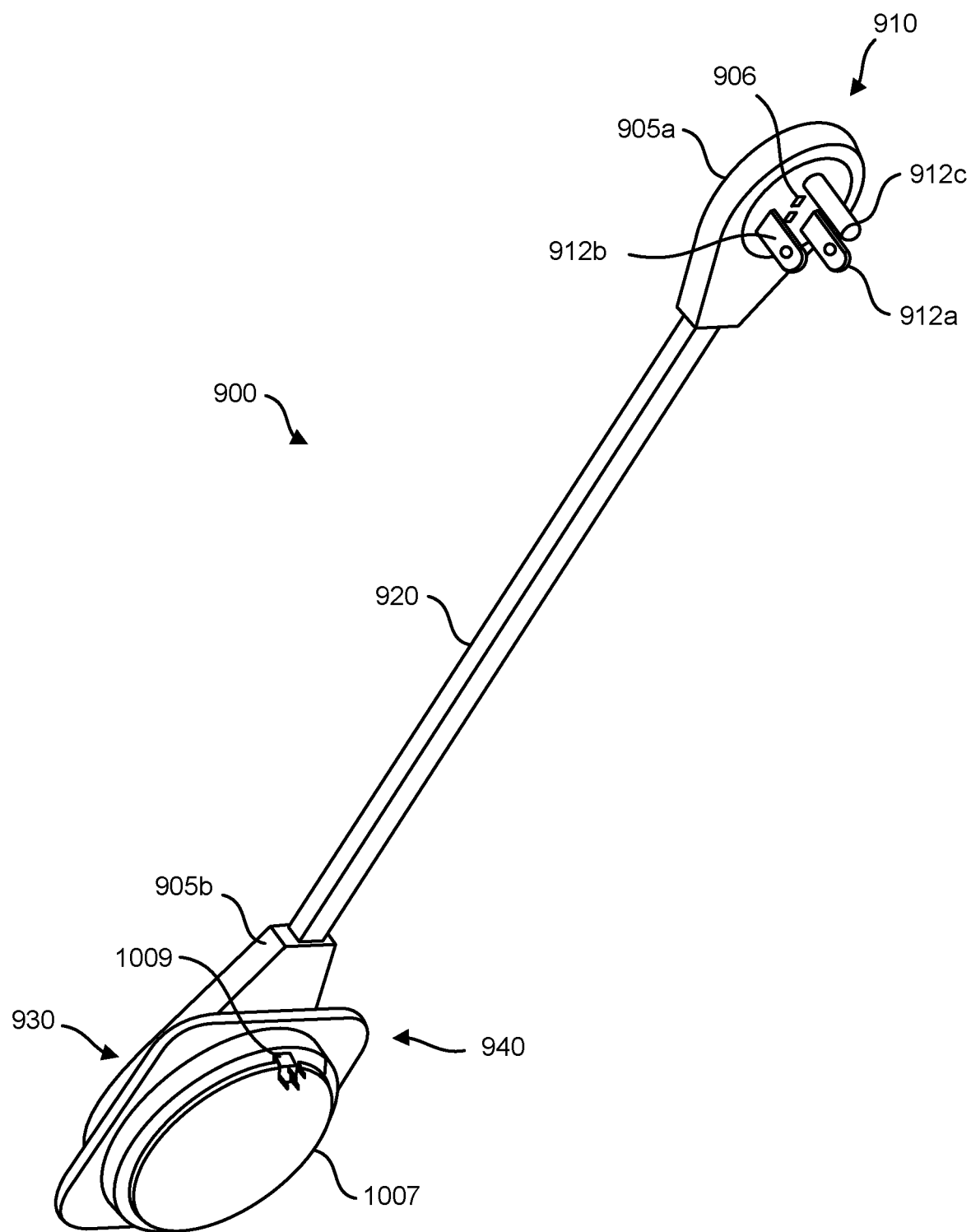
FIG. 10 is a perspective view of a smart plug embodiment having an AC plug and a connector on either end of a cable.

FIG. 10 depicts another embodiment of a smart cord 900 having an appliance connectable interface 930 that as depicted is connected to a corresponding appliance-side connector interface 940. Accordingly, in this embodiment, the appliance-side connector interface is coupled with the appliance connectable interface 930. The appliance connectable interface in turn is connected to connector element 905b. The appliance-side connector interface 940 is shown as unattached to its smart energy appliance, such as a smart energy storage unit, for clarity. The smart cord 900 further includes a plug element 910 that is in electrical communication with a connector element 905a. The appliance connectable interface portion 930 and the plug element 910 are in communication with one another via cable 920, and may receive energy from a connected AC (or DC) receptacle, e.g., an outlet, or may transmit energy to the AC receptacle.

Connector element 905b includes appliance connectable portion 930 so as to form a removable connection to the appliance-side connector 940, thereby allowing energy to be transmitted to and from a smart energy storage unit to which the smart cord 900 is attached, e.g., via appliance connectable portion 930. In various embodiments, the power cord 900 is configured for transmitting AC power, and as such the power cord may be an AC power plug 900. Additionally, the plug element 910 has a plug body or housing 905a for both allowing a user to easily handle the plug 910, as well as to house and contain various sensors, microprocessors, electrical prongs or tines, and other components as described herein. Specifically, the AC plug 910 may include a hot pin 912a for receiving energy from a current source, and neutral pin 912b to provide a return path for electrical current that is received by AC plug 910. A ground pin 912c may be included to provide a ground path to an AC outlet as a safety measure. The types, shapes, and positions of the pins 912a-c on the AC plug 910 may vary according to socket standard for geographic region in which the smart cord (and its associated smart energy storage unit) are to be used.

The hot, neutral, and ground pins 912a-c are positioned on a rotatable core 906 that can rotate within plug body 905*a*. When pins 912*a-c* are inserted into an AC receptacle, rotatable core 906 permits plug body 905*a* and associated cable 920 to be at least partially rotated so as not to block access to additional AC receptacles that may be positioned proximate to the AC receptacle that has received pins 912*a-c*. Appliance-side connector 940 includes a printed circuit board or PCB 1007, as well as a contact relay 1009. When appliance-side connector 940 is attached to a smart energy storage unit, PCB 1007 and contact relay 1009 are facing the interior of the smart energy storage unit. Contact relay may be activated by connection of connector element 930 to appliance-side connector 940 thereby allowing energy and/or data to be transferred between the smart energy storage unit and smart cord 900. PCB 1007 of the appliance-side connector allows data signal transmission from and/or to smart cord 900.

Figure 11A:
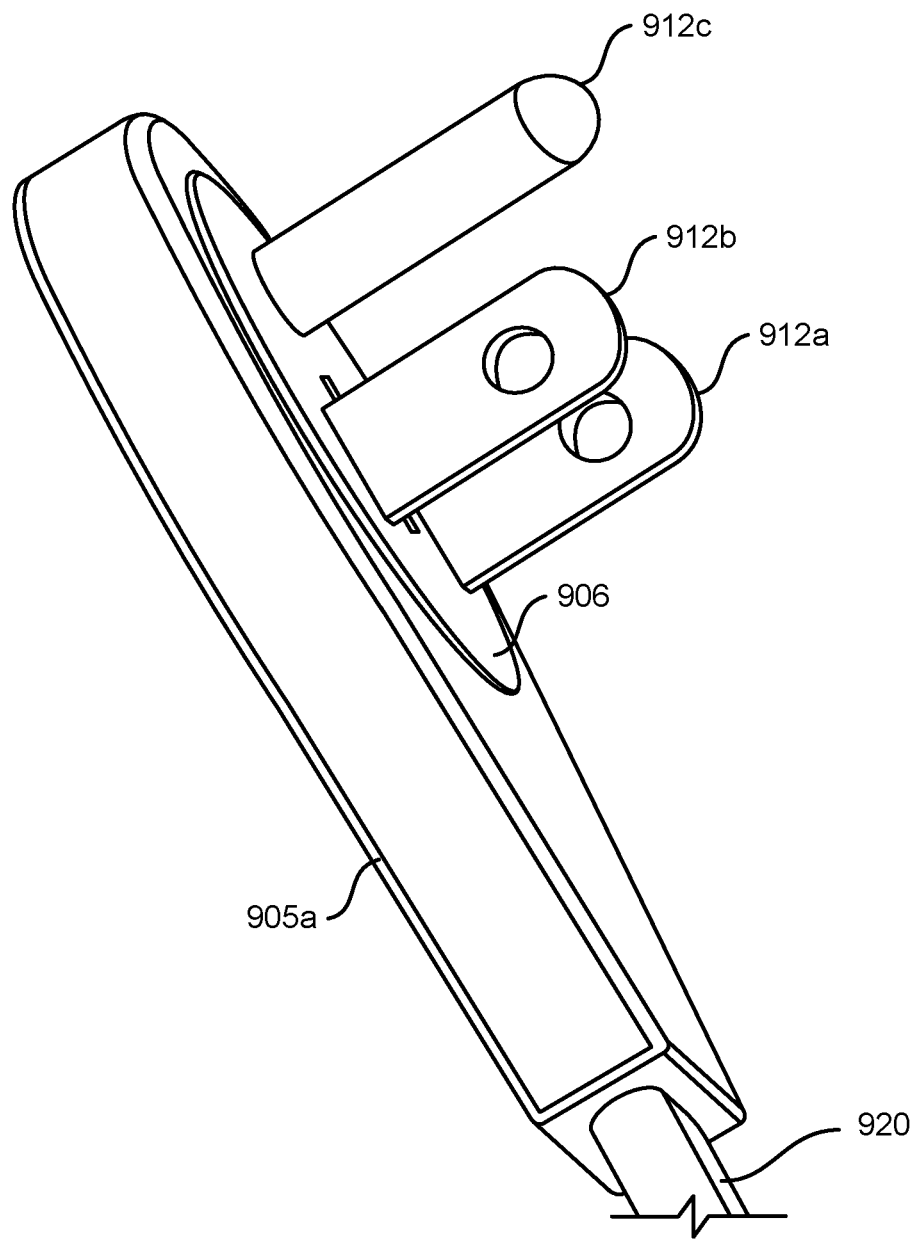
FIG. 11A is a perspective view of the AC plug portion of the smart plug embodiment shown in FIG. 10.

FIG. 11A shows a perspective view from one side of AC plug element 910, having plug body 905*a* connected with cable 920. Rotatable core 906 is positioned within plug body 905*a*, and includes hot pin 912*a*, neutral pin 912*b*, and ground pin 912*c* emerging therefrom. In some embodiments, neutral pin 912*b* may have a different profile shape and/or size from that of hot pin 912*a*; for example, neutral pin 912*b* may be wider than hot pin 912*a*, thus matching a polarized configuration of an AC outlet and preventing hot pin 912*a* and neutral pin 912*b* from being inserted into incorrect receptacles of the AC outlet, especially in embodiments of AC plug 910 that lack a ground pin 912*c*.

Figure 11B:
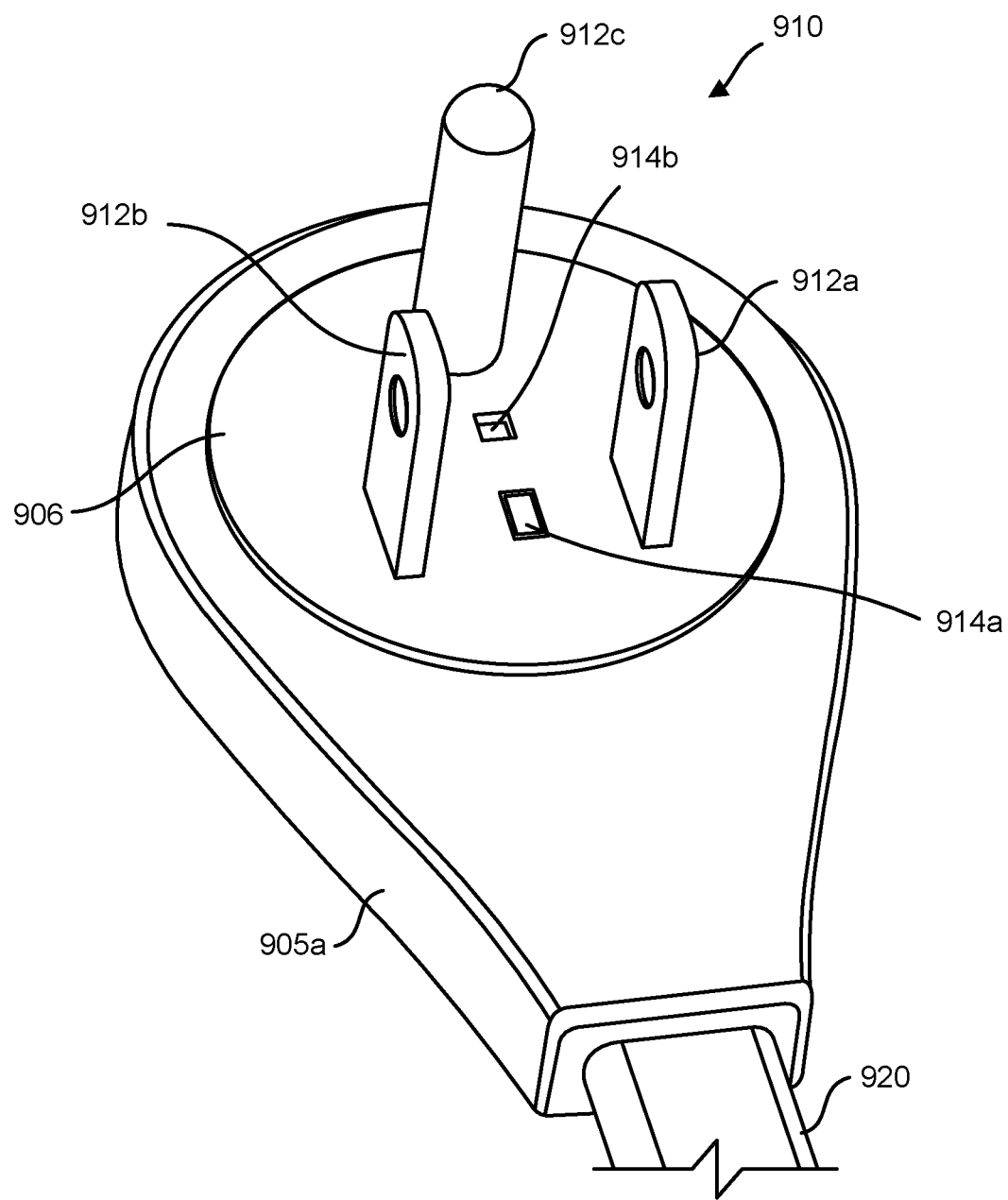
FIG. 11B is another perspective view of the AC plug of FIG. 11A, showing two additional sensors and a rotatable core in the housing of the AC plug.

FIG. 11B depicts another perspective view of AC plug element 910, including hot pin 912*a*, neutral pin 912*b*, and ground pin 912*c* positioned on rotatable core 906. Rotatable core 906 is positioned in plug body 905*a* to allow at least partial rotation relative to plug body 905*a*. Accordingly, within plug body 905*a* is a rotatable mechanism configured to allow the plug element containing the tines 912 to rotate with respect to the plug body 905*a*. Cable 920 can be seen emerging from plug body 905*a*, and is in electrical communication with pins 912*a-c*. A first sensor 914*a* and a second sensor 914*b* are proximate the surface of plug body 905*a*, so as to aid in detecting when AC plug 910 is mated with an AC outlet.

For example, first or second sensors 914*a* or 914*b* may be a Hall effect sensor that detects the proximity of a magnet positioned on the AC outlet, such that when AC plug 910 is mated to the AC outlet, the magnet on the AC outlet induces a current in the Hall effect sensor of the AC plug 910, thereby signaling that AC plug 910 may be mated with an AC outlet. In some embodiments, first sensor 914*a* may be a magnet that interacts with a Hall effect sensor positioned on the AC outlet, such that when AC plug 910 is mated to the AC outlet, the magnet on the AC plug body 905*a* induces a current in the Hall effect sensor of the AC receptacle, thereby signaling that AC plug 910 may be mated with an AC outlet.

In certain embodiments, first or second sensors 914*a* or 914*b* may be a photodetector or a photoelectric sensor that detects a reduction in light levels when AC plug 910 is mated with an AC receptacle. The photodetector or photoelectric sensor may be powered by DC power received from an energy storage cell in an electrically connected smart energy storage unit via cable 920. The photodetector or photoelectric sensor may output a reduced signal when AC plug 910 is mated to an AC outlet, as the proximity of plug housing 905*a* and AC outlet may be close enough to reduce the light level being received by the photodetector or photoelectric sensor.

Figure 11C:
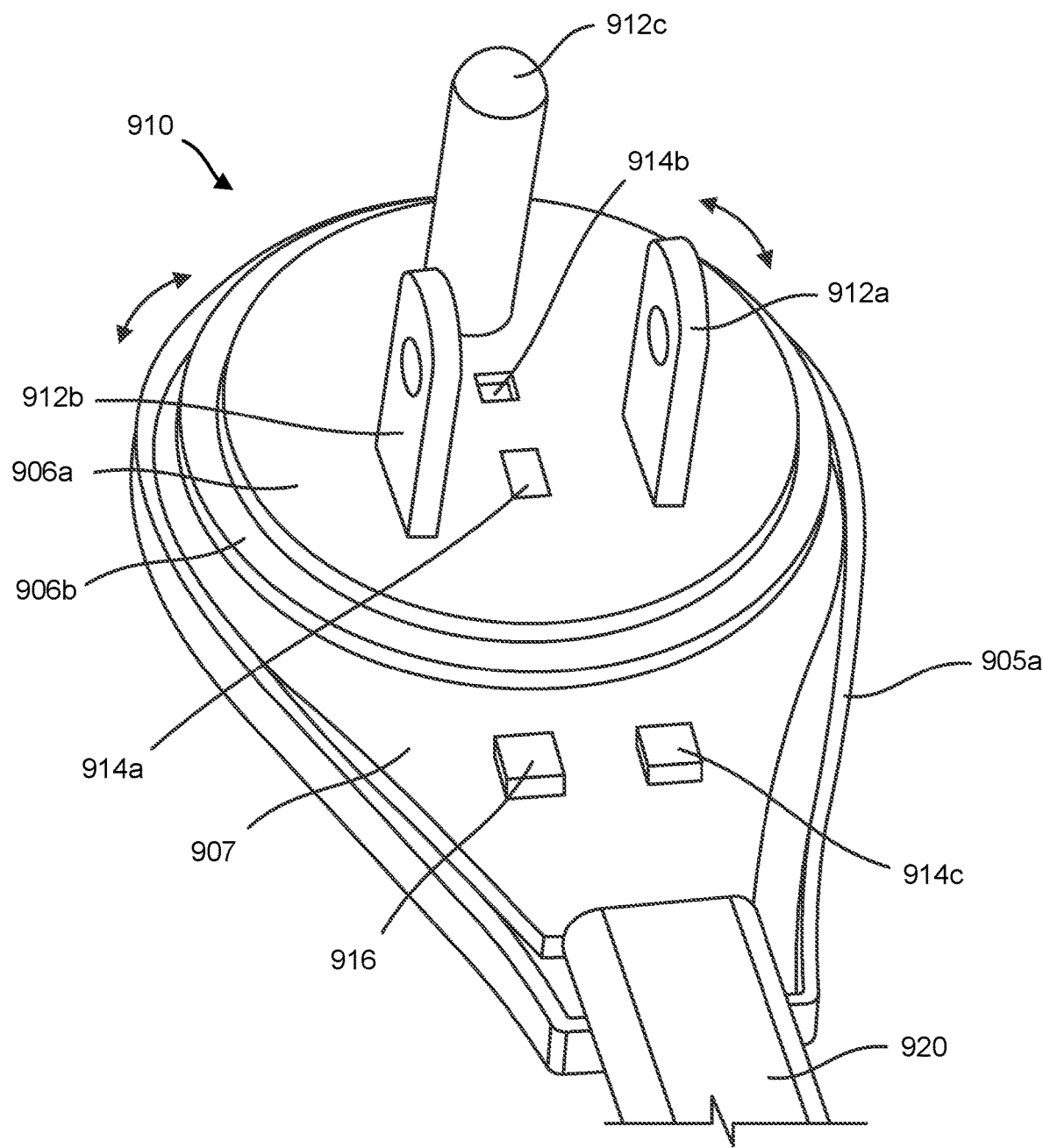
FIG. 11C is yet another perspective view of the AC plug of FIG. 11B, with an outer portion of the plug housing removed to reveal a portion of the interior, including a microprocessor and an additional sensor inside the plug housing.

FIG. 11C shows a perspective view of AC plug 910 with an outer portion of the plug housing 905*a* removed to show some of the interior. Here, hot pin 912*a*, neutral pin 912*b*, and ground pin 912*c* are positioned on an upper region 906*a* of rotatable core 906. Upper region 906*a* of rotatable core 906 is exposed via a hole (not visible) and may be flush with the exterior surface of plug housing 905*a*. In certain embodiments, upper 906*a* may not be flush with the exterior surface of plug housing 905*a*, extending beyond the exterior surface of plug housing 905*a* to thereby provide some space between rotatable core 906 and the exterior surface of plug housing 905*a* that is proximate rotatable core such that plug housing 905*a* may rotate more easily when AC plug 910 is mated to an AC outlet.

A rotatable core middle region 906*b* extends laterally underneath plug housing 905*a*, thereby securing rotatable core 906 within plug housing 905*a*. The double-headed arrows of FIG. 11C depict the rotation of plug housing 905*a* relative to rotatable core 906. First sensor 914*a* and second sensor 914*b* are also shown positioned in rotatable core 906*a*. A third sensor 914*c* is also shown. Third sensor 914*c* may be a motion sensor, such as an accelerometer (e.g. a three-axis accelerometer) for detecting movement and/or rotation of plug housing 905*a* relative to rotatable core 906. For example, an accelerometer may send a signal indicating movement of AC plug 910 and thus that it may not be safe for an attached smart energy storage unit to charge or discharge. A microprocessor 916 is also shown, which receives and analyzes signals from the first, second, and third sensors 914*a-c* via plug printed circuit board (PCB) 907 within plug housing 905*a*.

The signals (or lack thereof) from each of the first, second, and third sensors 914*a-c* may be detected and analyzed by microprocessor 916. The microprocessor may determine whether or not the smart cord 900 is attached safely to the AC outlet, and then send instructions through cable 920 to a processor or a grid flexible converter in an attached smart energy storage unit, thereby instructing the processor or grid flexible converter to either allow or disallow charging or discharging of energy. For example, if first sensor 914*a* is a Hall effect sensor, second sensor 914*b* is a photodetector, and third sensor 914*c* is a three-axis accelerometer, signals (or a lack of signals) from each of the sensors may be required for the microprocessor to determine whether the plug is safely mated with an AC outlet.

In one instance, first sensor 914*a* (e.g. Hall effect sensor) needs to detect a magnet on the AC outlet sufficiently proximate to send a voltage to microprocessor 916, thereby providing one indication that AC plug 910 is mated with an AC outlet. In addition, second sensor 914*b* (e.g. photodetector) may need to be not producing a signal that indicates detection of photons, thus providing another indication to microprocessor 916 that AC plug 910 may be mated with an AC outlet. Additionally, third sensor 914*c* (e.g. three-axis accelerometer) may need to be not producing a signal that indicates movement of AC plug 910, thus providing still another indication to microprocessor 916 that AC plug 910 may be mated with an AC outlet. In some instances, microprocessor 916 may require a signal from the Hall effect sensor (first sensor 914*a*), no signal from the photodetector (second sensor 914*b*), and no signal from the three-axis accelerometer (third sensor 914*c*), in order to output a signal to the processor or grid flexible converter of the smart energy storage that permits the smart energy storage unit to charge or discharge. Conversely, if microprocessor 916 receives no signal from the Hall effect sensor, or receives a signal from the photodetector or the three-axis accelerometer, then microprocessor 916 will not output a signal to a processor or grid flexible converter of the smart energy storage unit that allows the smart energy storage unit to charge or discharge.

Figure 11D:
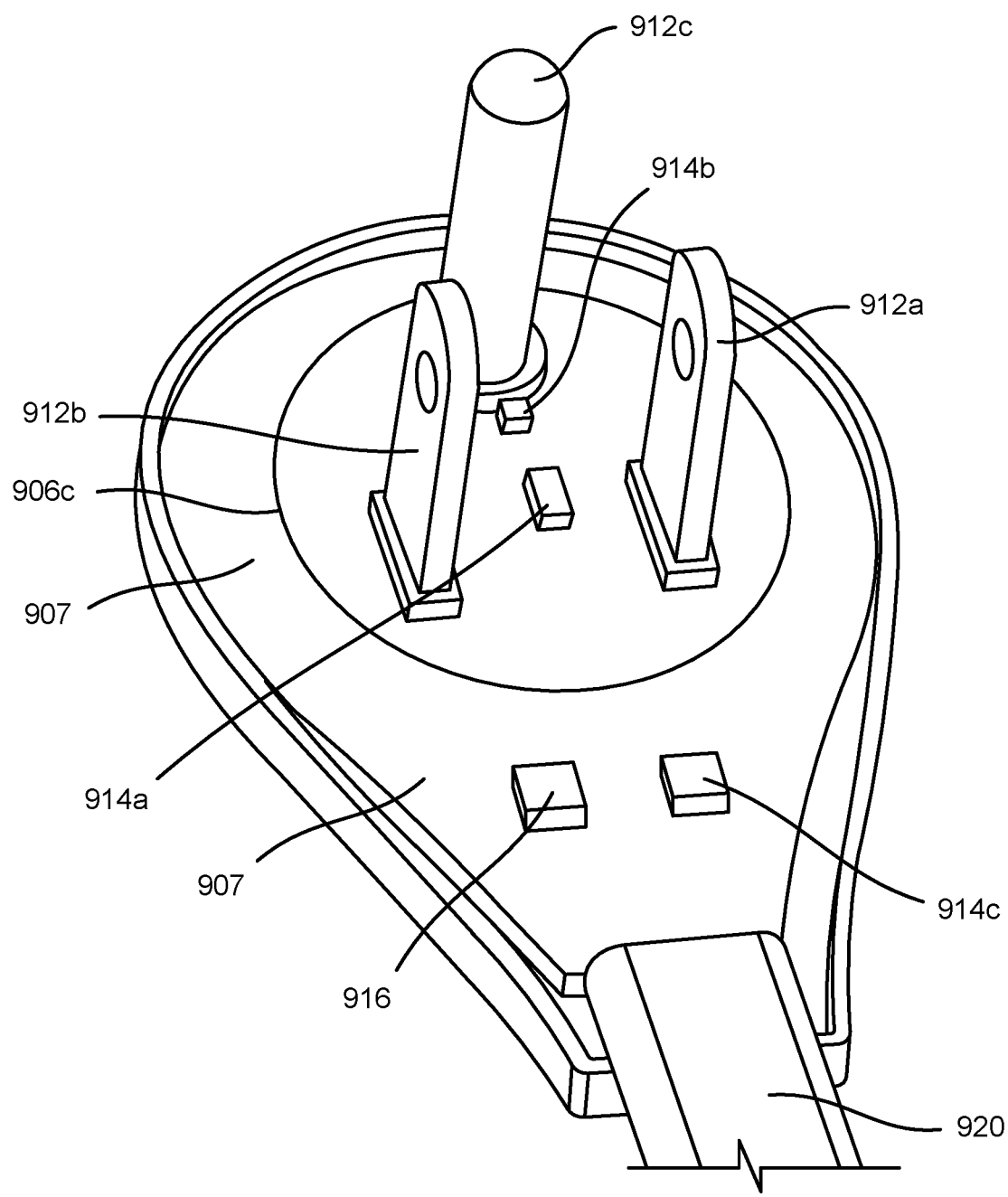
FIG. 11D is still another perspective view of the interior of AC plug of FIG. 11C, with portions of the rotatable core 906 removed to show more of the interior of the AC plug.

FIG. 11D shows another perspective view of AC plug 910 with an outer portion of the plug housing 905a removed to show some of the interior. Here, the upper and middle regions 906a-b have also been removed for clarity, revealing a lower region 906c of rotatable core 906. In the depicted embodiment, middle region 906b of rotatable core 906 (see FIG. 11C) extends beyond lower region 906c and rests on a portion of plug PCB 907, thus moving relative to plug PCB 907 when plug housing 905a is rotated relative to rotatable core 906. Plug PCB 907 includes an aperture (not visible) through which lower portion 906c extends. Plug PCB 907 may include a low-friction coating and/or a trough to provide a bearing surface on which middle portion 906b may ride. In some embodiments, rotatable core 906 may lack a lower region 906c, with middle region 906b extending through the aperture of plug PCB 907 (not visible). Hot pin 912a, neutral pin 912b, and ground pin 912c extend upwards from lower region 906c, as well as first and second sensors 914a and 914b. Third sensor 914c and microprocessor 916 are also visible, being attached to plug PCB 907 and not associated with rotatable core 906. Cable 920 enters plug body 905a and is in electrical communication with hot, ground, and neutral pins 912a-c, as well as in data and power communication with microprocessor 916.

Figure 11E:
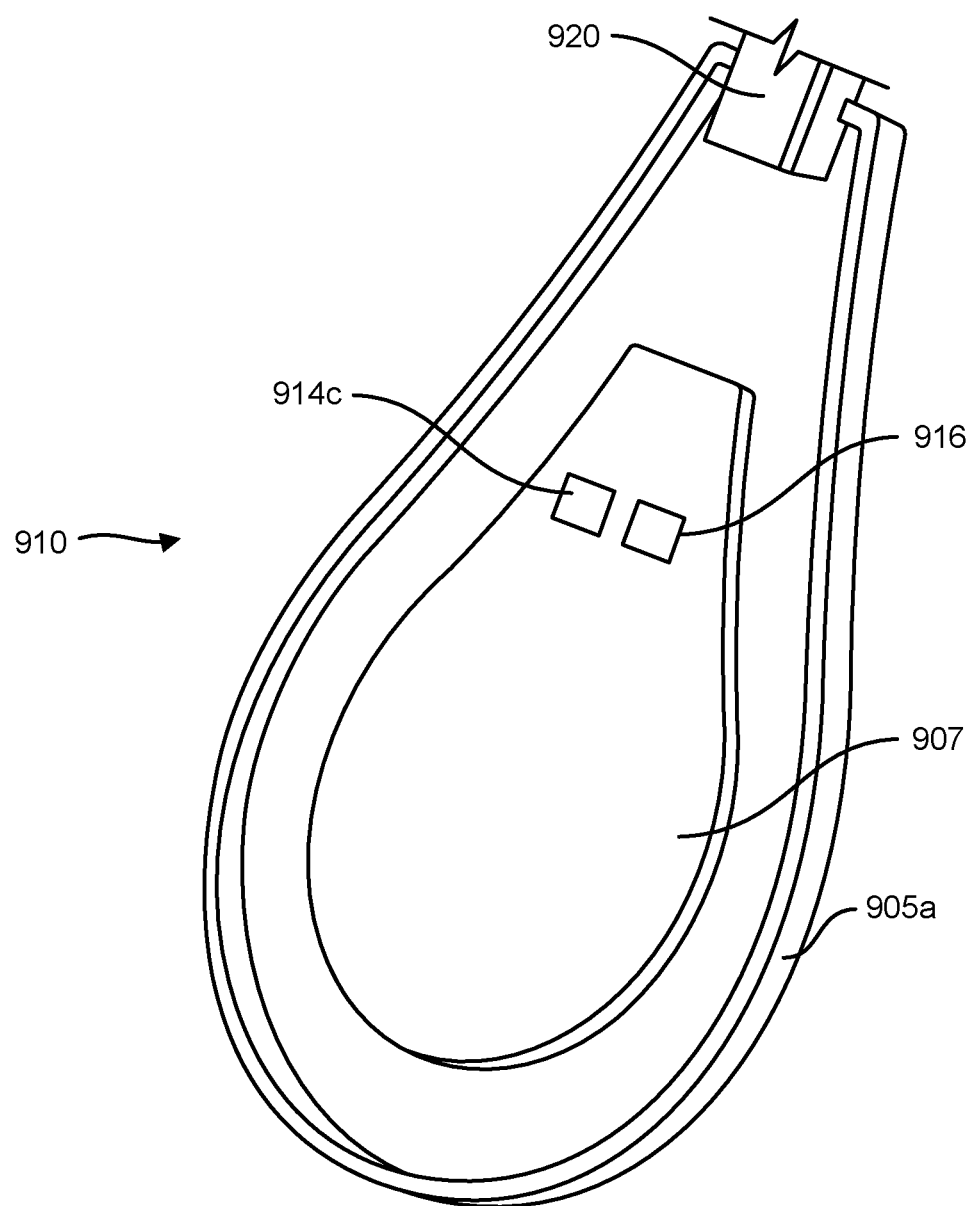
FIG. 11E is a plan view of the interior of the AC plug shown in FIG. 11D, with the rotatable core 906 and pins removed to show more of the interior.

FIG. 11E is a plan view of the interior of AC plug element 910, with a portion of plug housing 905a, pins 912a-c, sensors 914a-b, and rotatable core 906 removed for additional clarity. Plug PCB 907 is positioned inside plug housing 905a, as well as cord 920. Cord 920 is in data communication and power communication with plug PCB 907, although these physical connections (e.g. wires) are not shown in FIG. 11E. Third sensor 914c and microprocessor 916 are attached to plug PCB 907, although in some embodiments, third sensor 914c may not be directly attached to plug PCB 907, and instead may be attached to a portion of the plug housing 905a and electrically connected to plug PCB 907 by wires.

Figure 11F:
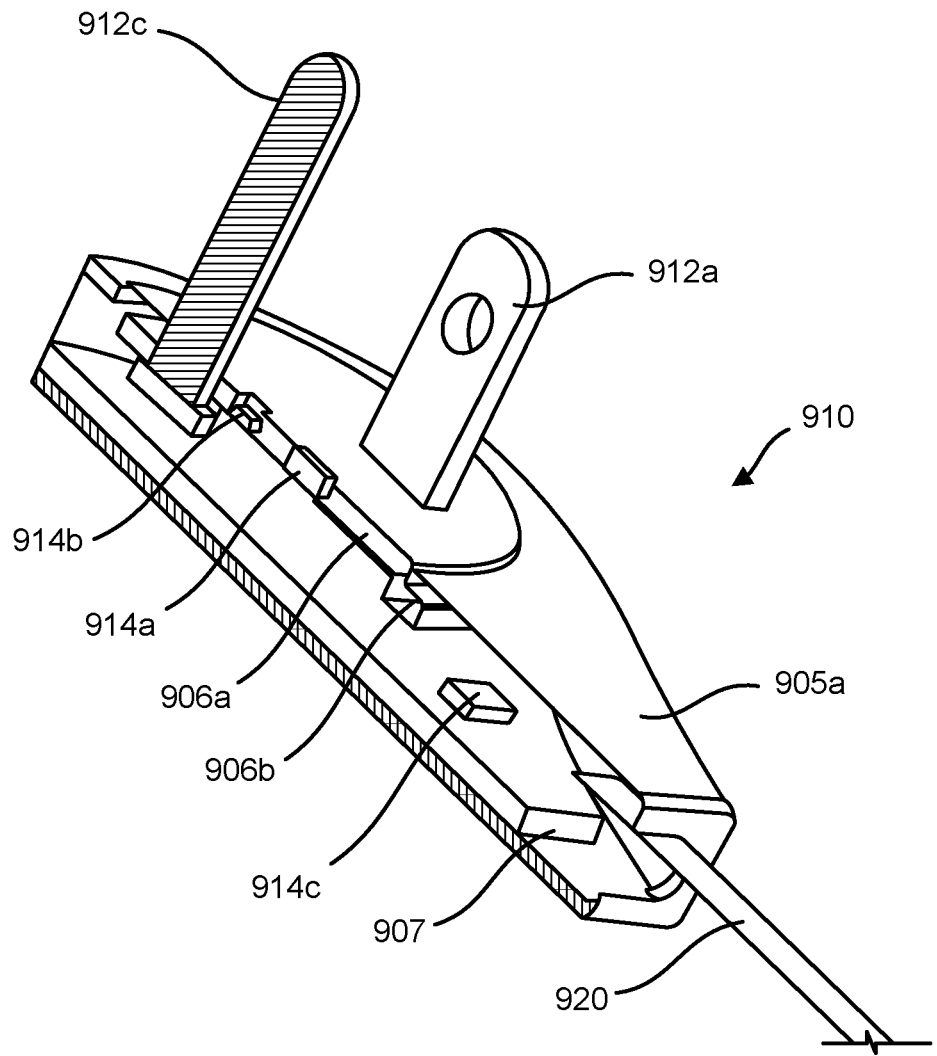
FIG. 11F is a side sectional view of the AC plug of FIGS. 11A and 11B.

FIG. 11F is a side sectional view of AC plug 910, with the plug housing 905a, rotatable core 906, sensors 914a-c, and plug PCB 907 present (see, e.g. FIG. 11B). Plug PCB 907 is positioned on an inner surface of plug housing 905a, with third sensor 914c attached directly to plug PCB 907 (microprocessor 916, also attached to plug PCB 907, is not visible). The middle region 906b and upper region 906a of rotatable core 906 are visible (lower region 906c is removed for clarity), with first sensor 914a and second sensor 914b positioned within upper region 906a of rotatable core 906 and exposed to the exterior of AC plug 910. Ground pin 912c and hot pin 912a extend outward through rotatable core 906, allowing access and mating to an AC outlet. Cable 920 enters through plug housing 905a and is connected with both plug PCB 907 and pins 912a-c to provide both electrical communication and data communication (a portion of cable 920 is removed for clarity). In order to allow sensors 914a and 914b, as well as hot, neutral, and ground pins 912a-c to remain in electrical and data communication with cable 920 while permitting at least partial rotation of rotatable core 906, a plurality of annular contacts (not shown) may be positioned on plug PCB 907. The annular contacts are positioned concentrically around each other, such that circular movement of pins 912a-c and sensors 914a-b (as rotatable core 906 is rotated) permits each of pins 912a-c and sensors 914a-b to remain in electrical and/or data contact with a single annular contact (see, e.g. FIG. 12A, described below). In some embodiments, the annular contacts may be positioned below plug PCB 907, with rotatable core 906 extending through an aperture in plug PCB 907. In such embodiments, each annular contact may be in electrical and data communication with plug PCB 907 via wires.

Figure 12A:
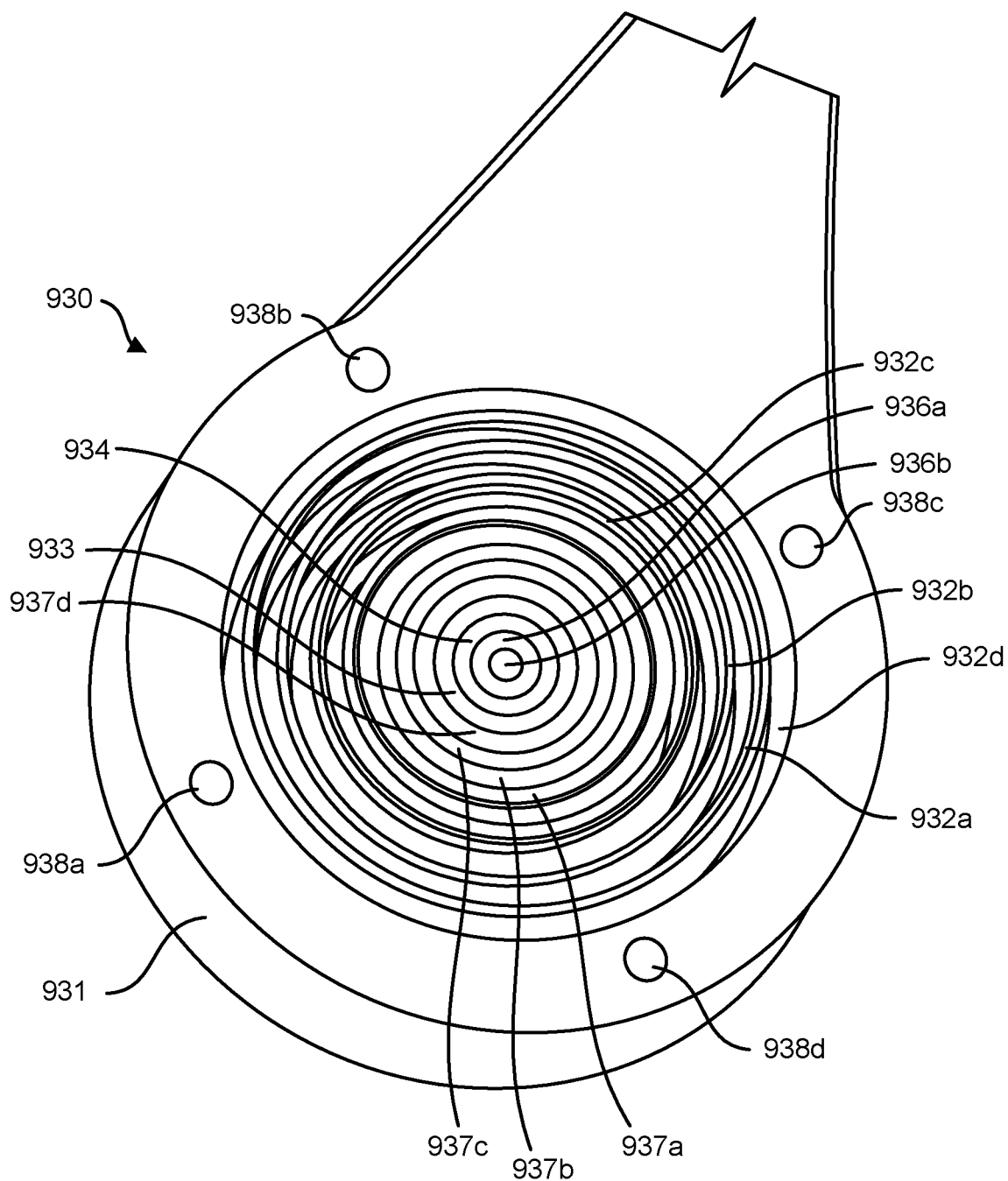
FIG. 12A is a plan view of an embodiment of a round cable end connector for a smart plug, the cable end connector for connecting to an appliance-side connector on a smart energy storage unit.

Electrical energy and data signals may be transmitted to and from a cable end connector 930 along cable 920. FIG. 12A shows a perspective view of an embodiment of a cable end connector 930 (such as that shown in FIG. 10). Cable end connector has a housing 931 that contains the components of cable end connector and allows a user to easily handle cable end connector for attaching to an appliance-side connector of a smart energy storage unit. Magnetic regions 938a, 938b, 938c, and 938d are positioned on a peripheral region of cable end connector 930 to allow cable end connector 930 to removably attach to reciprocal magnetic regions on an appliance-side connector. The magnetic regions 938a-d help position and guide cable end connector 930 to attach with an appliance-side connector, as well as removably retain cable end connector 930 when it has been attached to an appliance side connector. Magnetic regions 938a-d also provide haptic feedback to a user that a suitable connection between cable end connector 930 and an appliance-side connector has been made.

A series of annular contacts for energy and data transmission are housed in cable end connector body 931. In the embodiment shown in FIG. 12A, DC power in contact (positive) 936a is a circular contact in the center of the annular contacts, and DC power out contact 936b (negative) surrounds DC power in contact 936a as an annular ring. These DC power contacts communicate direct current power received from a connected smart energy storage unit to one or more of sensors 914a-c of AC plug 910. Sensor data contact 934 surrounds DC out contact 936b as a concentric ring, and is in data communication with microprocessor 916 of AC plug 910. Processed data regarding sensors 914a-c is sent from microprocessor 916, through cable 920, to sensor data contact 934, thereby allowing a smart energy storage unit to receive the sensor data and respond accordingly. Clock data contact 933 surrounds sensor data contact 934, and is also in data communication with microprocessor 916 via cable 920. Clock data contact 933 provides clock data from a connected smart energy storage unit.

Regionalization contacts 937a, 937b, 937c, and 937d surround clock data contact 933. Each of the region contacts may be connected to one another in a plurality of configurations to form one or more circuit portions. When cable end connector 930 is mated with an appliance-side connector of a smart energy storage unit, each of the one or more circuit portions may form a completed circuit with an appliance-side connector that can be detected by the smart energy storage unit, thereby indicating what voltage and frequency of alternating current should be used with the particular smart cable. The attached smart energy storage unit may then adapt its energy output and intake behavior according to the region contacts set on the smart cable.

For example, region contact 937a may be in electrical communication with region contact 937b, and not in electrical communication with region contacts 937c or 937d. When cable end connector 930 is mated with an appliance-side connector, the circuit portion formed by region contacts 937a-b may form an electrical circuit with the appliance-side connector, which is then recognized by the smart energy storage unit. The smart energy storage unit then knows that it should utilize a certain voltage and frequency of alternating current (e.g. 110V and 60 Hz). The smart energy storage unit will also recognize the circuit portion formed from region contacts 937a-b as being different and distinct from a smart cable having another circuit portion formed from region contacts 937a and 937d, thereby indicating that a different voltage and frequency of alternating current should be used (e.g. 120V and 60 Hz). Thus, a smart cable can be manufactured to conform to an alternating current standard for a specific geographic region and communicate that standard to a smart energy storage unit. The attached smart energy storage can then adapt its behavior according to the region contact configuration that it detects.

In the embodiment of cable end connector 930 depicted in FIG. 12A, the DC power contacts 936a-b, clock and sensor data contacts 933 and 934, and region contacts 937a-d are depicted as flat contacts on the same plane. However, in certain embodiments, each of the contacts may also be in a different order of concentricity, e.g. having sensor data contact 933 in the center and the other contacts forming annular concentric rings around the central circular contact. In some embodiments, the annular contacts may have shapes other than circles, such as ovals, triangles, rectangles, pentagons, hexagons, or other types of polygons.

Cable end connector 930 also includes annular contact regions for transmitting energy that correspond with the hot pin 912a, neutral pin 912b, and ground pin 912c on AC plug 910. The annular contacts shown in FIG. 12A are depicted as contact ridges separated by gaps, each of the contact ridges having one or more contacts (not visible; see FIG. 12I) on a side of the contact ridge; however in certain embodiments, the contacts may be in a single plane, as with the DC power contacts 936a-b, clock and sensor data contacts 933 and 934, and region contacts 937a-d. In this embodiment, hot contact ridge 937a has a contact region (not visible) that is in electrical communication with hot pin 912a, neutral contact ridge 937b has a contact region (not visible) in electrical communication with neutral pin 912b, and ground contact ridge 937c has a contact region (not visible) in electrical communication with ground pin 912c. Protector region 932d surrounds hot contact ridge 937a and provides electrical isolation from hot contact ridge 937a.

Figure 12B:
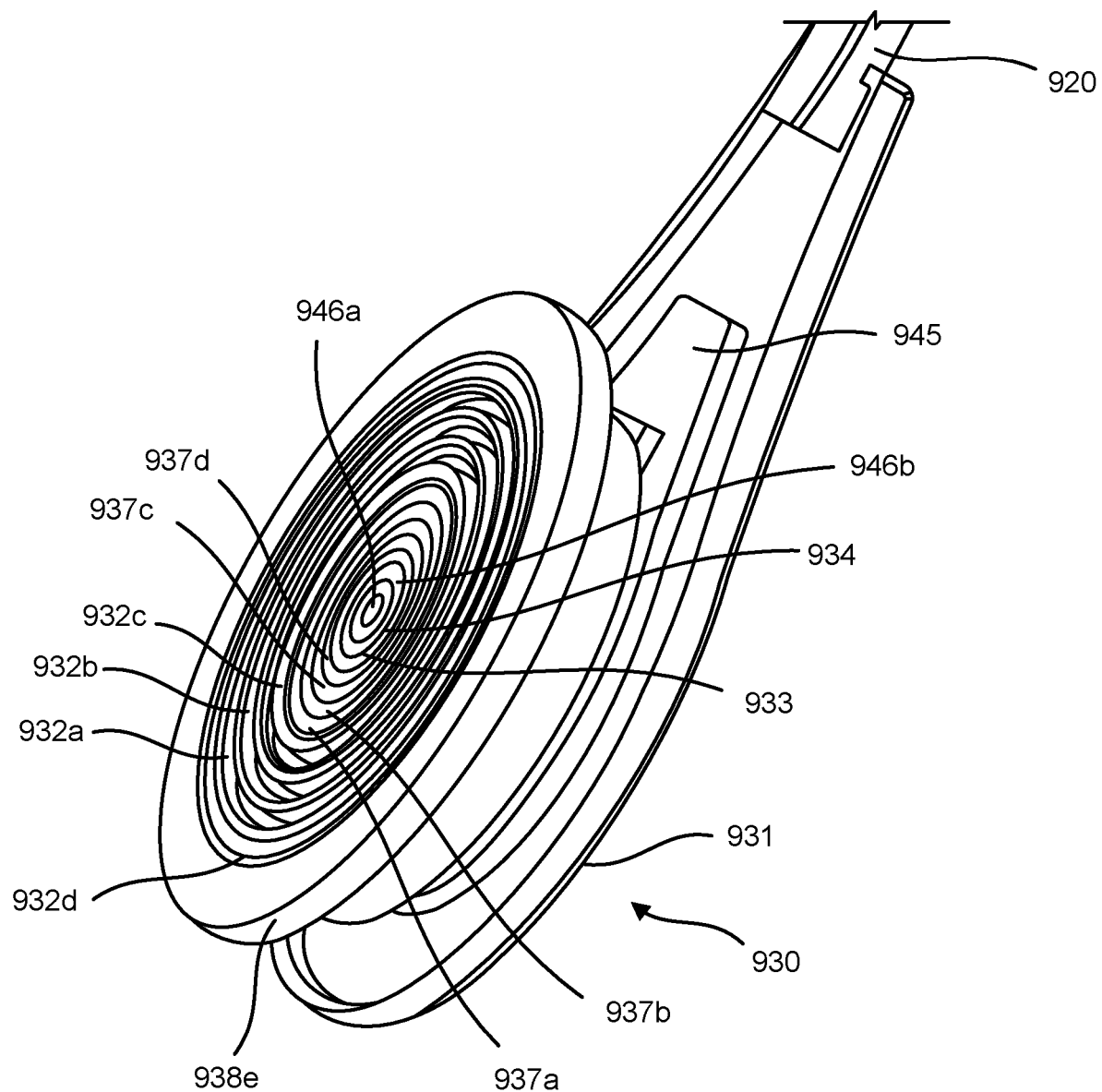
FIG. 12B is a perspective view of the cable end connector of FIG. 12A, with a portion of its housing removed to display the interior more clearly.

FIG. 12B shows a perspective view of cable end connector 930, with a portion of housing 931 removed to show the interior of cable end connector 930 with more clarity. The annular contacts, including DC power contacts 936a-b, clock and sensor data contacts 933 and 934, and region contacts 937a-d, as well as annular contact ridges 937a-c and protector region 932b are visible extending upward from the interior of cable end connector 930. Printed circuit board (PCB) 945 is in electrical or data communication with each of the annular contacts, as well as with cable 920. Annular body 938e surrounds the annular contacts, and may include magnetic regions 938a-d (not visible in FIG. 12B, see FIG. 12A), for removably attaching cable end connector 930 to reciprocal magnets on an appliance-side connector of a smart energy storage unit.

Figure 12C:
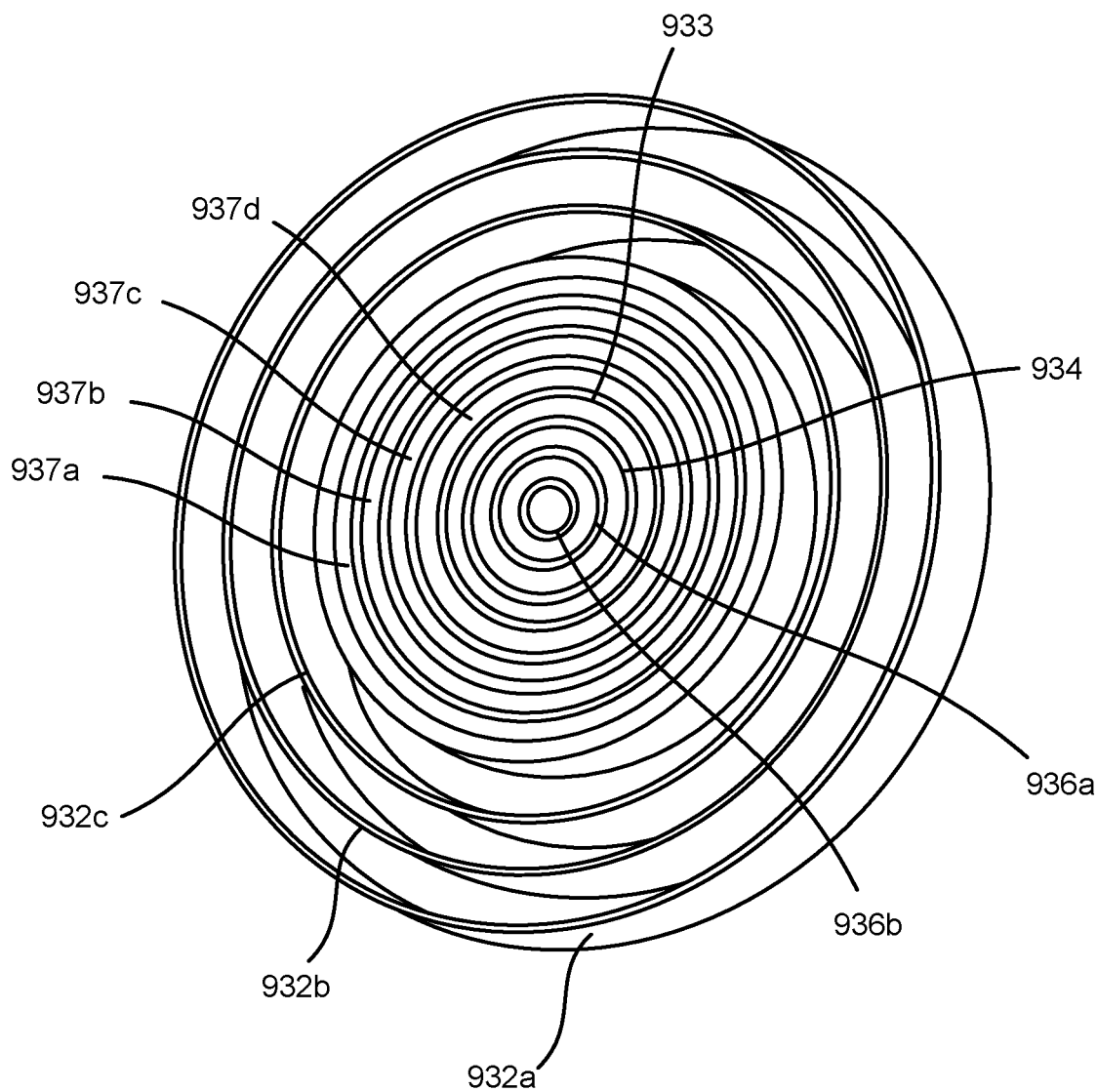
FIG. 12C is a perspective view of contacts for a cable end connector, such as seen in FIG. 12A.

FIG. 12C shows a close up view of the contact area of cable end connector 930, with the rest of cable end connector 930 removed for clarity. Contact ridges 932a-c form concentric annular rings, with hot contact ridge 932a outermost, neutral contact ridge 932b inside contact ridge 932a, and ground contact ridge 932c inside contact ridge 932b. The area inside contact ridge 932c includes a raised portion with flat contacts along its uppermost surface, including the DC power contacts 936a-b, clock and sensor data contacts 933 and 934, and region contacts 937a-d.

Figure 12D:
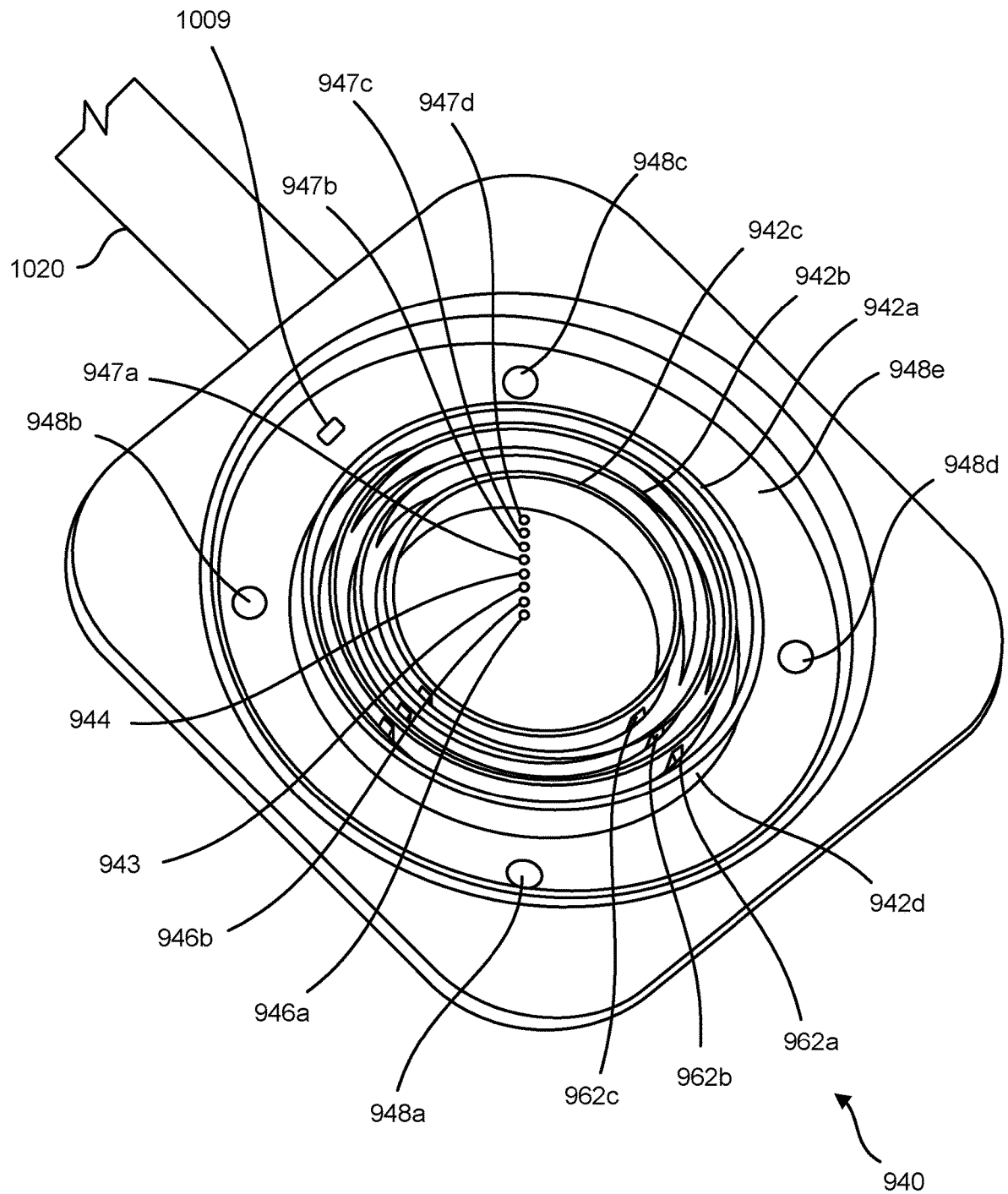
FIG. 12D is a perspective view of an appliance-side connector for receiving a cable end connector for a smart plug.

Cable end connector 930 is configured to mate with appliance side connector 940. Appliance-side connector 940 is shown in FIG. 12D, without cable end connector 930 attached. Magnetic regions 948a, 948b, 948c, and 948d are positioned on appliance-side connector 940 within an annular receiving region 948e, and arranged to mate with magnetic regions 938a-d of cable end connector 930 of smart cable 900. Contact relay 1009 is also positioned in annular receiving region 948e. In some embodiments, contact relay 1009 may include a mechanical button that is physically depressed when cable end connector 930 is mated to appliance-side connector 940, thereby closing a circuit or activating a sensor, and thus allowing the smart energy device to send and receive energy through the smart cable 900.

Appliance-side connector 940 also includes contact ridges 942a, 942b, and 942c that correspond with the contact ridges 932a-c (respectively) of cable end connector 930. For example, hot contact ridge 942a of appliance-side connector 940 and hot contact ridge 932a of cable end connector 930 interact along each of their respective side surfaces. Similarly, neutral contact ridge 942b, ground contact ridge 942c interact with neutral contact ridge 932b and ground contact ridge 932c, along their respective side surfaces. As the contact ridges have a concentric annular configuration, cable end connector 930 may be mated with appliance-side connector 940 without regard to orientation but still ensuring that the proper reciprocal connections are maintained, e.g., a hot contact of the cable end connector 930 connects with a hot contact of the appliance-side connector 940.

Each of contact ridges 942a-d includes one or more contact regions to connect with one or more reciprocal contact regions of the cable end connector 930. Contact regions 962a, 962b, and 962c are visible on corresponding contact ridges 942a, 942b, and 942c. Each contact ridge of the appliance side connector may include one or more contact regions along a surface of the contact ridge that is perpendicular to the bottom surface of housing 931. In the embodiment depicted in FIG. 12E, each contact ridge 942a-c includes four contact regions 962a-c (respectively) that each provide an electrical connection (not all are visible), such that the cable end connector 930 may be mated to the appliance-side connector in different orientations without losing a connection (see description of FIG. 12M below).

Several contacts are also positioned inside the area circumscribed by contact ridge 942c of appliance-side connector 940, each of which is arranged to connect with a corresponding contact on cable end connector 930. When cable end connector 930 is mated with appliance side connector 940, the cable side contacts extend into the area circumscribed by contact ridge 942c and make a connection with their respective contacts (see, e.g., FIG. 12I described below). For example, DC power in contact 946a makes contact with DC power in contact 936a of the cable end connector 930. DC power out contact 946b may make contact anywhere on annular DC power out contact 936b of cable end connector 930. Similarly, clock data contact 943 and sensor data contact 944 make contact with clock data contact 933 and sensor data contact 934 of cable end connector 930. In addition, each of region contacts 947a, 947b, 947c, and 947d connect with respective region contacts 937a-d of cable end connector 930. An electrical cable 1020 is also attached to appliance-side connector 940, and is in data and power communication with energy contact regions 962a-c.

Figure 12E:
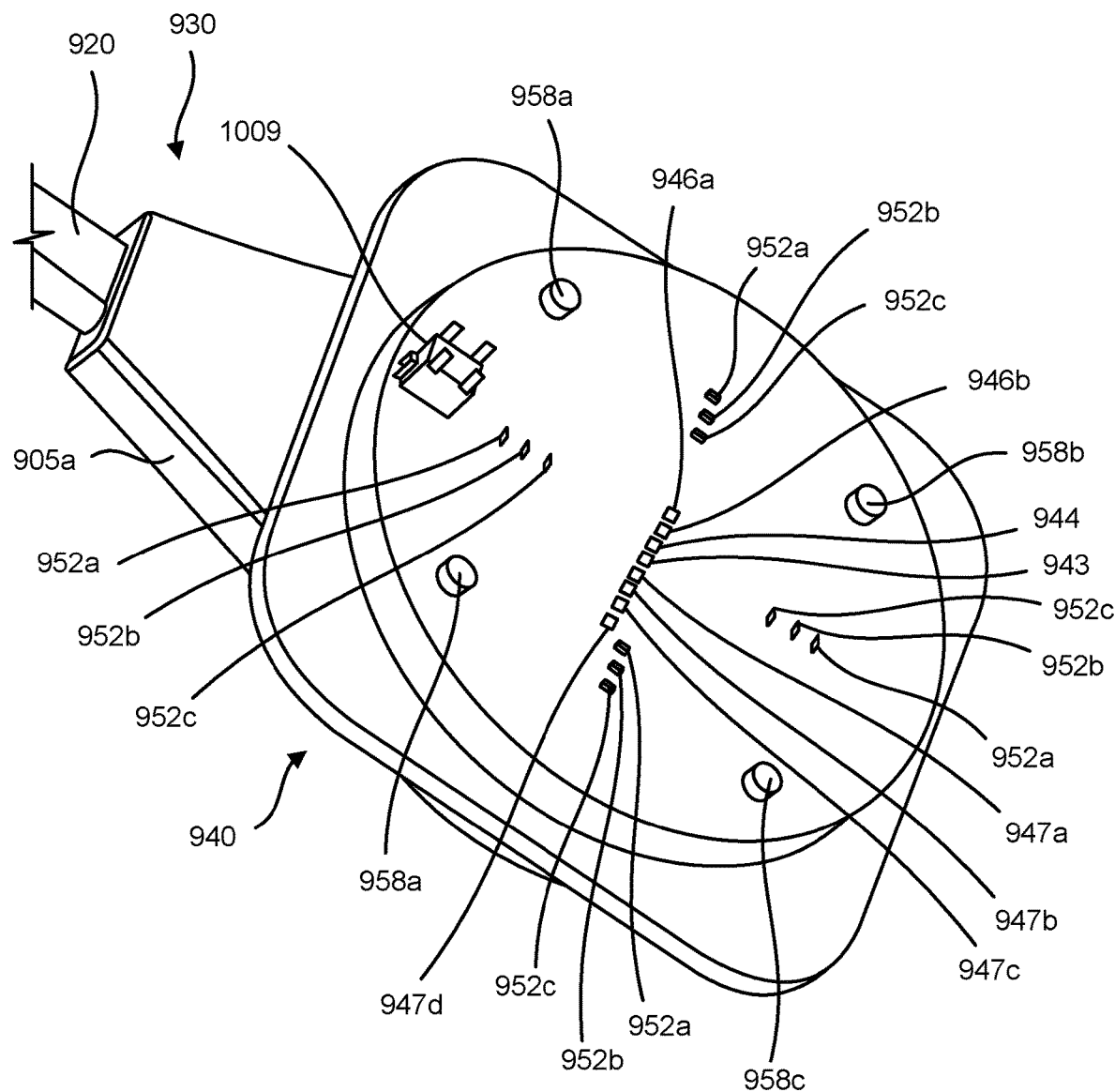
FIG. 12E is a perspective view of a cable end connector for a smart plug, such as in FIG. 10, attached to an appliance-side connector, with the interior side of the appliance-side connector visible.

FIG. 12E shows a perspective view of cable end connector 930 mated with appliance-side connector 940, with the PCB 1007 removed to more clearly show the contact region locations. The portion of appliance-side connector 940 that would be facing the interior of an attached smart energy storage unit is visible. These are the bottom portions of the contacts that make a connection with PCB 1007. DC power in contact 946*a*, DC power out contact 946*b*, clock data contact 943, sensor data contact 944, and region contacts 947*a-d* are positioned to provide a connection with their respective contacts from cable end connector 930 to PCB 1007. Similarly, energy contact regions 962*a-c* (formed here as flat pins and grouped in four locations of appliance-side connector 940) are positioned to provide connections with their respective energy contact regions 937*a-c* of cable end connector 930. Magnetic regions 948*a-d* are also visible, as well as contact relay 1009. An electrical cable 1020 is also attached to appliance-side connector 940, and is in data and power communication with energy contact regions 962*a-c*.

Figure 12F:
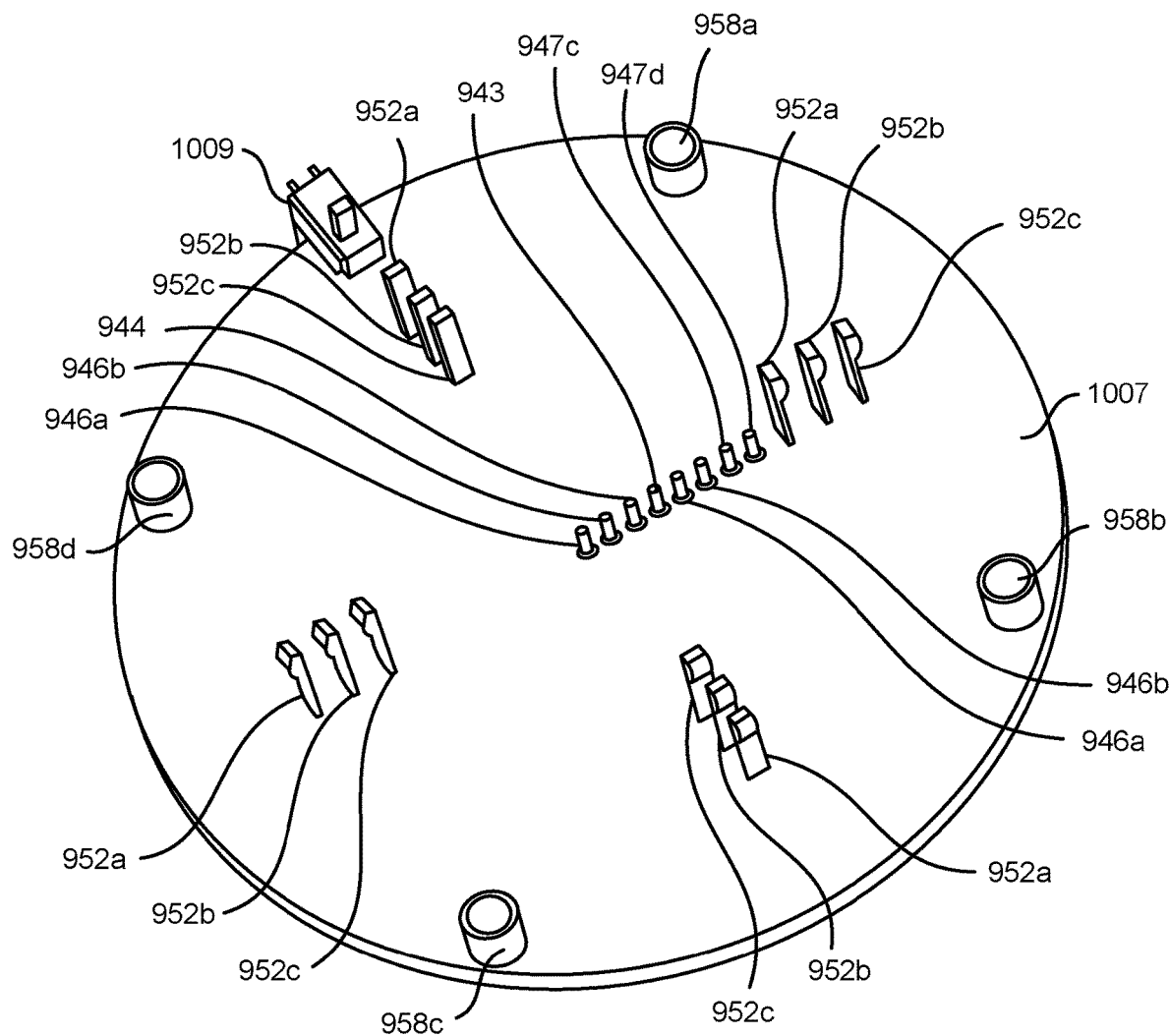
FIG. 12F is a perspective view of interior components of an appliance-side connector, such as that shown in FIG. 12E.
Figure 12G:
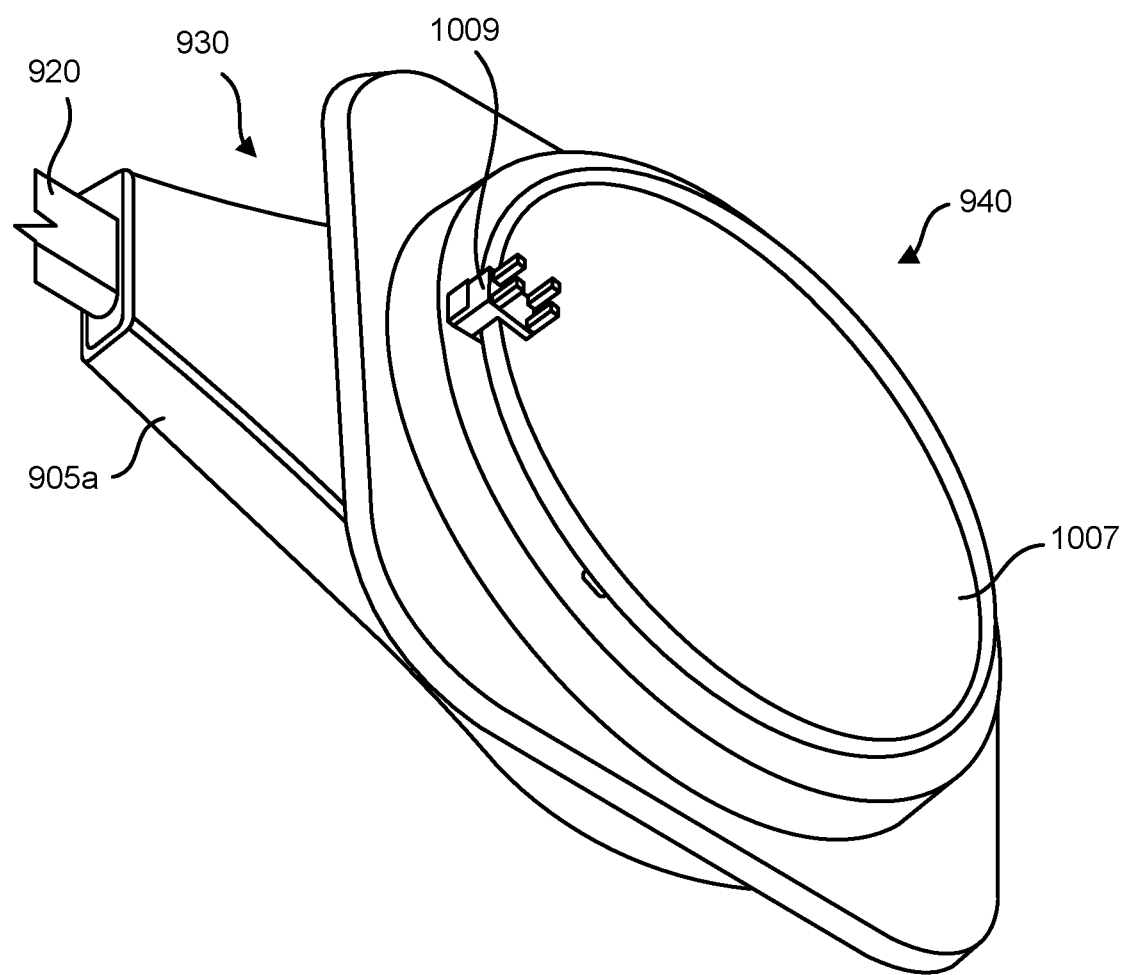
FIG. 12G is another perspective view of a cable end connector for a smart plug, such as shown in FIG. 10, the connector being in contact with a printed circuit board of an appliance-side connector from a smart energy unit.

FIG. 12F is a perspective view of PCB 1007 with various attached contacts of appliance-side connector 940. Structures such as contact ridges 942*a-c* have been removed for clarity. The visible side of PCB 1007 is the side that faces cable end connector 930 when it is mated to appliance-side connector 940. Energy contact regions 952*a-c* are grouped in four locations and emerging perpendicular to the surface of PCB 1007. DC power in contact 946*a*, DC power out contact 946*b*, clock data contact 943, sensor data contact 944, and region contacts 947*a-d* are positioned to provide a connection with their respective contacts from cable end connector 930 to PCB 1007. Magnetic regions 948*a-d* are also visible, as well as contact relay 1009. FIG. 12G provides a close-up perspective view of cable end connector 930 mated with appliance-side connector 940, viewing the internal portion of appliance-side connector 940 with PCB 1007 and relay 1009 attached. Data and energy may be communicated between cable end connector 930 and appliance-side connector 940 and through cable 920.

Figure 12H:
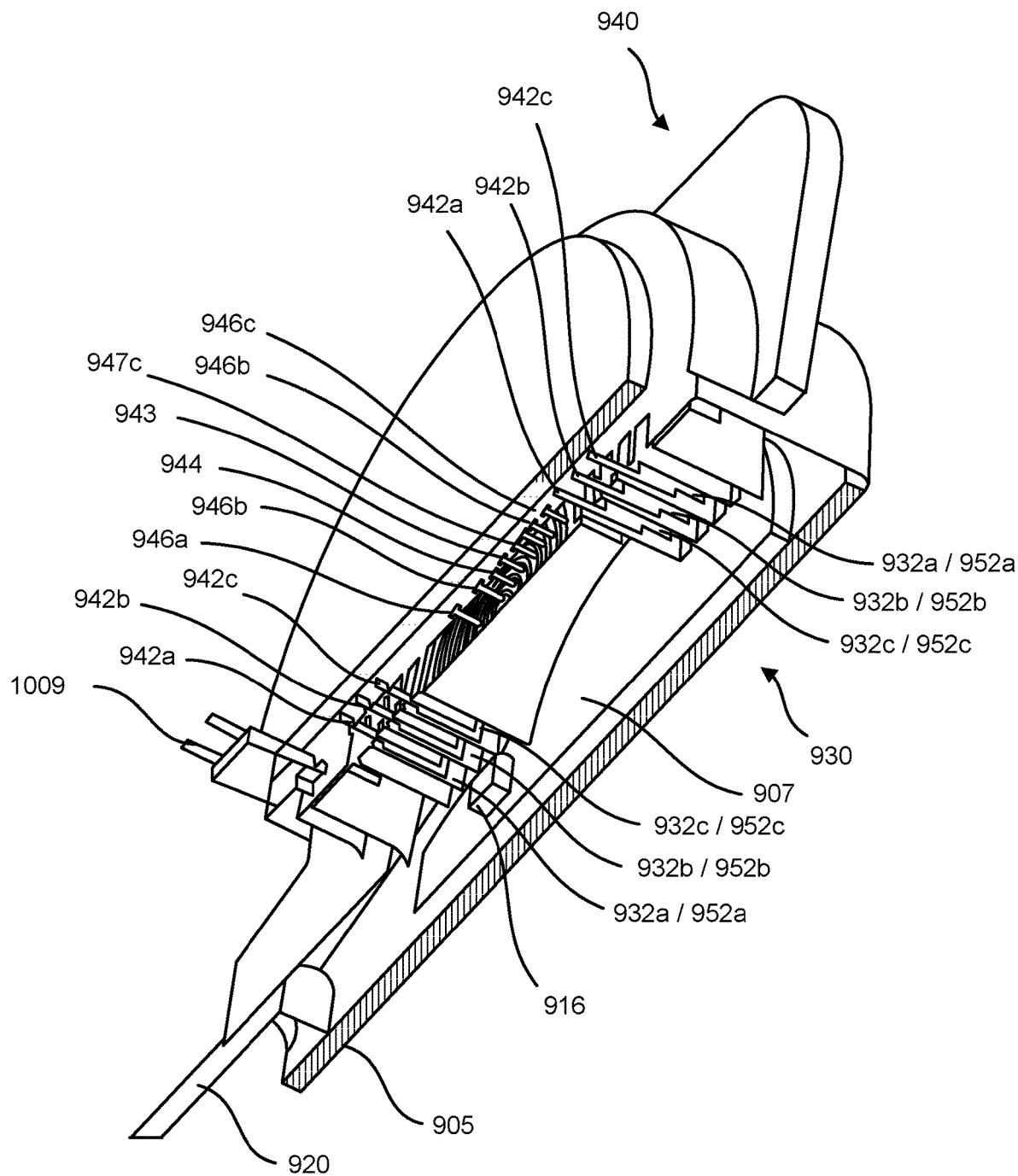
FIG. 12H is a perspective sectional view of a cable end connector for a smart plug, the connector being in contact with an appliance-side connector from a smart energy unit, such as shown in FIG. 12G.

FIG. 12H provides a perspective sectional view of cable end connector 930 mated with appliance-side connector 940. PCB 1007 has been removed for clarity. From the appliance-side connector 940, DC power contacts 946*a-b*, clock data and sensor contacts 943 and 944, and region contacts 946*a-d* (region contact 946*d* is not visible), extend outward from appliance-side connector 940 and connect with their reciprocal contacts (DC power contacts 936*a-b*, clock and sensor data contacts 933 and 934, and region contacts 936*a-d*) on cable end connector 930. On the cable end connector 930, contact ridges 932*a-c* surround the centrally-positioned contacts, and include energy contact regions 952*a-c* (respectively). Energy contact regions 962*a-c* emerge from appliance-side connector 940 to connect with respective energy contact regions 952*a-c* (contact ridges 942*a-c* are not visible here), thereby permitting data and power communication with cable 920 and PCB 907 (on the cable side connector 930) and with PCB 1007 (not shown) on appliance-side connector 940.

Figure 12I:
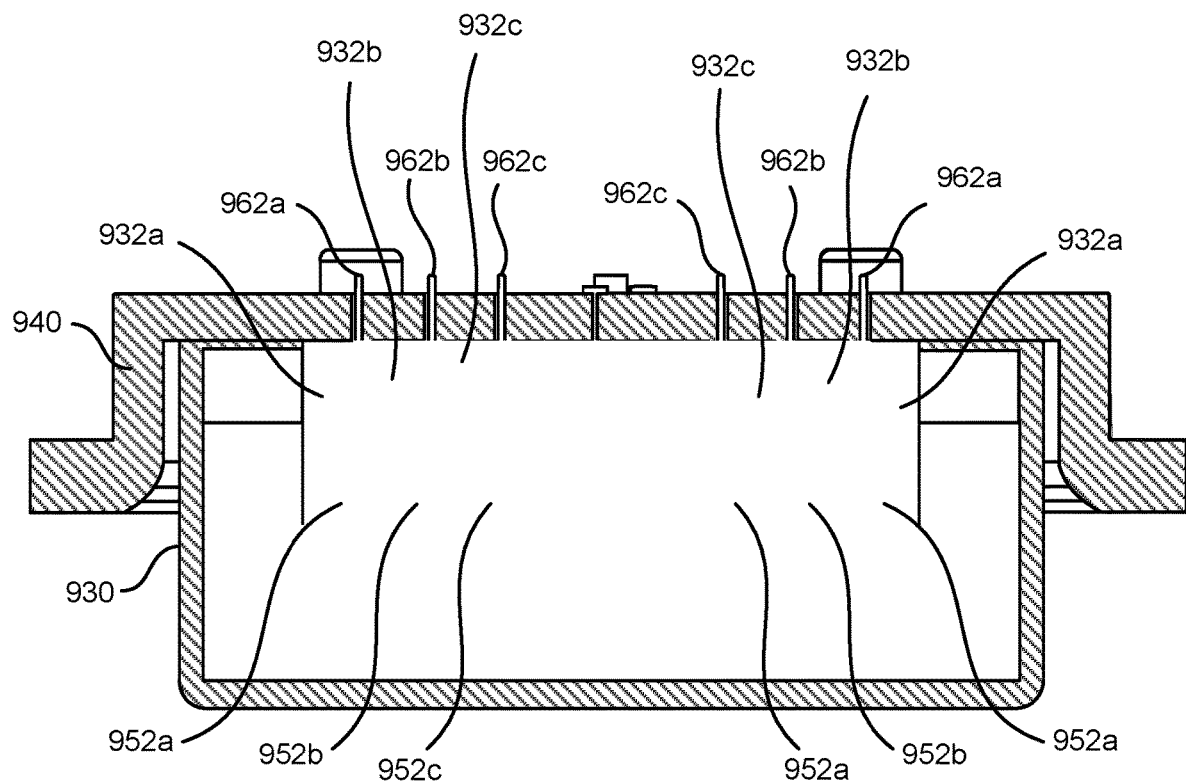
FIG. 12I is a side sectional view of a connector for a smart plug, the connector being in contact with an appliance-side connector from a smart energy unit.

FIG. 12I shows a side sectional view of a cable end connector 930 and appliance-side connector 940 mated together, in an embodiment in which appliance-side connector 940 lacks contact ridges 942*a-c*. The centrally-positioned contacts (e.g. DC power contacts 946*a-b*) have been removed for clarity. From the appliance-side connector, energy contact regions 962*a-c* are configured as flat pins, and emerge perpendicularly from appliance-side connector 940. Energy contact regions 962*a-c* are positioned such to connect with energy contact regions 952*a-c* on cable end connector 930. Energy contact regions 952*a-c* are positioned on contact ridges 942*a-c*. In certain embodiments, cable end connector may lack contact ridges 942*a-c*, leaving only energy contact regions 952*a-c* (configured as perpendicular flat pins). Other types of contact region configurations may be utilized within the scope of the instant disclosure.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limits of the stated range are each inclusive of all of the intermediary units therein. The term "about" as used herein in reference to quantitative measurements, refers to the indicated value plus or minus 10%.

The foregoing description is intended to illustrate but not to limit the scope of the disclosure, which is defined by the scope of the appended claims. Other embodiments are within the scope of the following claims.

The invention claimed is:

1. A system of smart energy assets for withdrawing and supplying energy to a local electric grid on a consumer side of a smart electric meter of a residence, the local electric grid comprising one or more local electrical circuits supplying energy to the residence, the smart energy asset system comprising:

a smart electric meter having a sensor for sensing a condition of one or more local electrical circuits of the local electric grid, a GPS, a controller for determining the condition, and a communications module for implementing a wireless communications protocol for communicating determined condition data to a receiving device;

an intelligent input and output having a smart plug for electrically coupling a smart energy storage unit to an electrical outlet, the smart plug being configured for being plugged into the electrical outlet and thereby being coupled to a local electrical circuit of the local electric grid, wherein the intelligent input receives a first form of energy from the local electric grid so as to charge one or more energy storage cells of the smart energy storage unit, and the intelligent output receives a second form of energy for supply to the local electrical circuit of the local electric grid so as to discharge the one or more energy storage cells, the smart plug comprising:

one or more connecting portions for coupling the intelligent input and output to the electrical outlet of the local electrical circuit of the local electric grid so as to effectuate the receiving of energy from and supplying of energy to the local electrical circuit, and one or more sensors, a microprocessor, and a communications module, the one or more sensors for generating sensed data, the sensed data pertaining to whether or not the one or more connecting portions of the smart plug are properly coupled to the electrical outlet prior to discharging of the smart energy storage unit, the microprocessor for receiving the sensed data and determining if it is safe to enable transference of energy to or from the smart energy storage unit so as to produce transference data, and the communications module for communicating the transference data; and one or more smart energy storage units capable of being coupled to the local electrical circuit of the local electric grid via being coupled with the intelligent input and output, the one or more smart energy storage units being a singular energy storage unit configured for being charged, so as to withdraw and store energy from a local electrical circuit, and for being discharged, for supplying energy to the local electrical circuit, the one more smart energy storage units comprising:

one or more energy storage cells configured for being charged so as to withdraw and store energy from the local electrical circuit, and discharged for supplying energy to the local electrical circuit;

a smart battery management system (SBMS) coupled to the one or more energy storage cells, the SBMS being configured for monitoring the amount of energy being withdrawn from or supplied to the one or more energy storage cells;

a grid flexible converter (GFC) configured as an integrated two-way conversion device that is configured for receiving the first form of energy from the intelligent input and output and converts it to a form capable of charging the one or more energy storage cells so as to produce stored energy, and receives the stored energy from the one or more energy storage cells and converts it to the second form of energy for provision to the local electrical circuit thereby discharging the energy storage cells; and a control unit coupled to one or more of the GFC and the intelligent input and output, and being configured for receiving the determined condition data and the transference data, the control unit including at least one microprocessor configured for determining and providing command instructions to at least one of the GFC and the intelligent input and output, the command instructions directing at least one of the GFC and the smart plug to withdraw from or supply energy to the local electrical circuit of the local electric grid when a condition of the determined condition data indicates transference of energy is useful and when the transference data indicates that it is safe to transfer energy.

2. The system according to claim 1, further comprising one or more CT clamps configured for being associated with one or more of the smart meter and one of the one or more smart energy storage units, the one or more CT clamps further being configured for measuring data pertaining to one or more of voltage, frequency, and amps associated with a current of the local electrical circuit, and for communicating that data to the smart meter or to at least one of the one or more smart energy storage units.

3. The system according to claim 2, wherein the at least one microprocessor of the control unit is configured for receiving the determined condition data, performing one or more analytics on the determined condition data so as to obtain results data, and based on the results data determining the command instructions.

4. The system according to claim 3, wherein the sensor is further configured for determining a condition of one or more of the local electrical circuits of the local electric grid, and for communicating determined condition data to one or more of the smart meter and the one or more smart energy storage units.

5. The system according to claim 4, wherein the sensor monitors local electrical circuit status with respect to one or more of load condition, demand condition, supply condition, capacity condition, voltage condition, amplitude condition, current condition, circuit capacity, an appliance condition, the smart energy storage unit condition, and/or a change in one or more of these conditions, and the results data comprises an instruction to modify the charging or discharging of the smart energy storage unit because of the results data.

6. The system according to claim 5, wherein the condition includes one or more of: a health status, a state of stored energy status, a temperature status, a location status, a scheduling condition, a predicted weather condition, and a user selectable condition.

7. The system according to claim 4, wherein system further comprises a third-party interface for receiving and communicating third-party instructions to the control unit of the smart energy storage unit, whereby the control unit may modify the command instructions upon receipt of the third party instructions.

8. A system of smart energy assets for withdrawing and supplying energy to a local electric grid on a consumer side of a smart electric meter of a residence, the local electric grid comprising one or more local electrical circuits supplying energy to the residence, the smart energy asset system comprising:

an intelligent input and output having a smart plug for electrically coupling a smart energy storage unit to an electrical outlet, the smart plug being configured for being plugged into the electrical outlet and thereby being coupled to a local electrical circuit of the local electric grid, wherein the intelligent input receives a first form of energy from the local electrical circuit of the local electric grid so as to charge one or more energy storage cells of the smart energy storage unit, and the intelligent output receives a second form of energy for supply to the local electrical circuit of the local electric grid so as to discharge the one or more energy storage cells, the smart plug comprising:

one or more connecting portions for coupling the intelligent input and output to the electrical outlet of the local electrical circuit of the local electric grid so as to effectuate the receiving of energy from and supplying of energy to the local electrical circuit, and one or more sensors and a microprocessor, the one or more sensors for generating sensed data, the sensed data pertaining to whether or not the one or more connecting portions of the smart plug are properly coupled to the electrical outlet prior to discharging of the smart energy storage unit, and the microprocessor for receiving the sensed data and determining if it is safe to enable transference of energy to or from the smart energy storage unit so as to produce transference data;

a smart energy storage unit capable of being coupled to the local electrical circuit of the local electric grid via being coupled with the intelligent input and output, the smart energy storage unit being a singular energy storage unit configured for being charged so as to withdraw and store energy from the local electrical circuit, and for being discharged for supplying energy to the local electrical circuit, the smart energy storage unit comprising:

one or more energy storage cells configured for being charged so as to withdraw and store energy from the local electrical circuit, and discharged for supplying energy to the local electrical circuit;

a smart battery management system (SBMS) coupled to the one or more energy storage cells, wherein the SBMS monitors the storing of energy in and the releasing of energy from the energy storage cell;

a grid flexible converter (GFC) configured as an integrated two-way conversion device that is configured for receiving the first form of energy from the intelligent input and output and converts it to a form capable of charging the one or more energy storage cells so as to produce stored energy, and receives the stored energy from the one or more energy storage cells and converts it to the second form of energy for provision to the local electrical circuit thereby discharging the energy storage cell;

a control unit coupled to one or more of the GFC and the intelligent input and output, and being configured for receiving the transference data from the microprocessor of the intelligent input and output as to whether it is safe to transfer energy to or from the smart energy storage unit, the control unit including at least one microprocessor configured for determining and providing command instructions to at least one of the GFC and the intelligent input and output directing at least one of the GFC and the intelligent input and output to withdraw from or supply energy to the local electrical circuit of the local electric grid based on the received transference data, when it is determined to be safe to transfer energy.

9. The system according to claim 8, wherein the smart energy storage unit further comprises a communications module, the communications module configured for receiving condition data from one or more of a smart electric meter, a monitor, or a third-party device.

10. The system according to claim 9, wherein the system further comprises a smart electric meter connected to the local electrical circuit of the local electric grid for determining a measured amount of energy being supplied to the local electrical circuit of the local electric grid, the smart electric meter further being configured for communicating the measured amount of energy to the communications module of the smart energy storage unit.

11. The system according to claim 10, wherein the at least one microprocessor of the smart energy storage unit is further configured for receiving one or more of the transference data, the condition data, and the measured amount of energy, and for performing one or more analytics on such received data so as to generate results data, and further for controlling a transference of energy to and from one or more of the smart energy storage units in response to the results data.

12. The system according to claim 11, wherein the system further includes a monitor, the monitor being configured to monitor local electrical circuit status and to generate the condition data with respect to one or more of load condition, demand condition, supply condition, capacity condition, voltage condition, amplitude condition, current condition, circuit capacity, an appliance condition, a smart energy storage unit condition, and a change in one or more of such conditions, and the results data comprises an instruction to modify charging or discharging of the smart energy storage unit in view of the results data.

13. The system according to claim 12, wherein the condition data includes one or more of: a health status, a state of stored energy status, a temperature status, a location status, a scheduling condition, a predicted weather condition, and a user selectable condition.

14. The system according to claim 13, wherein each of the smart energy storage units of the system further comprises a third-party interface for receiving and communicating a third-party instruction to the controller of the smart energy storage unit, whereby the controller may modify the command instructions upon receipt of the third-party instructions.

15. The system according to claim 14, wherein each of the one or more energy storage units of the system further comprises a switch, the switch configured for moving from an open state, where energy is allowed to flow to or from the local electrical circuit of the local electric grid and the smart energy storage unit, and a closed state, where energy is not allowed to flow to or from the local electrical circuit of the local electric grid and the smart energy storage unit.

16. A system of smart energy assets for withdrawing and supplying energy to a local electric grid on a consumer side of a smart electric meter of a residence, the local electric grid comprising one or more local electrical circuits supplying energy to the residence, the smart energy asset system comprising:

an intelligent input and output having a smart plug for electrically coupling a smart energy storage unit to an electrical outlet, the smart plug being configured for being plugged into the electrical outlet and thereby being coupled a local electrical circuit of the local electric grid, wherein the intelligent input receives a first form of energy from the local electrical circuit of the local electric grid so as to charge one or more energy storage cells of the smart energy storage unit, and the intelligent output receives a second form of energy for supply to the local electrical circuit of the local electric grid so as to discharge the one or more energy storage cells, the smart plug comprising:

one or more connecting portions for coupling the intelligent input and output to the electrical outlet of the local electrical circuit of the local electric grid so as to effectuate the receiving of energy from and supplying of energy to the local electrical circuit, and one or more sensors and a microprocessor, the one or more sensors for generating sensed data, the sensed data pertaining to whether or not the one or more connecting portions of the smart plug are properly coupled to the electrical outlet prior to discharging of the smart energy storage unit, and the microprocessor for receiving the sensed data and determining if it is safe to enable transference of energy to or from the smart energy storage unit so as to produce transference data;

one or more smart energy storage units coupled to a local electrical circuit of the one or more circuits of the local electric grid, the one or more smart energy storage units each being a singular energy storage unit configured for being charged, so as to withdraw and store energy from a local electrical circuit, and discharged for supplying energy to the local electrical circuit, each of the one or more smart energy storage units comprising:

one or more energy storage cells configured for being charged so as to withdraw and store energy from the local electrical circuit, and discharged for supplying energy to the local electrical circuit;

a grid flexible converter (GFC) configured for being electrically coupled to the intelligent input and output, wherein the GFC is further configured as an integrated two-way conversion device that receives the first form of energy from the intelligent input and output and converts it to a form capable of charging the one or more energy storage cells so as to produce stored energy, and receives the stored energy from the energy storage cells and converts it to the second form of energy for provision to the intelligent input and output thereby discharging the energy storage cells; and a control unit coupled to one or more of the GFC and the intelligent input and output and being configured for receiving the transference data, the control unit having at least one microprocessor for generating and providing, based on the transference data, instructions to at least one of the GFC and the intelligent input and output directing at least one of the GFC and the intelligent input and output to withdraw or supply energy to the local electrical circuit of the local electric grid, when it is determined that it is safe to enable transference of energy to or from the smart energy storage unit.

17. The system according to claim 16, further comprising a smart electric meter for sensing an amount of energy being withdrawn from or supplied to the local electrical circuit of the local electric gird, and communicating the sensed amount of energy to the smart energy storage unit.

18. The system according to claim 17, wherein the microprocessor of the control unit is configured to determine a condition of the local electrical circuit of the local eclectic grid by receiving data related to the amount of energy being supplied to or withdrawn from the local electrical circuit, and is further configured to instruct the GFC to release or withdraw an amount of energy to or from the local electrical circuit grid to zero out a sensed amount of energy being supplied to or withdrawn from the local electric grid.

19. The system according to claim 18, further comprising a plurality of smart energy storage units in communication with one another, wherein a total amount of energy being withdrawn from or supplied to a plurality of local electrical circuits is configured so as to zero out the total amount of energy being withdrawn from or supplied to a plurality of local electrical circuits being serviced by one or more of the plurality of smart energy storage units.

20. The system according to claim 19, wherein one of the plurality of smart energy storage units is configured so as to be a master controlling unit thereby controlling the charging and discharging of the plurality of smart energy storage units.

* * * * *